(12) United States Patent
Walter

(10) Patent No.: US 6,435,611 B1
(45) Date of Patent: *Aug. 20, 2002

(54) SPINE TENSIONING SUPPORT CHAIR

(76) Inventor: Brian A. Walter, 6601 E. Mill Plain Blvd., Vancouver, WA (US) 98661

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,945

(22) Filed: Oct. 2, 1997

Related U.S. Application Data

(60) Provisional application No. 60/027,767, filed on Oct. 4, 1996.

(51) Int. Cl.[7] .................................................. A47C 1/02
(52) U.S. Cl. ........................ 297/316; 297/326; 297/281; 482/142; 482/96; 601/24
(58) Field of Search ................................. 297/316, 273, 297/354.11, 354.13, 322, 281, 325, 326, 327, 328; 482/142, 140, 143, 96; 601/24

(56) References Cited

U.S. PATENT DOCUMENTS

| | | | | | |
|---|---|---|---|---|---|
| 2,915,055 A | * | 12/1959 | Matton | .......................... | 601/24 |
| 3,378,259 A | * | 4/1968 | Kupchinski | ................. | 482/142 |
| 3,761,081 A | * | 9/1973 | Simmons | .................... | 482/142 |
| 3,767,190 A | * | 10/1973 | Biggerstaff | ................. | 482/142 |
| 4,534,554 A | * | 8/1985 | Miller | ..................... | 297/326 X |
| 5,042,800 A | * | 8/1991 | Walter | ......................... | 482/142 |
| 5,090,695 A | * | 2/1992 | Ciolino | ....................... | 482/142 |
| 5,261,727 A | * | 11/1993 | Klaebel | .................. | 297/316 X |
| 5,472,401 A | * | 12/1995 | Rouilland et al. | .......... | 482/142 |

FOREIGN PATENT DOCUMENTS

| | | | | | |
|---|---|---|---|---|---|
| GB | | 1415 | * | 6/1863 | ................. 297/281 |
| SE | | 213362 | * | 10/1966 | .................. 482/96 |

* cited by examiner

*Primary Examiner*—Laurie K. Cranmer

(57) ABSTRACT

A chair having two body supports which move in similar rotation and inverse elevation to one another to change from a chair configuration, where one support is higher than the other, to a spine tensioning apparatus, where the supports are near equal in elevation. Preferably body supports are spaced apart from one another such that the only interconnecting human link between the two supports, when in a near equal elevation configuration, is the human spine. The spine, in this configuration is then subjected to similar forces as a simple beam supported by two separate forces, tension, compression, shear and moment. The spine is aided by and through tension and contraction and increased blood flow and afforded the ability for spinal muscle, nerve and soft tissue development and maintenance. The supports, independent of each other, comprise an upper body support and a lower body support and allow an individual's body to practice spine enhancement, development, & or traction, laying or any combination of, or alternately, face up, face down, or on either left or right side. The apparatus is also be applicable to retrofitting existing chairs.

16 Claims, 60 Drawing Sheets

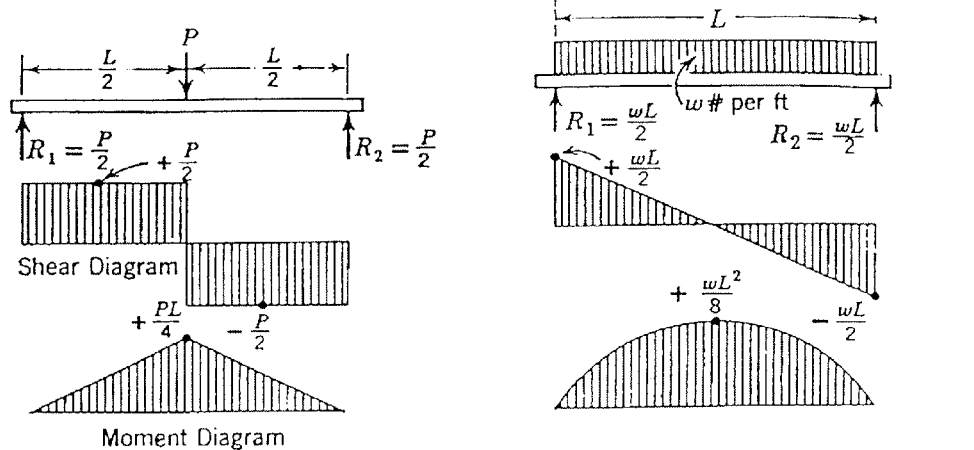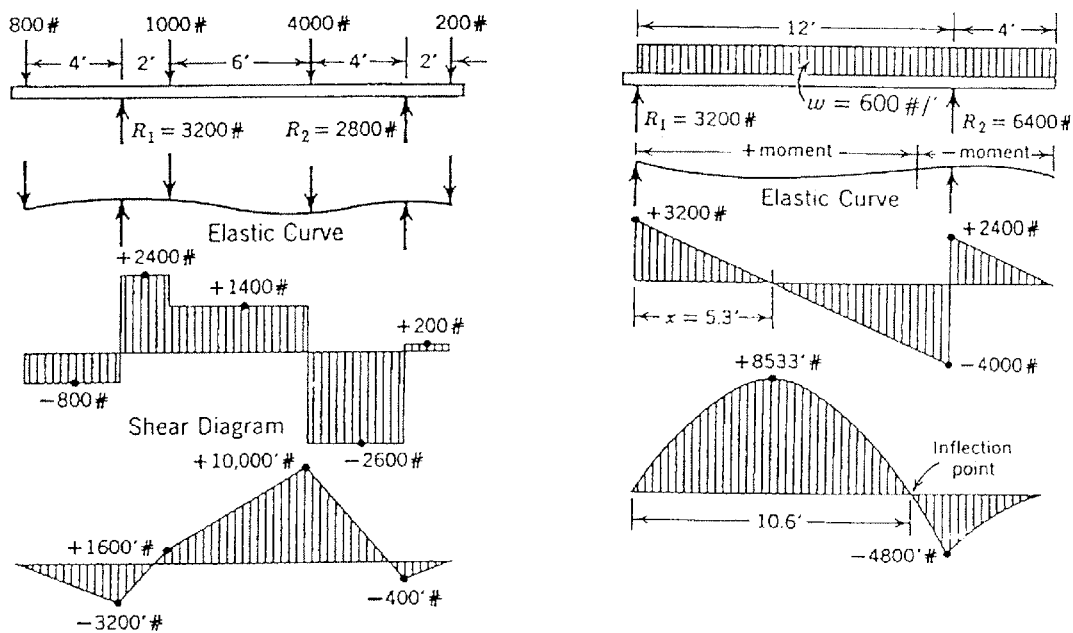
*Fig. 25*

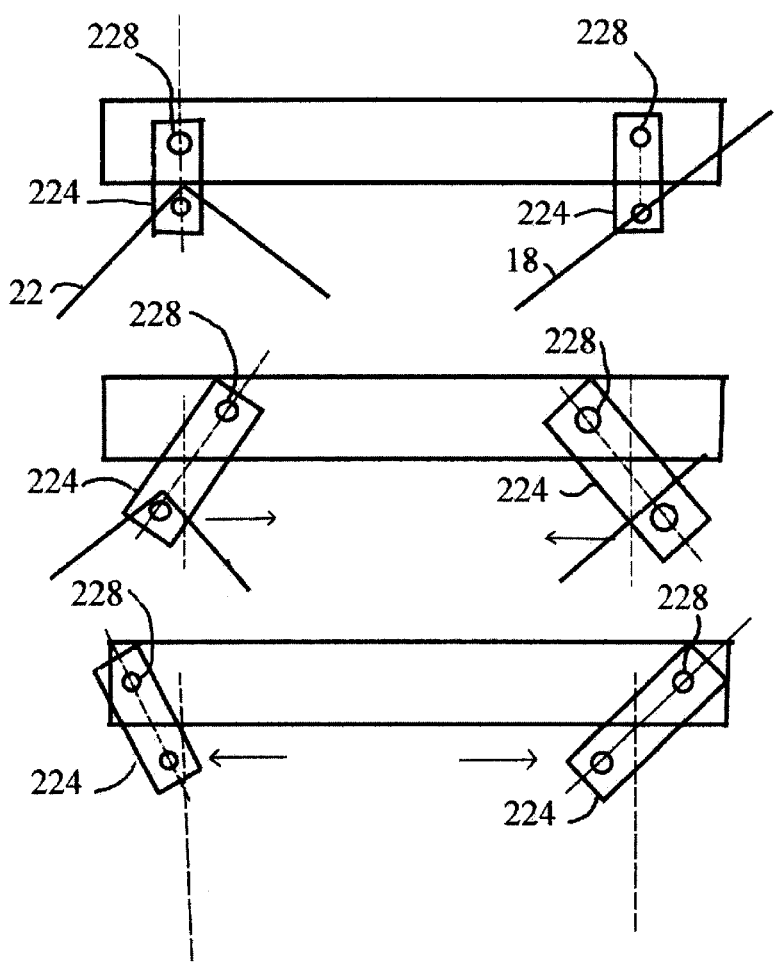
*Fig. 63*
*Fig. 64*
*Fig. 65*
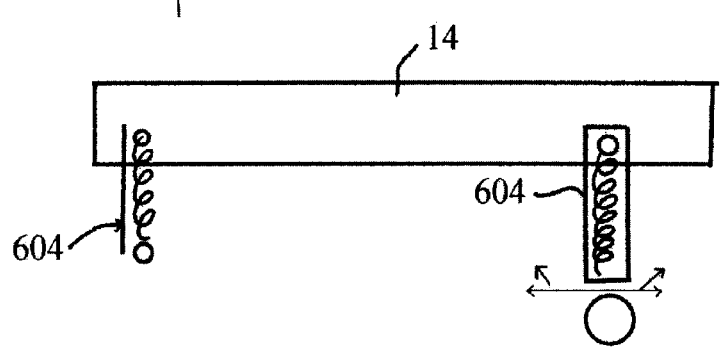
*Fig. 66*

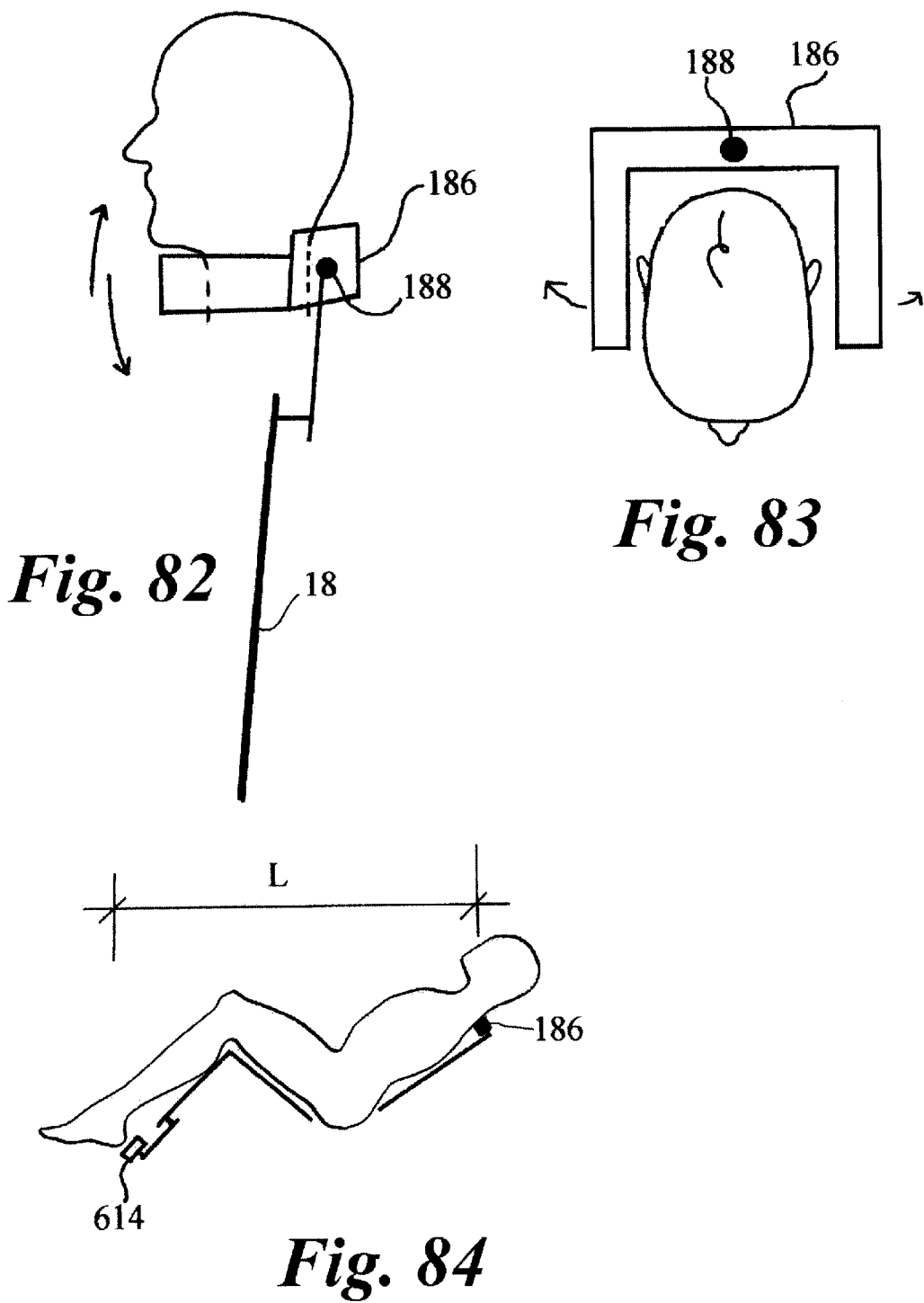

SPINE TENSIONING SUPPORT CHAIR

This application claims benefit of Provisional No. 60/027,767 filed Oct. 4, 1996.

BACKGROUND OF THE INVENTION

This invention relates generally to devices used in physical therapy and, more particularly, to a spine tensioning, traction and muscle exercise apparatus.

Back pain is a national health problem. It is the second most likely reason people go to the doctor. It is estimated Americans spent $20 billion alone in 1990 on back-related medical bills. More and more people sit for hour upon hour and perform computer work. Studies show that sitting creates two times the pressure on the low back as compared to standing.

Numerous devices have been devised to help with this problem, including the following:

U.S. Pat. No. 4,793,665 to Kvalheim discloses a chair with a seat rest and separate backrest. However, it cannot provide spine tensioning because it supports the user's posterior.

U.S. Pat. No. 4,432,108 to Chapman, U.S. Pat. No. 2,2,48,369 to Laudersen and U.S. Pat. No. 2.112,678 to Rausch all teach leg supports, but do not teach spine tensioning.

U.S. Pat. No. 5,042,800 to Walter teaches a spine tensioning body support whereby the user's back and legs are supported but not the posterior. The four vertical risers and two elongated members are fixed and require dismounting and disassembly to change leg and back support location. Additionally, the users must support themselves with their arms on the elongated members and lift one leg at a time over the leg rest to place them in the device. This feat is difficult for some users and may prohibit older users and those with back pain from obtaining the benefits of the device.

SUMMARY OF THE INVENTION

It is thus an object of this invention to provide the user a simplified access for practicing spine tensioning, traction and development.

Another object of this Invention is to provide an economical means to practice spine tensioning, traction at a minimal cost without the aide of a therapist.

Still another object of this invention is to provide a device, which may readily be utilized as a chair and, with no structure adjustments, nor dismounting also function as a dual support spine-tensioning device.

Another object of the invention is to provide the user with an opportunity to vary and increase the mild limited tension to the spine by allowing the user to lay face down in the apparatus.

Another object of this invention is to provide a chair that, in the reclined position, decompresses the low back as opposed to doubling the pressure when sitting upright.

Still another object of this invention is to provide a computer input chair that may also function as a spine tensioning computer input chair from which one may still be able to perform computer related tasks.

BRIEF SUMMARY OF THE INVENTION

These and other objects of the invention are accomplished by a spine tensioning dual body support chair that includes two substantially planar body supports that rotate in similar direction and opposite elevation to one another. A rotating means will move body supports in similar rotation and opposite elevation to one another. Preferably, body support rotating means will have two end limits which will hold the body supports in a chair position, one support higher than the other, or in a spine tensioning position, both body supports in near equal elevation. Rotating means may also be fixable so that body supports may be fixed in any rotation or elevation to one another so desired to perform various spine tensioning, traction or developing exercises. These body supports will support the human body with different reactive forces depending on their relative elevations, rotational position and distance from one another.

BRIEF DESCRIPTION OF THE DRAWINGS

FIG. 8 is a side view of the upper body support-connecting block

FIG. 12 is a side view of an alternate support-connecting block.

FIG. 25 load, shear and moment diagrams, of a simple beam with two supports.

FIG. 63 side view alternate upper and lower body support hangers.

FIG. 64 side view alternate upper and lower body support for compression.

FIG. 65 side view alternate upper and lower body support tension.

FIG. 66 side view alternate upper and lower body support rope/rubbers hangers.

FIG. 82 side view of alternate neck support.

FIG. 83 top view of alternate neck support.

FIG. 84 side view of extremity spine exercising.

DESCRIPTION OF THE PREFERRED EMBODIMENT

Figure 1:
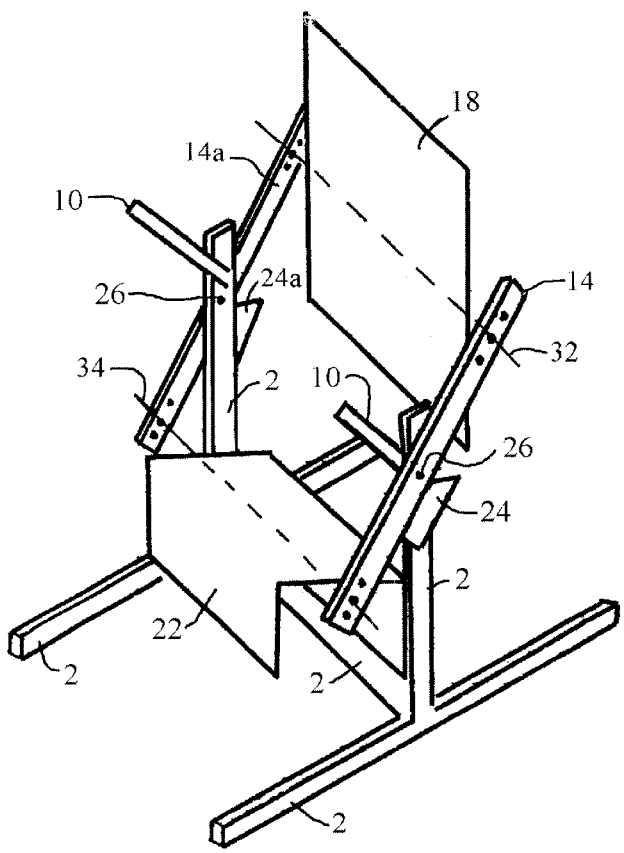
FIG. 1 is a perspective view of the dual body support spine-tensioning chair, an enhanced chair apparatus for sitting and spine developing.

Referring to FIG. 1, the apparatus comprises a base member 2, consisting of two parallel elongated horizontal base members, two vertical risers, and a horizontal base member perpendicular to and connecting the two elongated horizontal base members. Body support elevation arms 14, 14a are elongated members pivotally mounted to base member 2 via pivot connection 26. Dual body supports, 18 and 22, are pivotally mounted to body support elevation arms 14 and 14a via support rods 32 and 34. Hand grips 10 and body support elevation limit blocks 24 and 24a are attached to base member 2.

Figure 2:
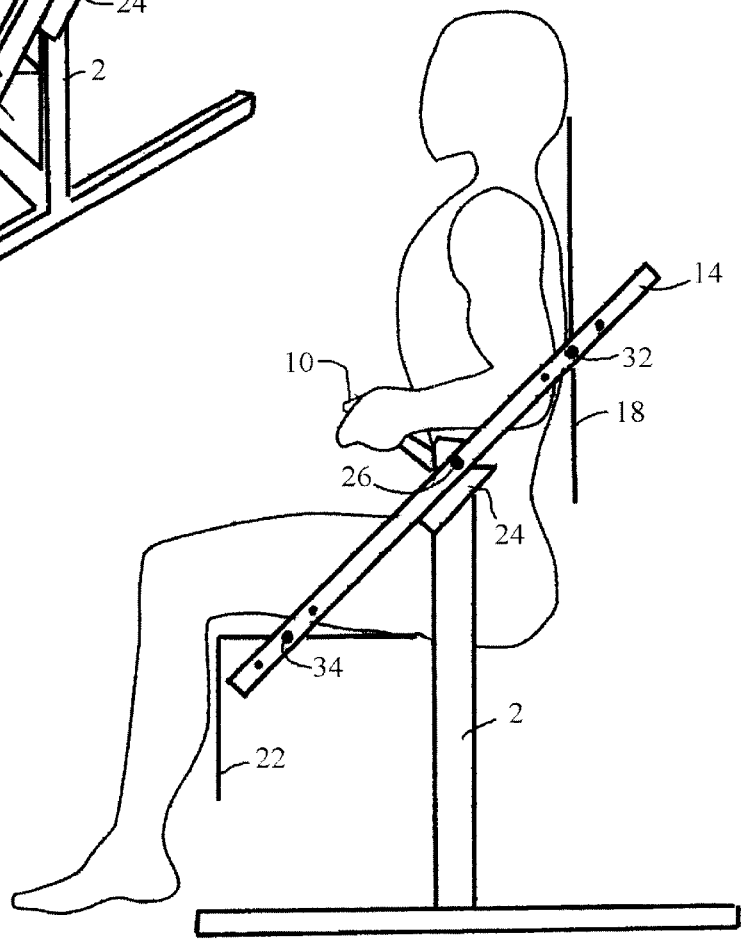
FIG. 2 is a side view of the apparatus with the user in a sitting position, one body support higher than the other.

FIG. 2 shows a user in the sitting position. The elevation of body support 18 is higher than body supports 22 creating a chair or seated position. A fixed, stable seat is created when body support elevation arm 14 rests on body support elevation limit block 24.

Figure 3:
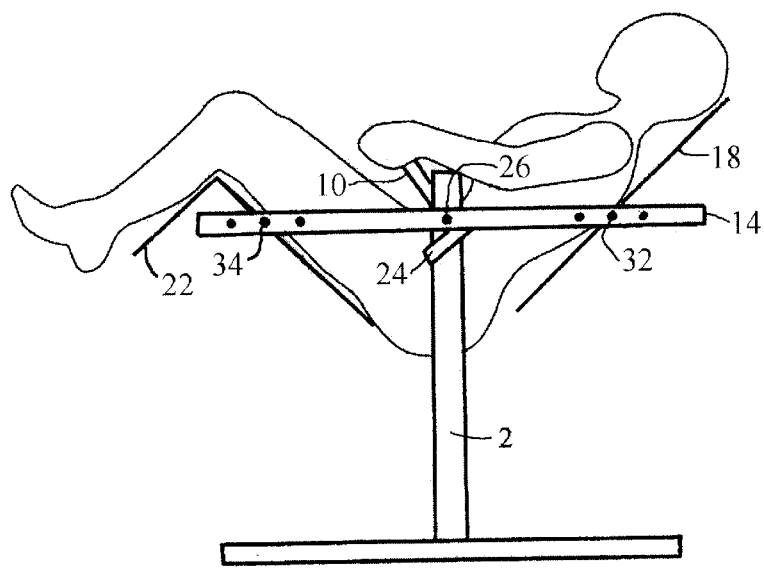
FIG. 3 is a side view of the apparatus with a user in a reclined seated position with body supports near equal in elevation.

FIG. 3 shows the user in the reclined seated position dual body supports at near equal elevation. A fixed, stable, reclined position is the result of body support elevation arm 14 resting on body support elevation arm limit block 24. Hand grip 10 enables the user to change from seated to reclined position via a light force. Pivot 26 is placed near center of body support elevation arm 14, between rods 32, 34 such that body support elevation arm 14 will rest in either the seated or reclined position.

Figure 4:
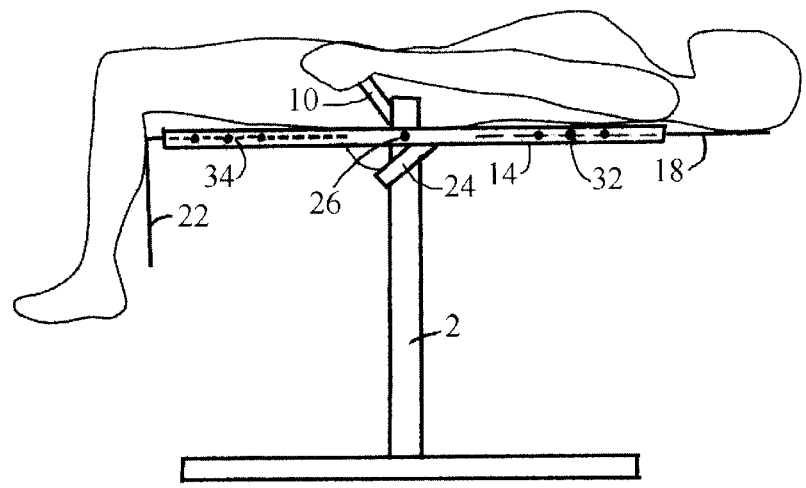
FIG. 4 is a side view of the apparatus with body supports near equal in elevation user in horizontal position.

FIG. 4 shows the user in a horizontal position body supports near equal in elevation. Body supports 18 and 22, pivotally mounted to rod 32 and 34, enable this positioning.

Figure 5:
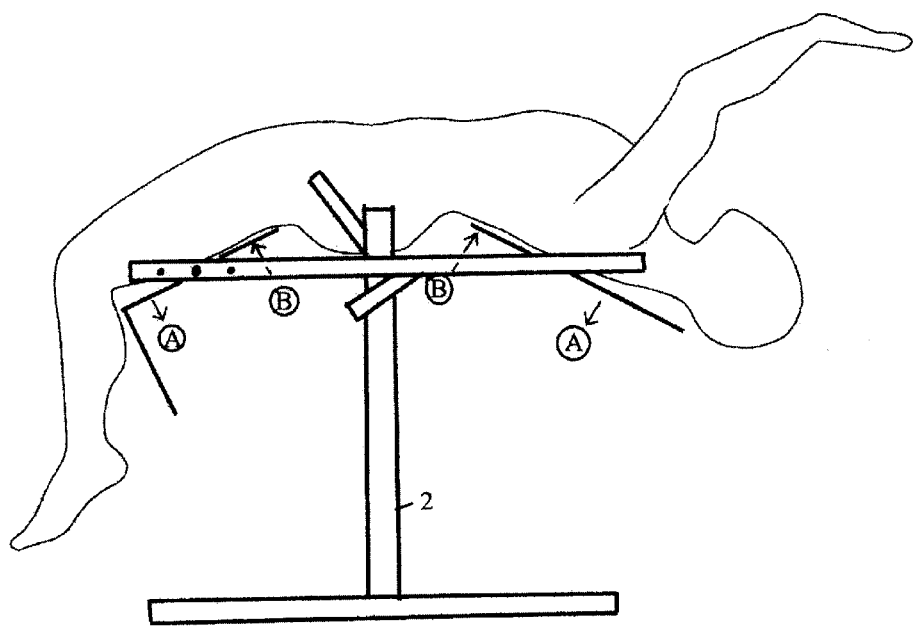
FIG. 5 is a side view of the apparatus with the body supports near equal in elevation user stretching VIA hips elevated face up.

FIG. 5 shows the user enabled to perform gravity assisted inverted stretch with body supports near equal in elevation. The body mass distributed on the A side of body supports creates this gravity assisted stretch by placing an upward force to the mid section of the body via resulting B pivot force.

Figure 6:
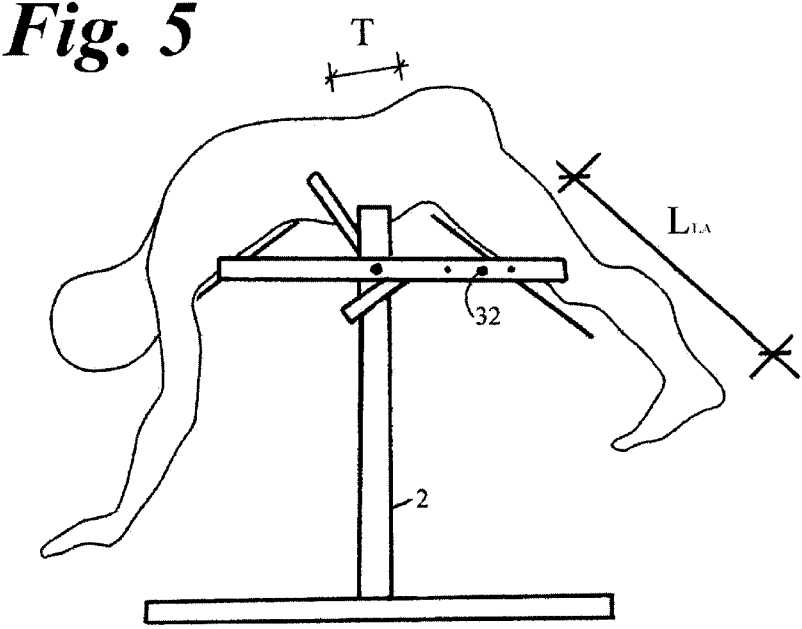
FIG. 6 is a side view of the apparatus with the body supports near equal in elevation user stretching VIA hips elevated face down.

FIG. 6 demonstrates dual body supports, near equal in elevation, user lying face down. The lever arm of users legs L about pivot 32 creates a greater traction force T than is achievable in FIG. 3, user face up. This is because FIG. 3 traction force is not increased via lever arm L of FIG. 6. Additionally, the resulting force T of FIG. 6 is directed to the lumbar portion of the spine where a majority of back discomfort occurs. FIG. 3 on the other hand is gravity induced only.

Figure 7:
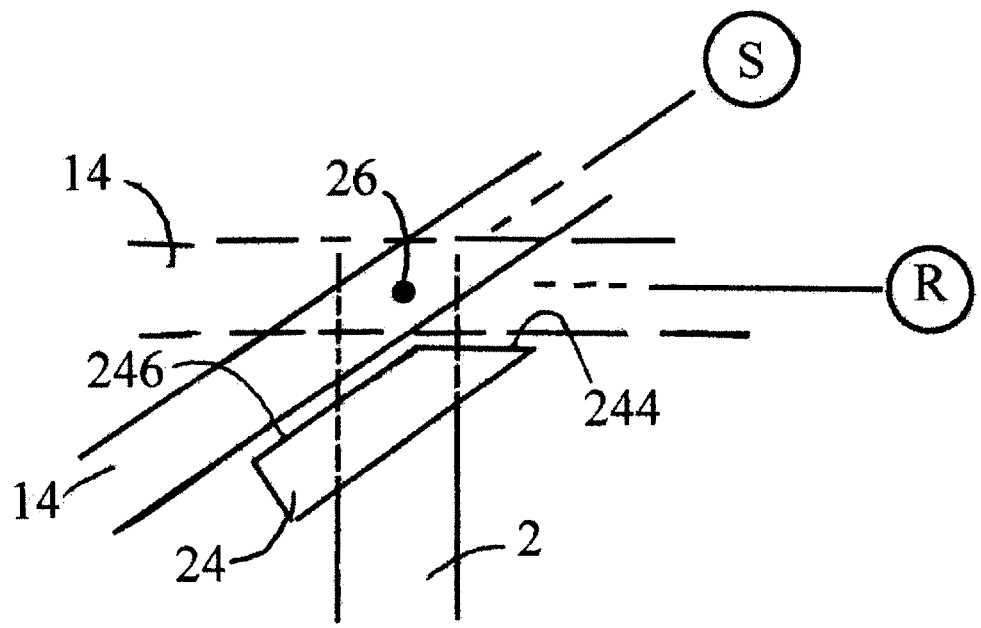
FIG. 7 is an enlarged side view of the body support pivot and elevation limit device.

FIG. 7 shows body support elevation limit block 24 with its two limits: for sitting, 246, and for reclining, 244, that produces a fixed seat position S or fixed reclined position R.

FIG. 8 shows the upper body connecting block 180. with travel range created by void 182 that allows support rod 32 to move freely within void 182. Arm support 184 provides an arm rest that doubles as a means to provide the user a means to counteract the gravity forces that create spine tensioning. Neck rest 186 is pivotal mounted to upper body support VIA pivot 188. Pivot 188 allows 360 degree movement of neck rest support 186. Neck rest 186 has the ability to work in combination with armrest support 184 to match the gravity forces generated when the back support is positioned such that traction/gravity is acting on the upper body. All or half or combinations thereof of the gravity forces acting on the upper body may be countered with these supports.

Figure 9:
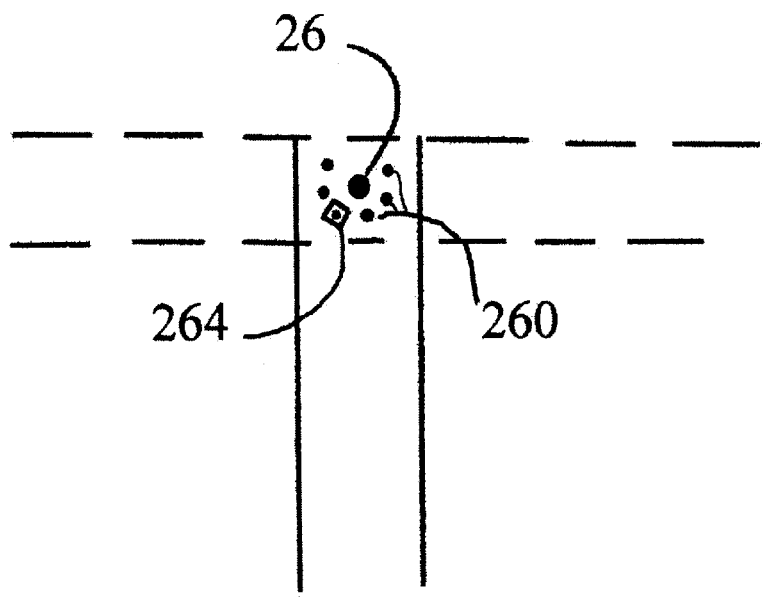
FIG. 9 is an enlarged side view of an alternate body support elevation limit device.

FIG. 9 teaches another means for establishing fixed elevation relationships between the two body supports via limit block 264. This body support elevation relationship block is adjustable through adjustment holes 260 to fix and hold body support elevation arm at any desired body support relationship.

Figure 10:
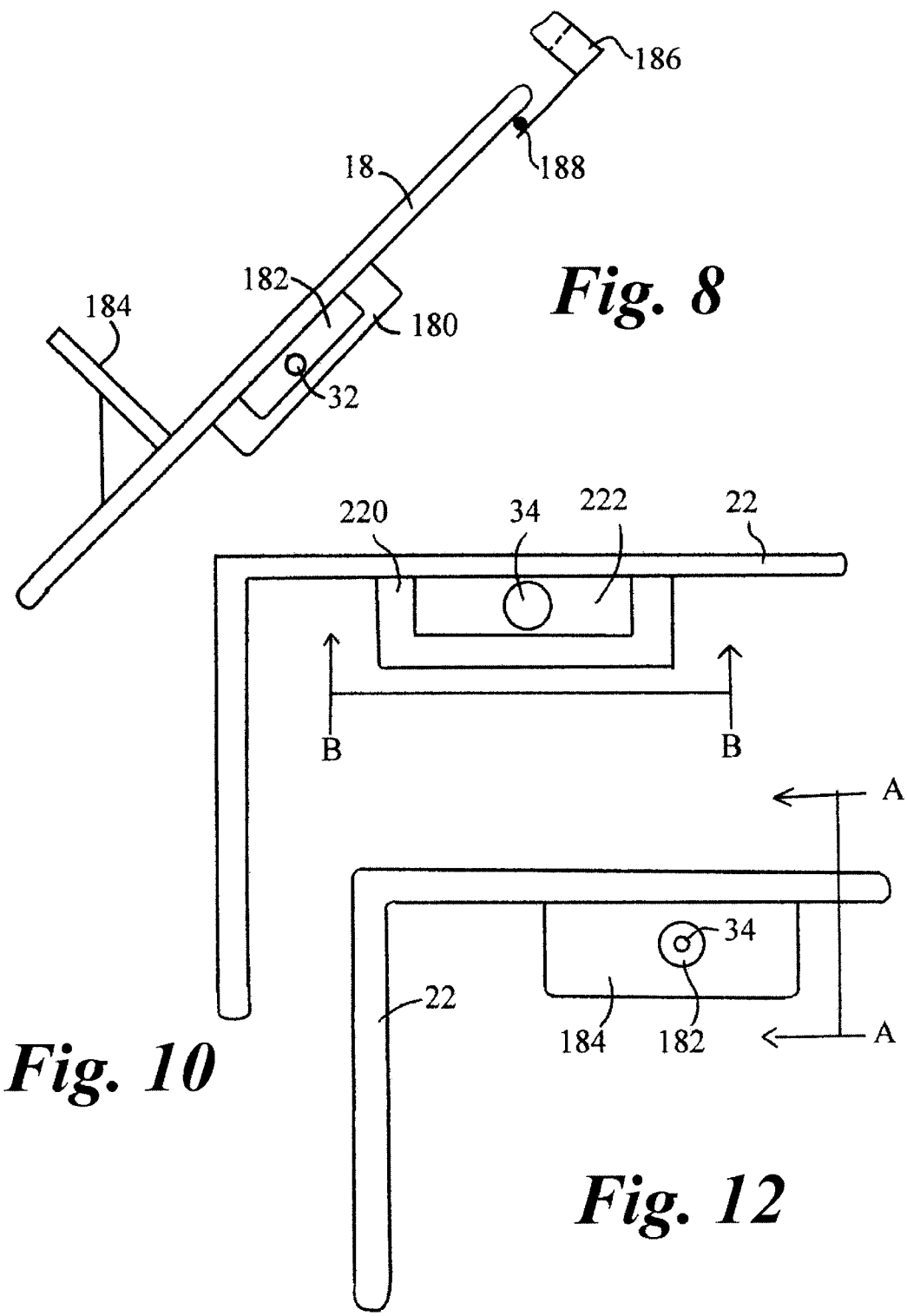
FIG. 10 is a side view of the lower body support-connecting block.

FIG. 10 shows the connecting block 220 with void 222 that allows rod 34 to move freely within the void.

Figure 11:
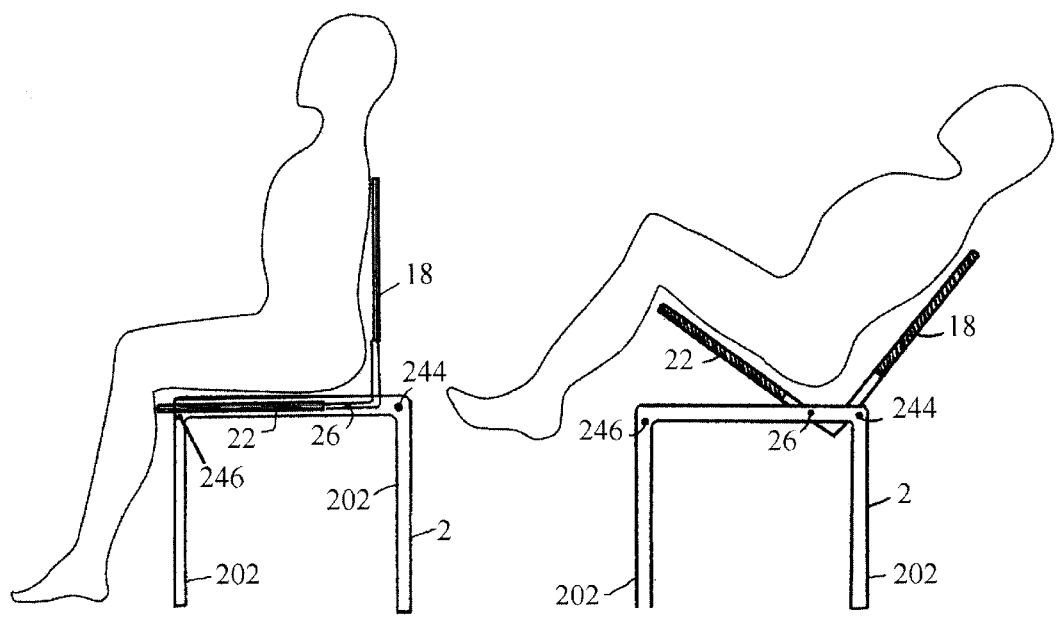
FIG. 11 is a side view of alternate means to achieve and maintain chair and spine tensioning dual body support elevations.
Figure 13:
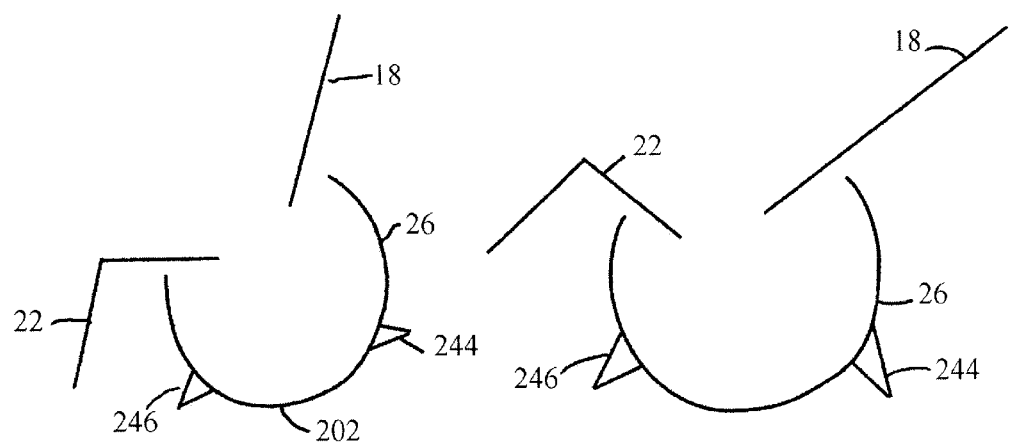
FIG. 13 is a side view of alternate means to achieve and maintain chair and spine tensioning dual body support elevations.
Figure 15:
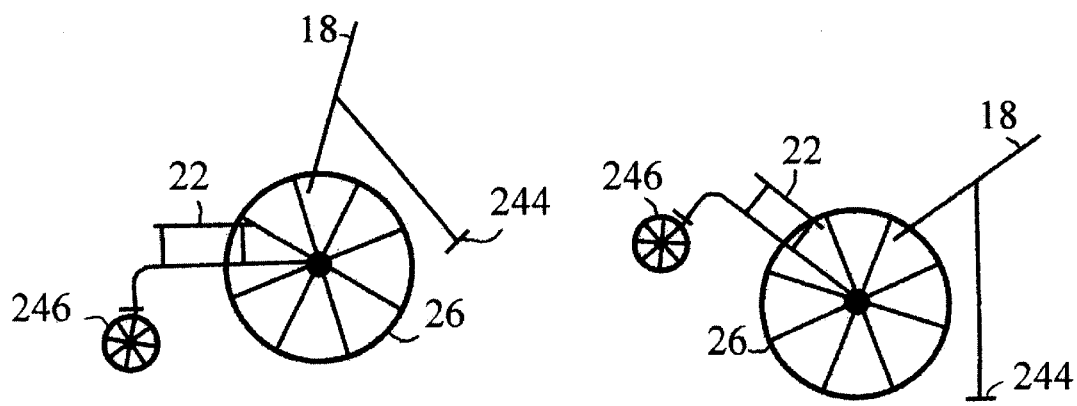
FIG. 15 is a side view of alternate means to achieve and maintain chair and spine tensioning dual body support elevations.
Figure 17:
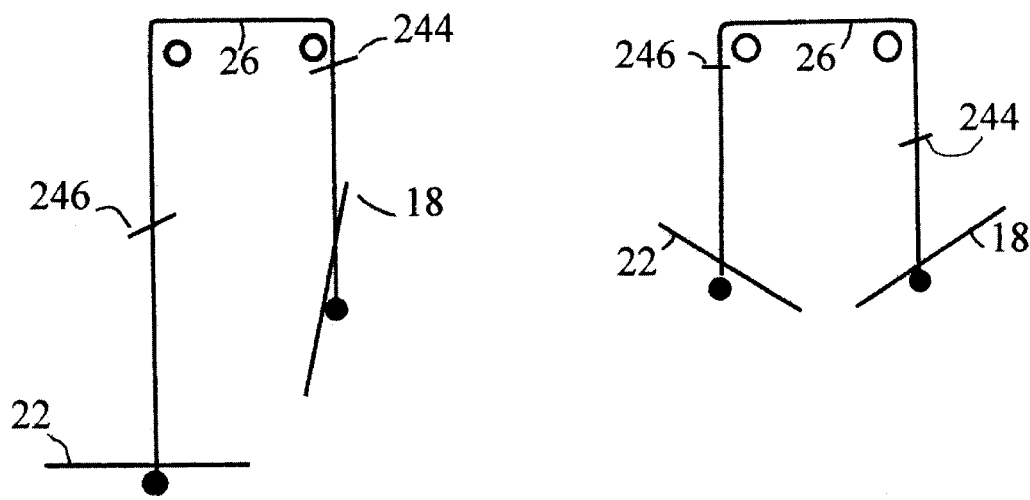
FIG. 17 is a side view of alternate means to achieve and maintain chair and spine tensioning dual body support elevations.

FIGS. 11, 13, 15 and 17 show alternate body support elevation relationship varying means. FIG. 11 is a typical stack able chair consisting of a base 2 with four support risers 202. FIG. 13 is a rocking chair with rounded bottom end 209. FIG. 15 is a wheelchair. FIG. 17 utilizes ropes supported by rollers above. All above FIGS. 11, 13, 15, 17 utilize dual body supports 18, 22 and a form of the body support elevation relationship varying means 26 and limit blocks, 246 for sitting, and 244 for reclining.

FIG. 12 shows an alternate mounting block that has void 182 that allows leg support 22 to rotate in any direction.

Figure 14:
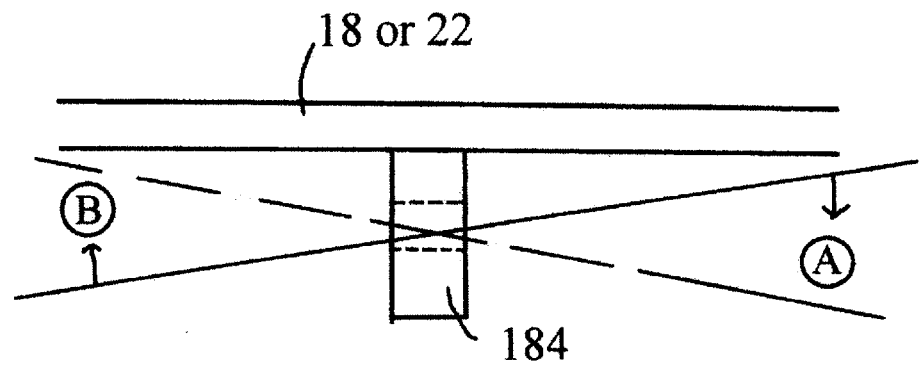
FIG. 14 is section A A of FIG. 12.

FIG. 14 shows the ranges of motion A and B for either upper body support 18 or lower body support 22.

Figure 16:
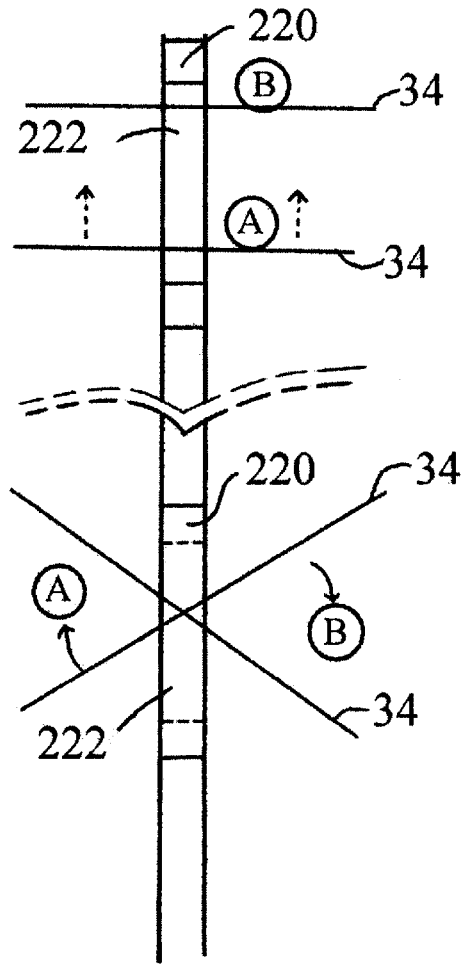
FIG. 16 is section B B of FIG. 10, showing alternate lower body support movements in relation to support rod.

FIG. 16 shows the A and B movements of either upper body support or lower body support in relation to rod 34.

Figure 18:
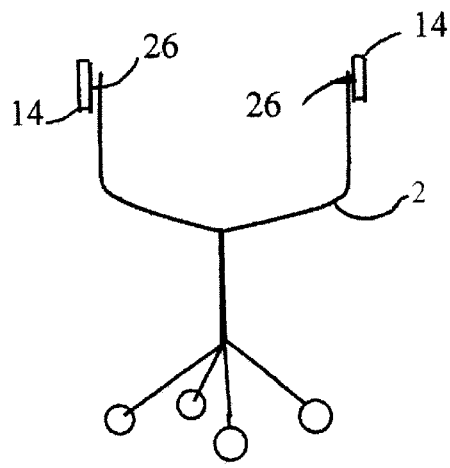
FIG. 18 is front view of office chair spine tensioning dual body support base.
Figure 19:
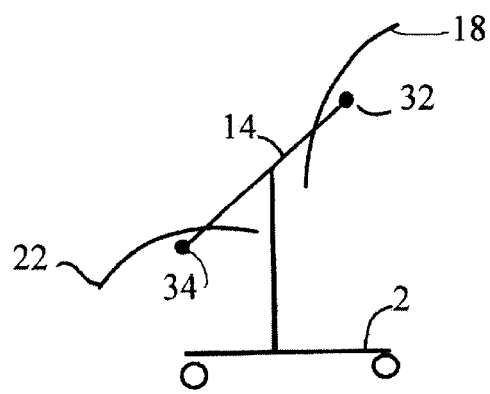
FIG. 19 side view of alternate spine tensioning dual body support chair.
Figure 22:
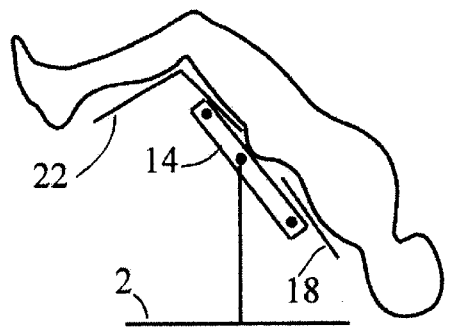
FIG. 22 is a side view of alternate user positioning.
Figure 20:
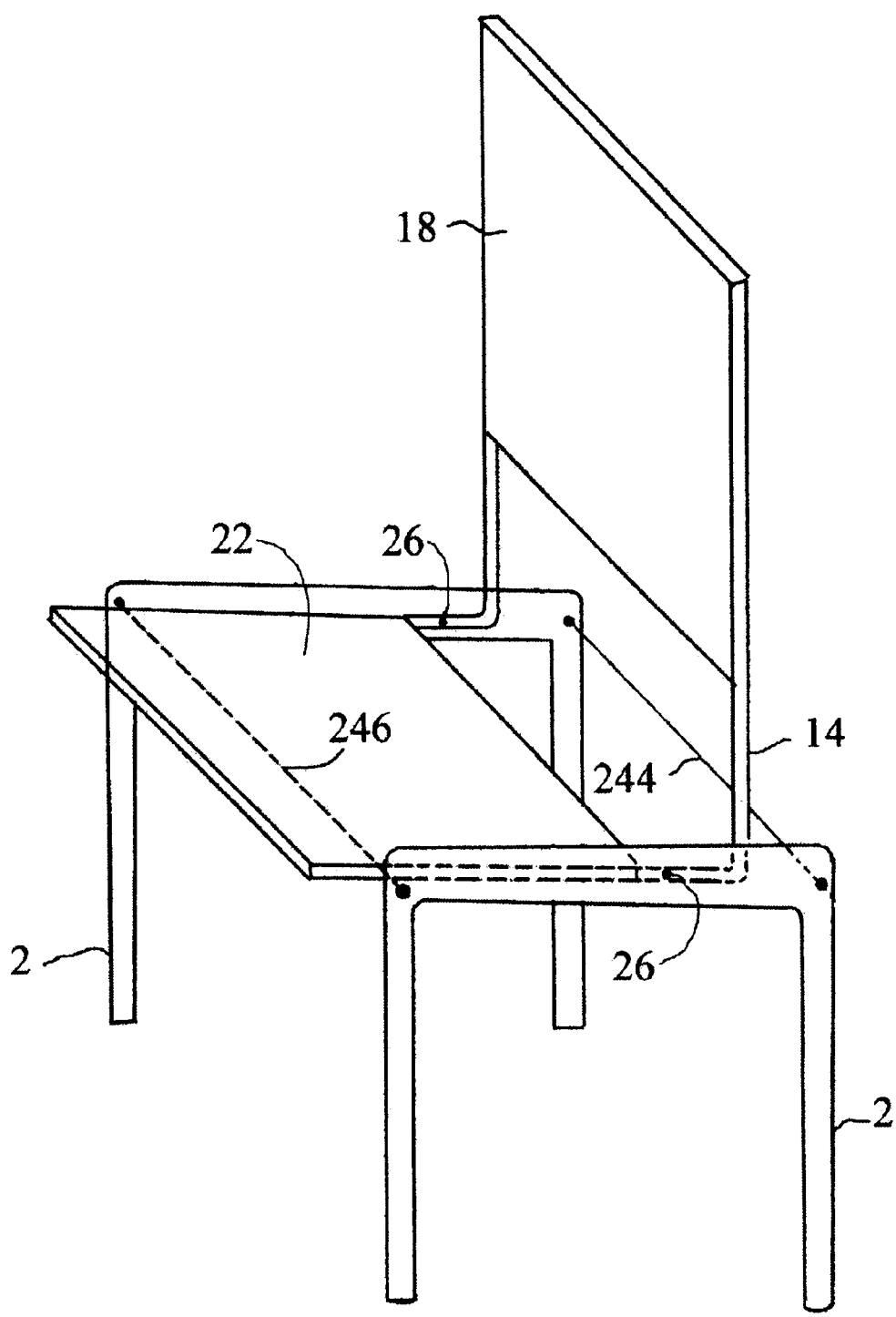
FIG. 20 is a perspective view of the apparatus with alternate base for mounting positioning means.

FIG. 18 shows an office chair base 2 for mounting dual body support elevation arms 14 via pivots 26. FIG. 19 shows alternate dual body supports 18 and 22 that are substantially planar with convex cross section. FIG. 20 shows an alternate enhanced chair for spine developing, tensioning and development. It comprises a base member 2 that consist of two upside down u shaped members that are interconnected and made stable by members 244 and 246 that also serve as limit blocks 246 and 244. Positioning means 14 assumes a 90 degree fixed position as opposed to the elongated members 14 of FIG. 1. Upper body support 18 is fixedly mounted to positioning means 14 canceling the need for rods shown in FIG. 1 as does the fixed lower body support 22 cancel the need for rod 34 shown in FIG. 1. Pivot 26 performs the same function as 26 of FIG. 1 allowing the positioning means 14 to assume either a sitting position or a reclined position in FIG. 11. Alternately upper body support and lower body support could be pivotally mounted in the alternate base mode FIG. 20 to provide the same benefits to the user as taught in FIGS. 4 and 5. Benefits to the user in the alternate base mode FIG. 20 are equal to those taught by FIGS. 3 and 4 with fixed upper and lower body supports as shown in FIG. 22. To gain the benefits of this enhanced chair for aiding the spine one sits in the chair and reclines. By reclining the body weight is distributed over two supports. This places the human spine under the same member forces as a simple beam supported by two vertical forces, it produces tension and compression. The human spine is undoubtedly the most important muscle bone structure in the human body. Chiropractic teaches this and anyone realizes the many functions of the spine. Simply supporting the human body in two different places with the only human link between the supports places the spine subject to any number of forces in any number of directions. It is this placing the human spine as the only human link between the two vertical supporting forces that enables one to practice exercise of the spine.

Figure 21:
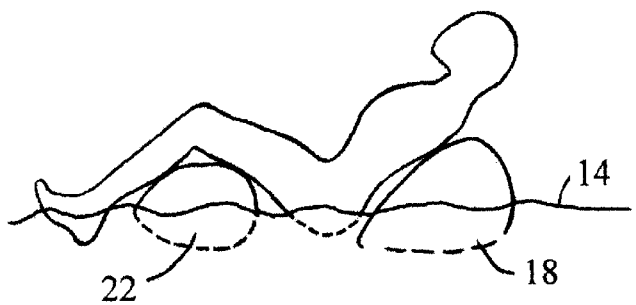
FIG. 21 is water application of dual body support VIA floats.

Referring to FIG. 21, body supports 22 and 18 are shown as floats to be utilized in a pool or body of water to practice another mode of dual body support spine tensioning. The water 14 acts as the dual body support elevation relationship arms 14 of FIG. 2.

Referring to FIG. 22, dual body support elevation relationship arm 14 is set with body support 22 higher than body support 18 to facilitate sit ups and alternate directional forces on the spine.

Figure 23:
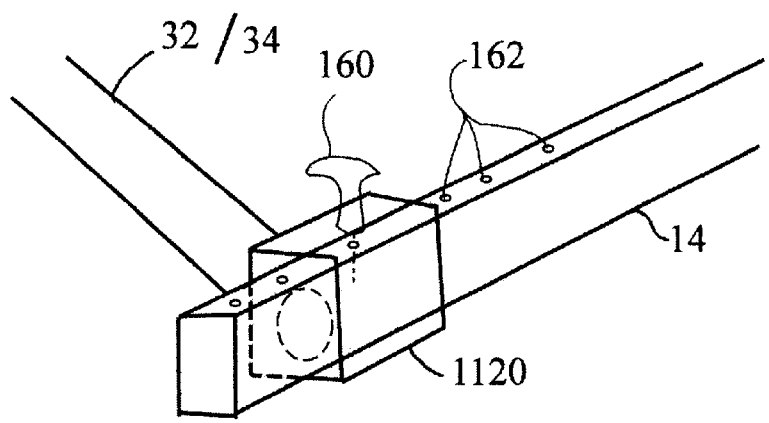
FIG. 23 is a perspective view of alternate attachment of rod to elongated member with sliceable adjustment.

FIG. 23 teaches slide able mounting of rod 32 to arm 14 of FIG. 1 as a preferred alternate. Position is fixed via pin 160 into holes 162 into arm 14. This allows for easy adjustment to accommodate the varying user's height as required. A clamp means would also be applicable here. This connection could also be slide able with user in device to create another exercise range for the device.

Figure 24:
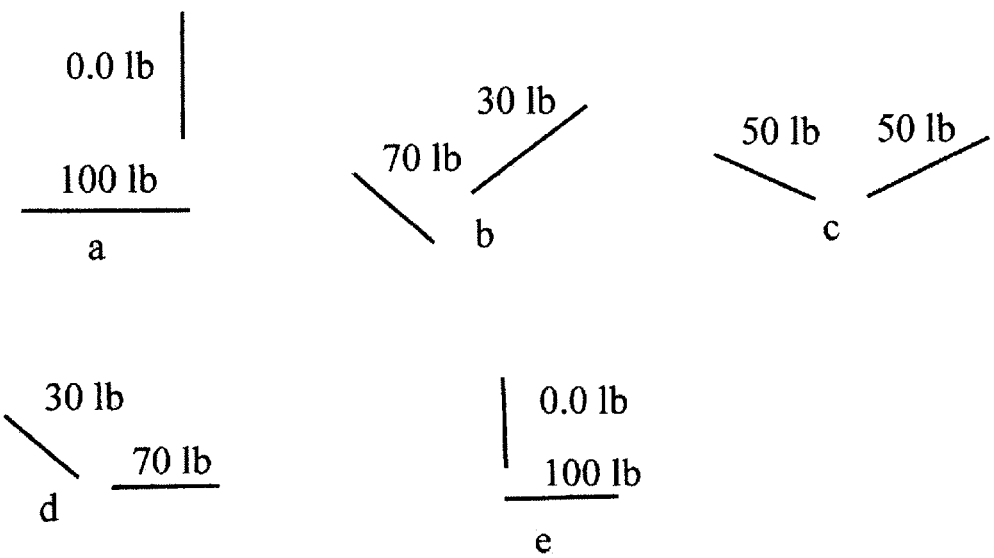
FIG. 24 is a side view of each dual body supports reactive force on a 100-LB. user as body supports rotate and elevation changes occur.

FIG. 24 represents the dual body supports weight transfer from one support to the other as rotation and elevation changes occur. The support locations shown in FIG. 24a depicts the full 100 pound user load on the lower support. In FIG. 24b, the user's load is distributed 70/30 and in FIG. 24c it is 50/50. In FIGS. 24d and e, the user's weight continues to transfer until the full user weight is carried by the body support of FIG. 24a that had no load on it. This, in combination with the moment and shear drawings, is what distinguishes this device from a traditional chair. The dual body supports in this invention can take a user from a seated position and place their body subjected to two forces that are spaced apart and create beneficial forces to the skeletal system.

Referring to FIG. 25, shear and moment diagrams are shown for simple beams with two supports. What is important about these diagrams is the way shear and moment forces change, as a result of supports location change. Body support location changes have similar effect on the user's body and spine. The two supports are created in the Dual Body Support spine-enhancing chair. Varying support locations under a simple beam/user, supported by two supports, creates different shear, moment, compression and tension forces, induced in the supported beam/user. The ability to adjust the dual body supports' horizontal distance from each other, as well as their relative elevation and rotation positioning enables any number of force combinations; compression, tension, shear and moment, to be applied to the spine and skeletal system. This enables the dual body support spine-enhancing chair to increase spinal mobility, flexibility and health through a rotatable dual body support means.

Figure 26:
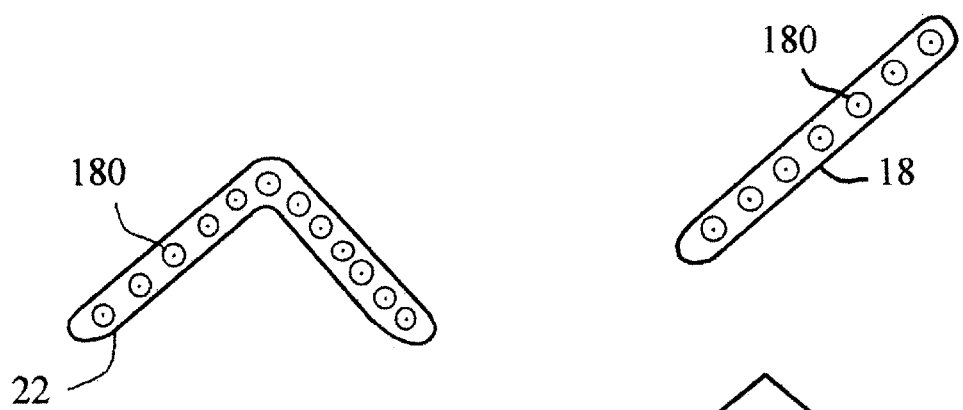
FIG. 26 side view with rollers at upper and lower body support.

FIG. 26 demonstrates an alternate leg and back support that consists of rollers 180 which enables a person to roll and receive greater stimulation from the rollers when sitting in this apparatus.

Figure 27:
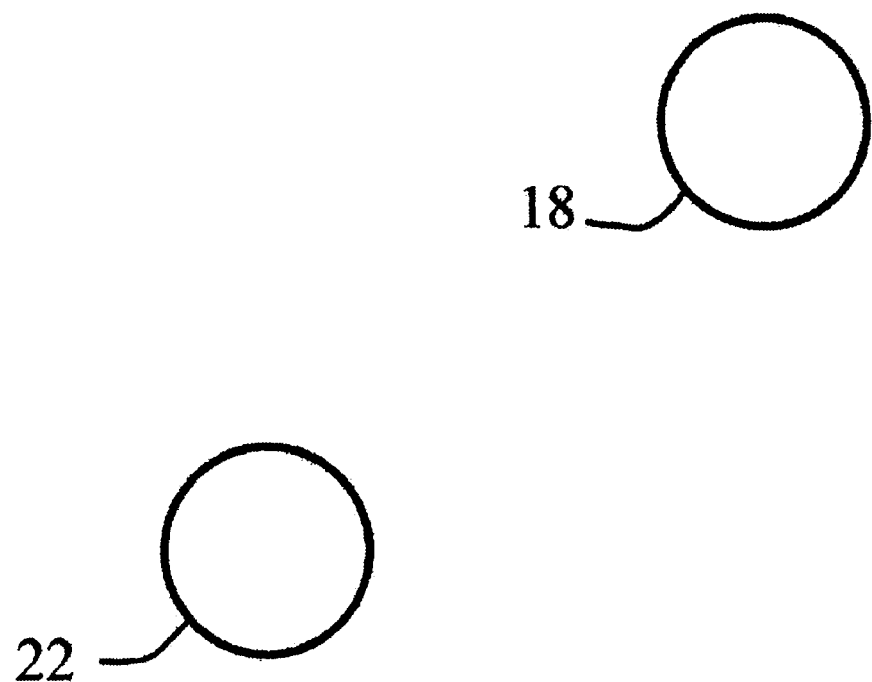
FIG. 27 is a side view of alternate rounded pad body supports.

FIG. 27 is a side view of alternate padded rounded supports.

Figure 28:
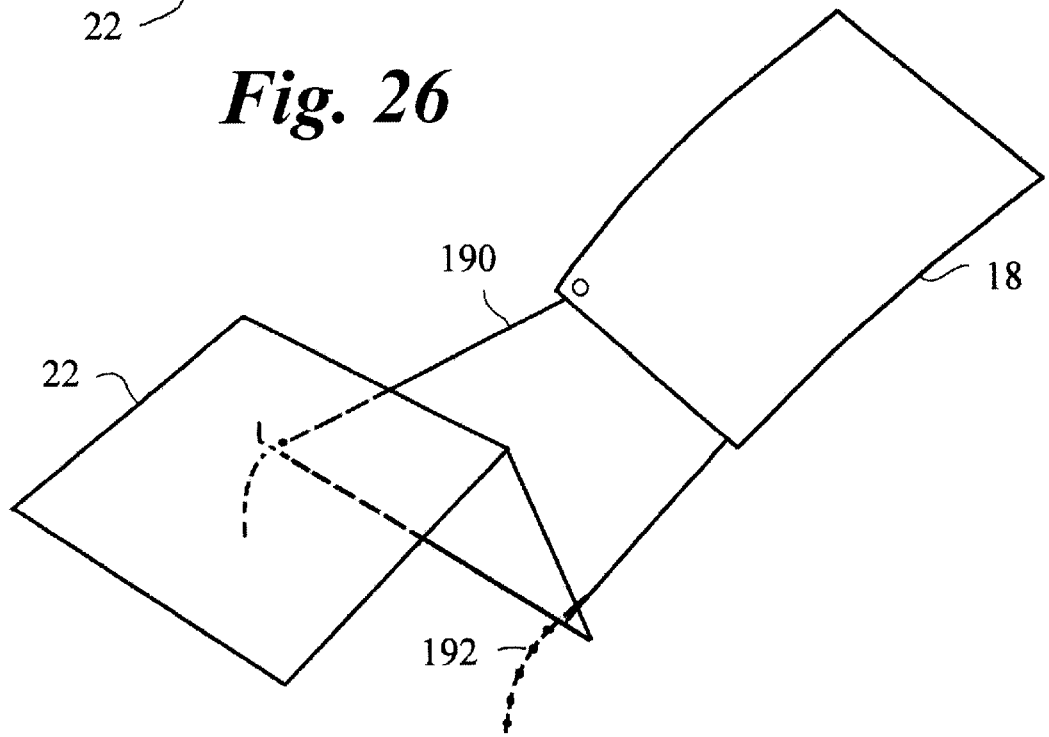
FIG. 28 perspective view with rope between upper and lower body support.

FIG. 28 shows another version of the apparatus where part 190 may serve as a limiting device, which may limit the distance between the back support and leg support. Knots or something similar (like rosary beads) will enable the flexible 190 to fix position on the lower body support 22.

Figure 29:
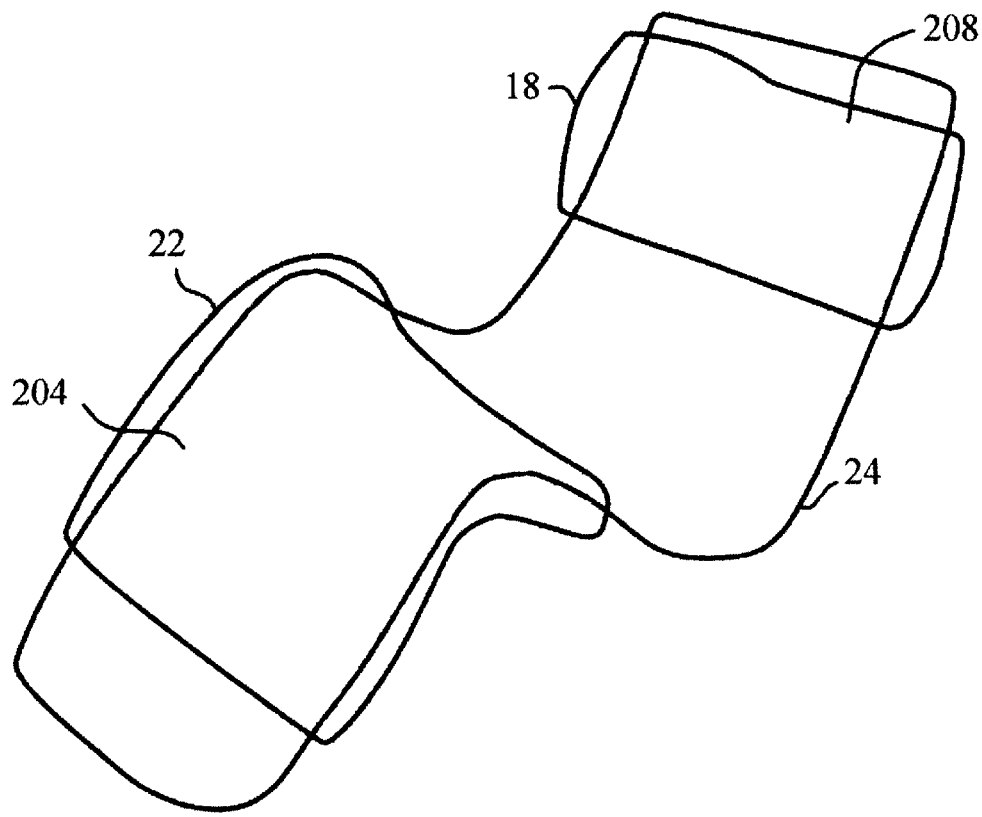
FIG. 29 perspective view of cloth upper and lower body support.

FIG. 29 shows another alternate means of the chair to where the leg support 22 and the back support 18 consists of a canvas type of material stretched around the frame 24 and form leg support 204 and back support 208.

Figure 30:
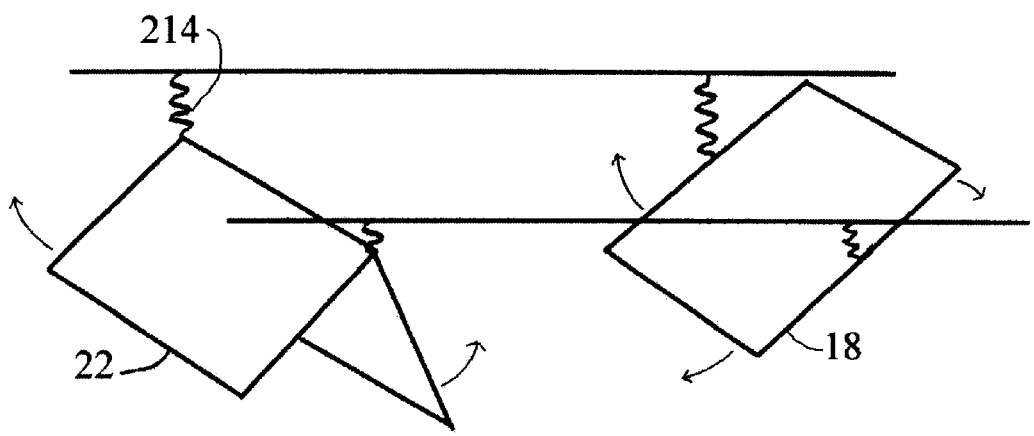
FIG. 30 perspective view of cloth upper and lower body support suspended via rope.

FIG. 30 shows an alternate means of supporting the leg support and the back support via flexible member 214 that will enable the leg support or the back support move in the various ways shown.

Figure 31:
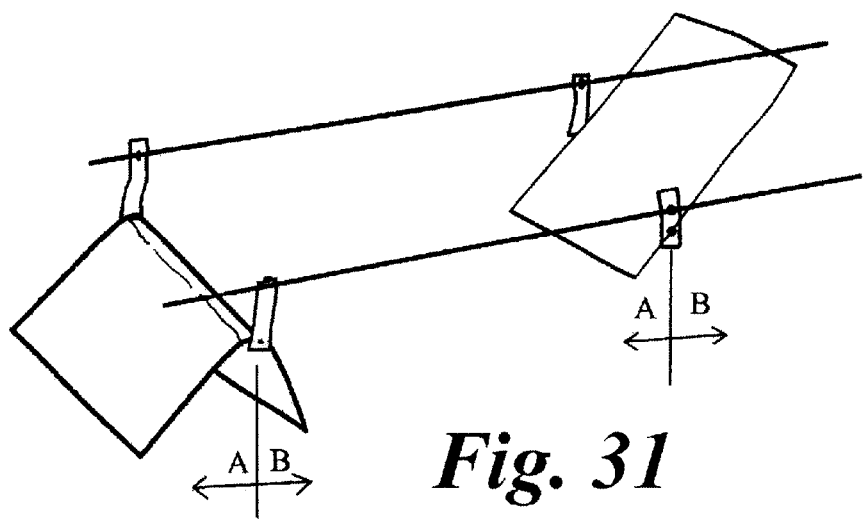
FIG. 31 perspective view of upper and lower body support suspend via metal straps.

FIG. 31 is another alternate means of supporting the body supports 22 and 18 via straps 224 that will enable legs support to move in the A B motion or the back support to move in the A B motion.

Figure 32:
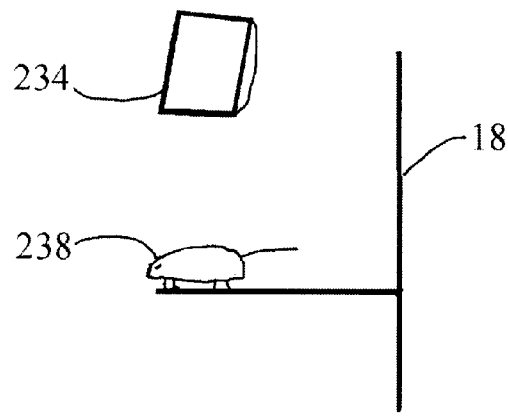
FIG. 32 side view of computer application.

FIG. 32 shows another alternate version of the apparatus in the sitting position, back support 18 equipped with a mouse support 238 also shown is a video screen to 234.

Figure 33:
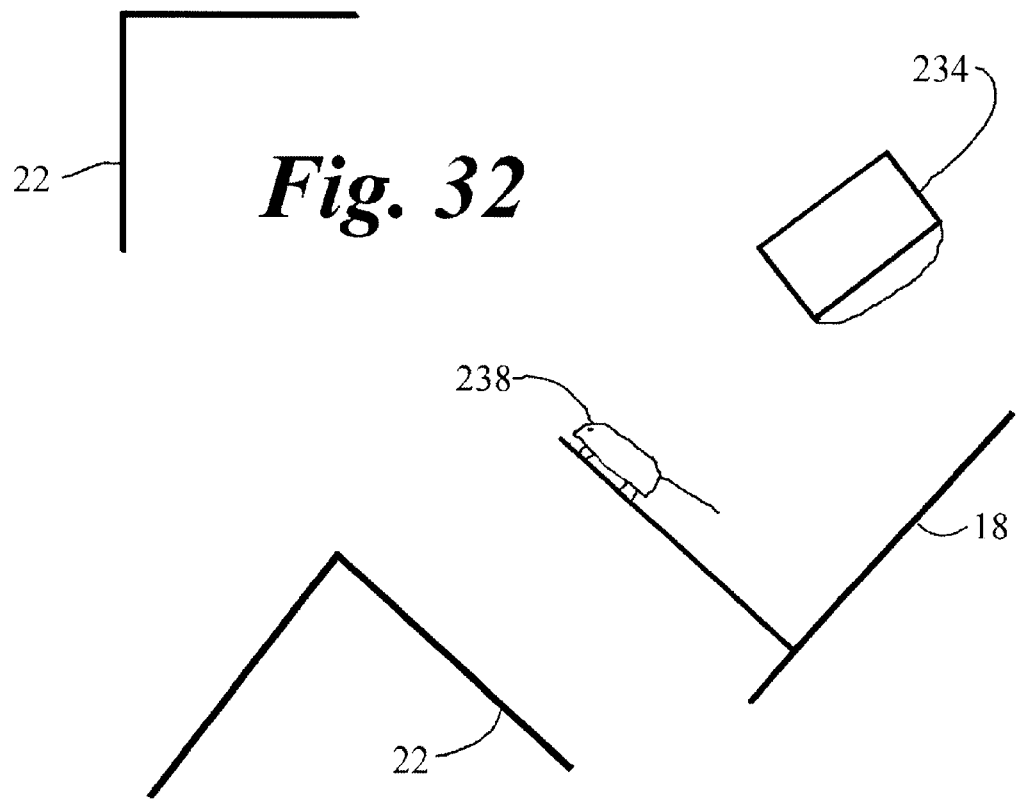
FIG. 33 side view of computer application in reclined position.

FIG. 33 the computer version of the apparatus is shown in the reclined position.

Figure 34:
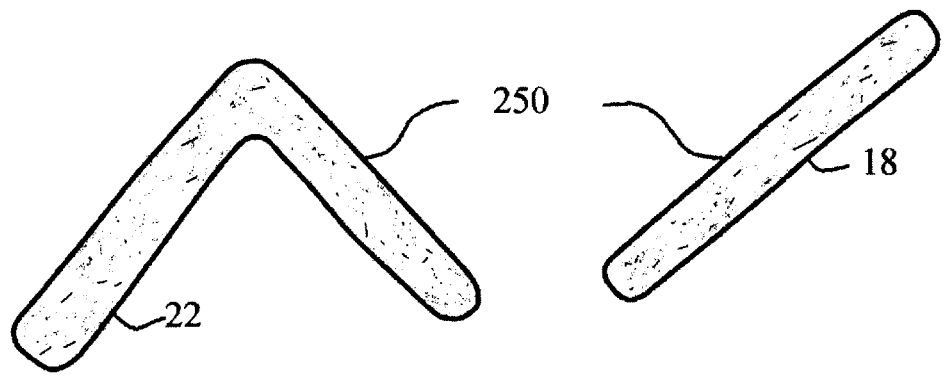
FIG. 34 side view mattress application.

FIG. 34 shows an alternate means for the lower and upper support in which they consist of mattress or cushion 250.

Figure 35:
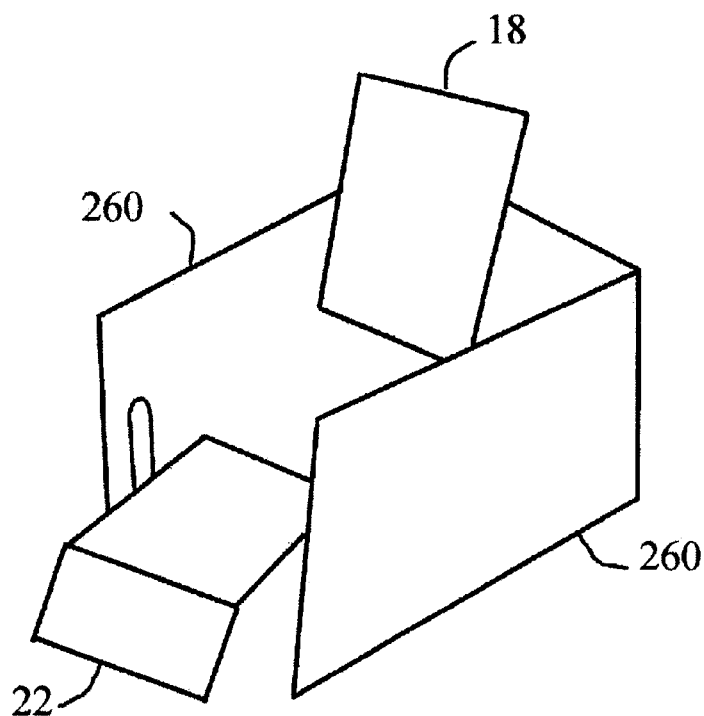
FIG. 35 perspective view of alternate base.

FIG. 35 is a perspective view of the apparatus with the leg support 22 and back support 18 are supported by a substantially rectangular members 260.

Figure 36:
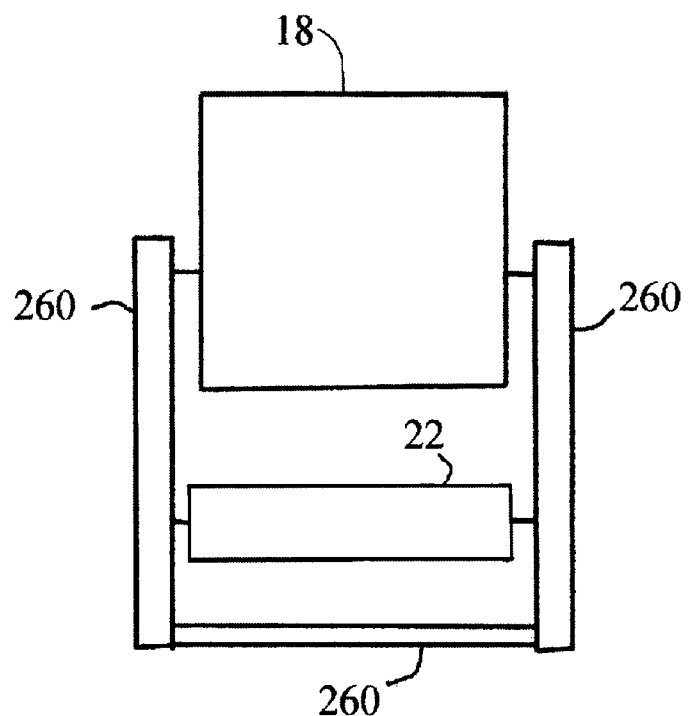
FIG. 36 front view of alternate base Filed.

FIG. 36 the front view of the alternate apparatus shown of FIG. 35 is shown with the substantially rectangular base member 260 and back support 18 and leg support 22. The rectangular members 260 are connected via a horizontal member 260.

Figure 37:
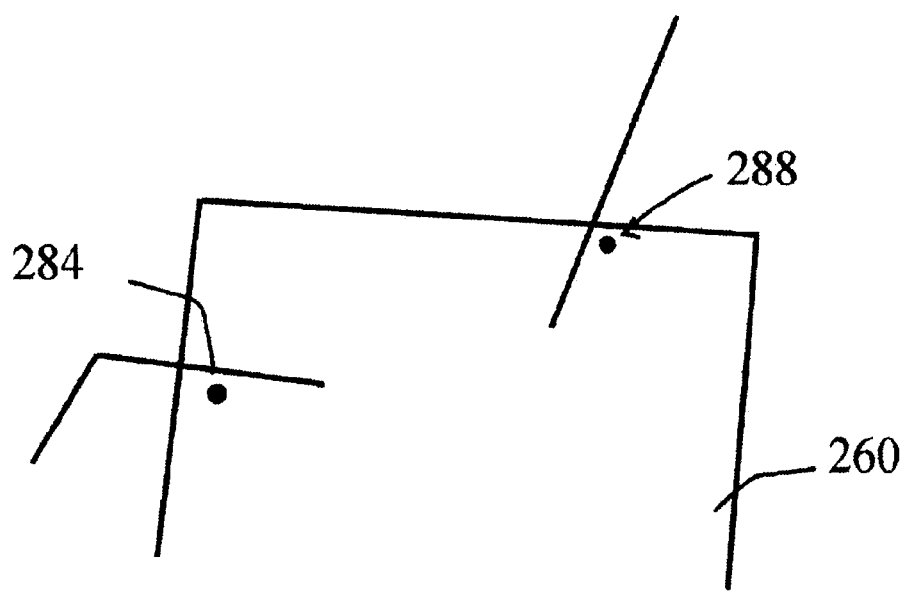
FIG. 37 side view of alternate base.

FIG. 37 is a side view of FIG. 35 in which the pivot for the leg 284 is shown and the pivot for the back 288 is shown connected to the substantial rectangular member 260.

Figure 38:
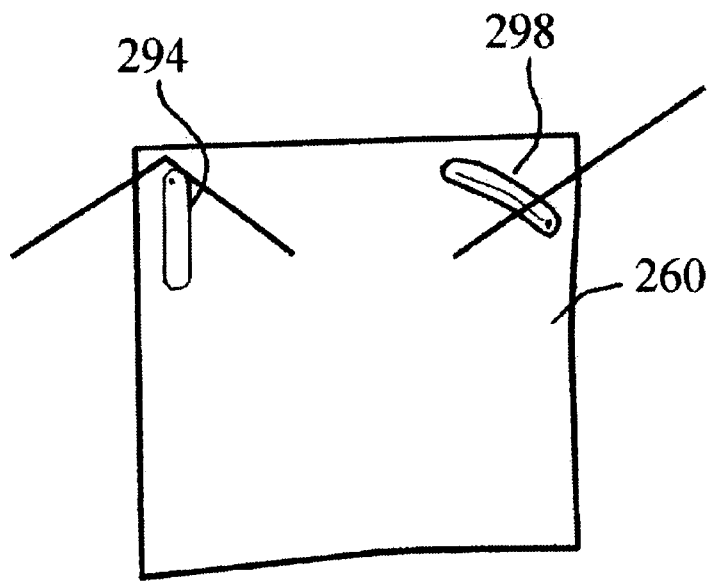
FIG. 38 side view of alternate base in reclined position.

FIG. 38 members 284 and 288 the FIG. 37 are shown able to move within slide 294 for the leg and 298 for the back which will enable the apparatus the sitting and reclined position.

Figure 39:
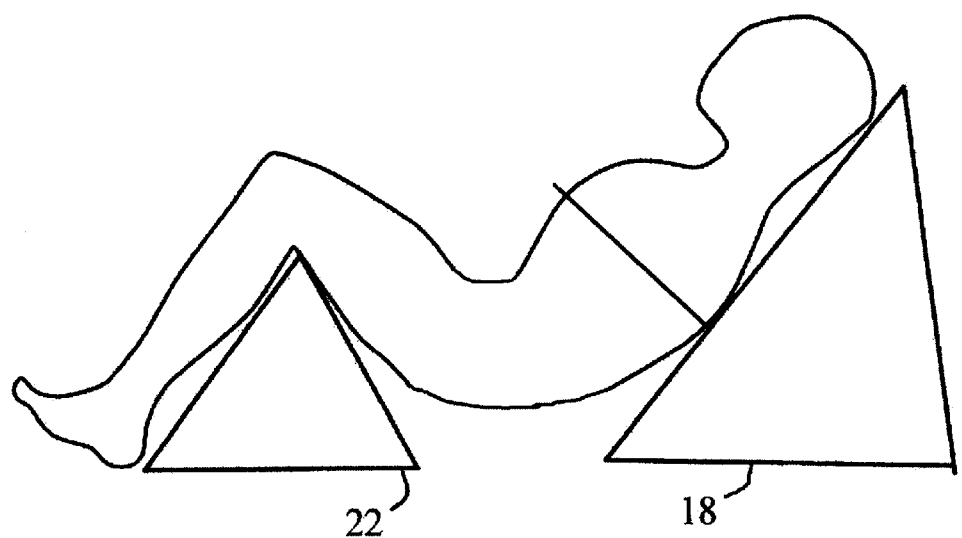
FIG. 39 side view of alternate base.

FIG. 39 shows another alternate version of the apparatus which the leg support 22 and back support 18 maybe mounted on the floor.

Figure 40:
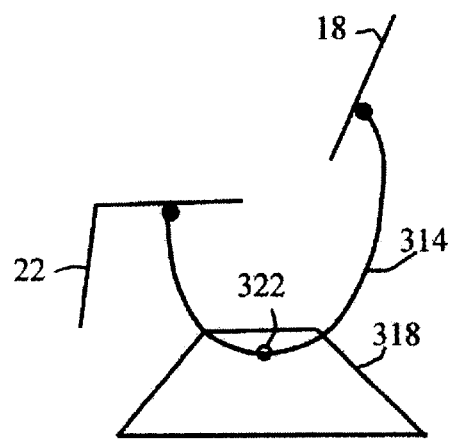
FIG. 40 side view of alternate base.

FIG. 40 is a an exercise apparatus of the device where leg support 22 and back support 18 are connected via semi circular member 314. This member 314 is a pivot connected to the base member 318 via pivot 322.

Figure 41:
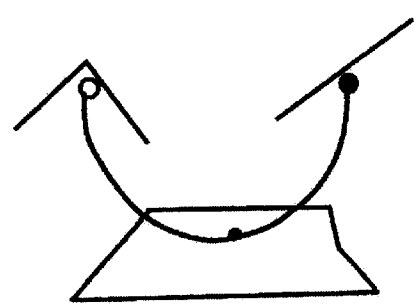
FIG. 41 side view of alternate base in reclined.

FIG. 41 shows reclined position.

Figure 42:
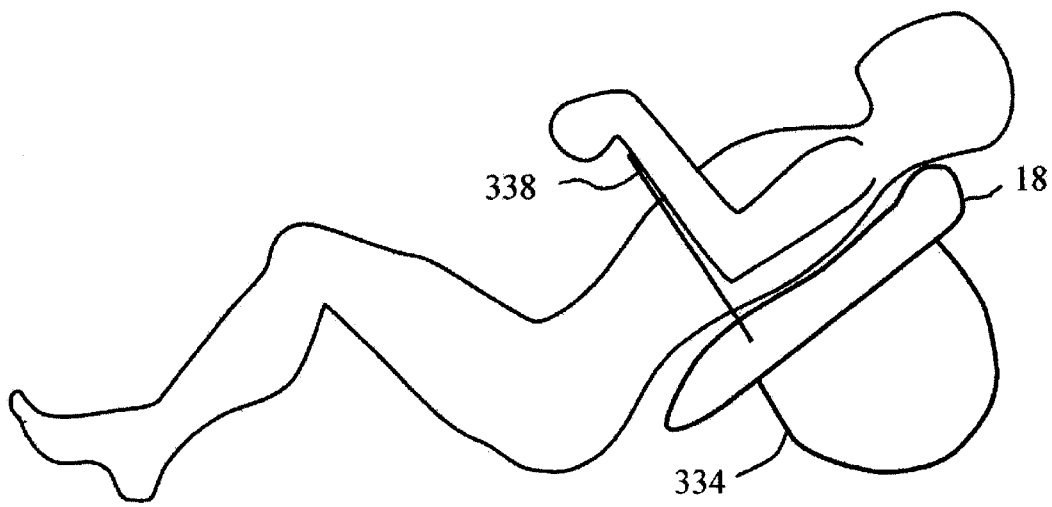
FIG. 42 side view of alternate upper body support.

Referring to FIG. 42, it has round ridged member 334 under upper body support 18 and lower arm grips 338.

Figure 43:
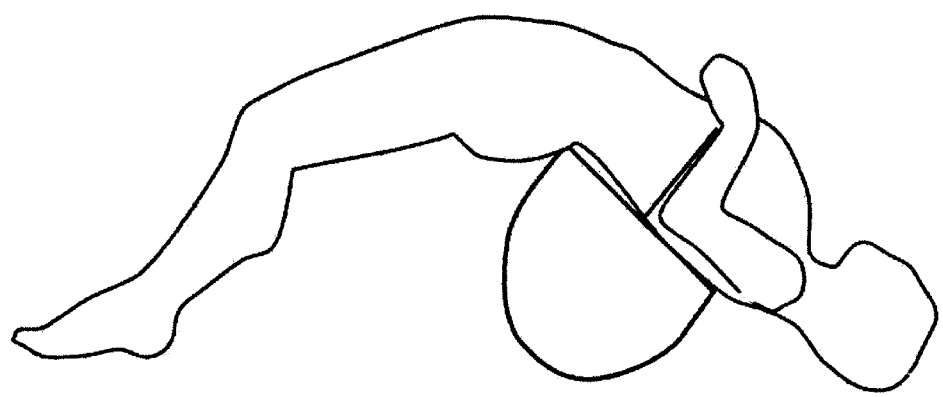
FIG. 43 side view of alternate upper body support in hyper extension mode.

Referring to FIG. 43 the reclined position is shown rocking backwards on number 334.

Figure 44:
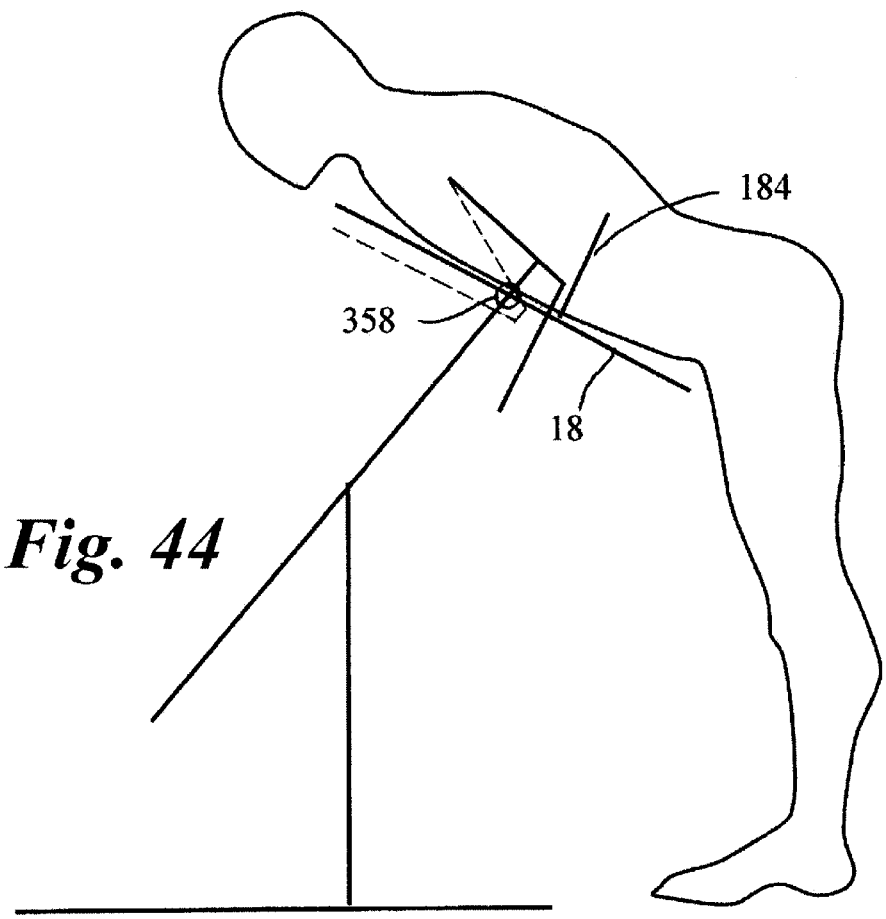
FIG. 44 side view alternate upper body support.

FIG. 44 is a alternate means where user is supported only on the upper body support. Pivot 358 may be set and locked for varying pivot positions or alternate pivot ranges.

Figure 45:
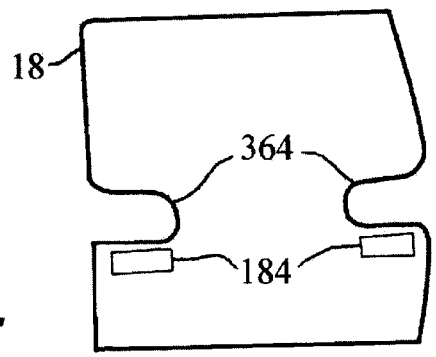
FIG. 45 front view alternate back support.

FIG. 45 is a front view of back support 18 showing arm supports 184 and notches 364 to enable user's arms to pass by back support 18.

Figure 46:
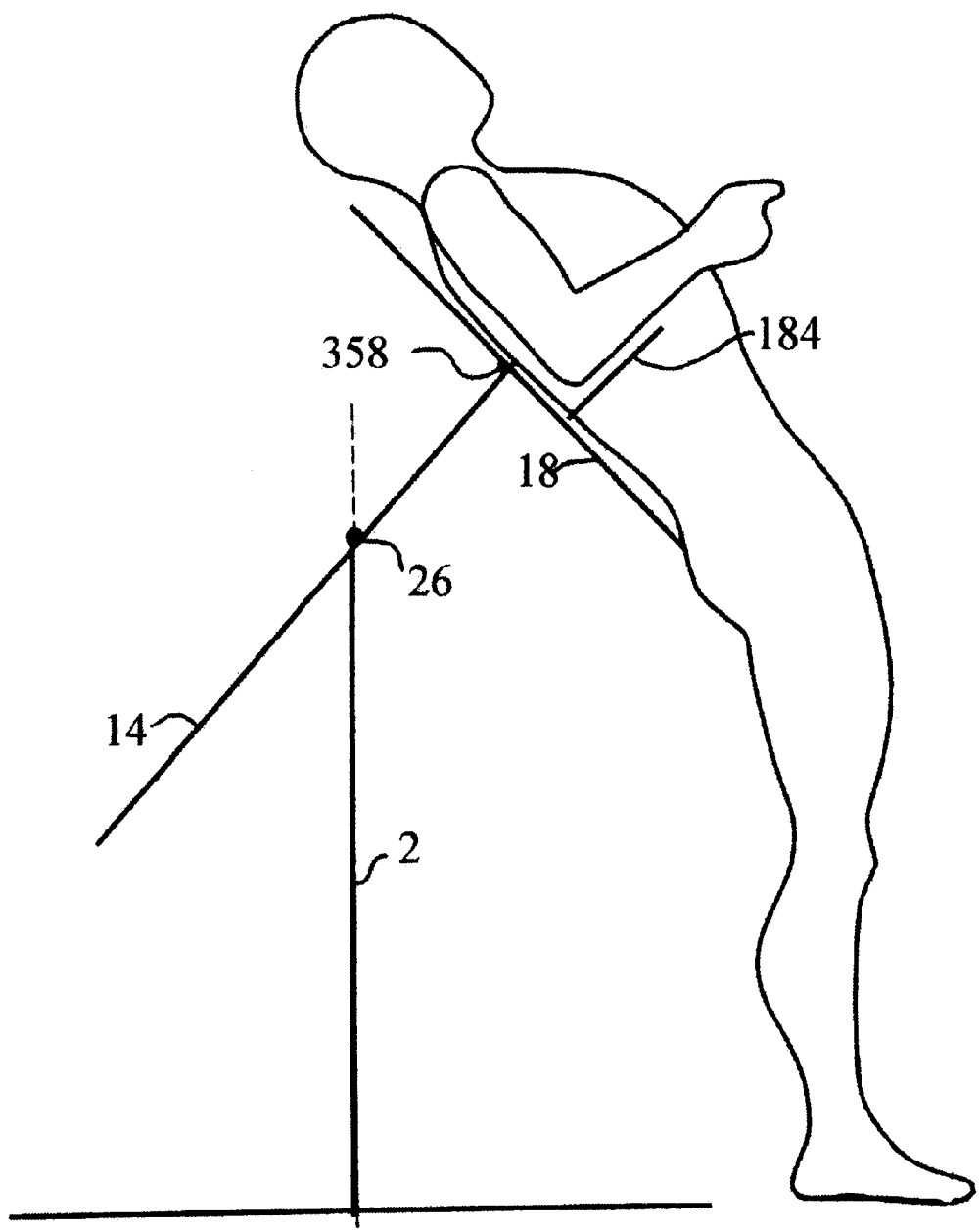
FIG. 46 side view alternate upper back support practiced VIA lower body support.

FIG. 46 alternate means where back support 18 provides upper body support only. 184 can hold user in position pivot 358 may be rotated or fixed in location. Positioning arm 14 is connected to said base member 2 via pivot 26 which is fixable or rotated.

Figure 47:
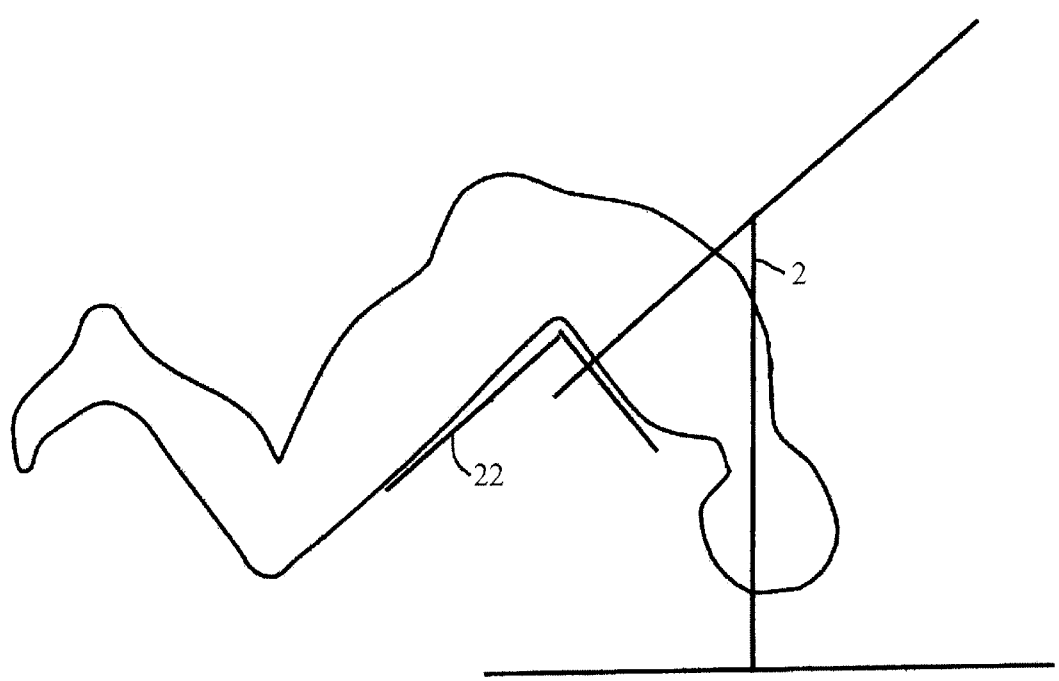
FIG. 47 side view alternate upper body support.

FIG. 47 alternative use is shown, where the user kneels and obtains body support on 2.

Figure 48:
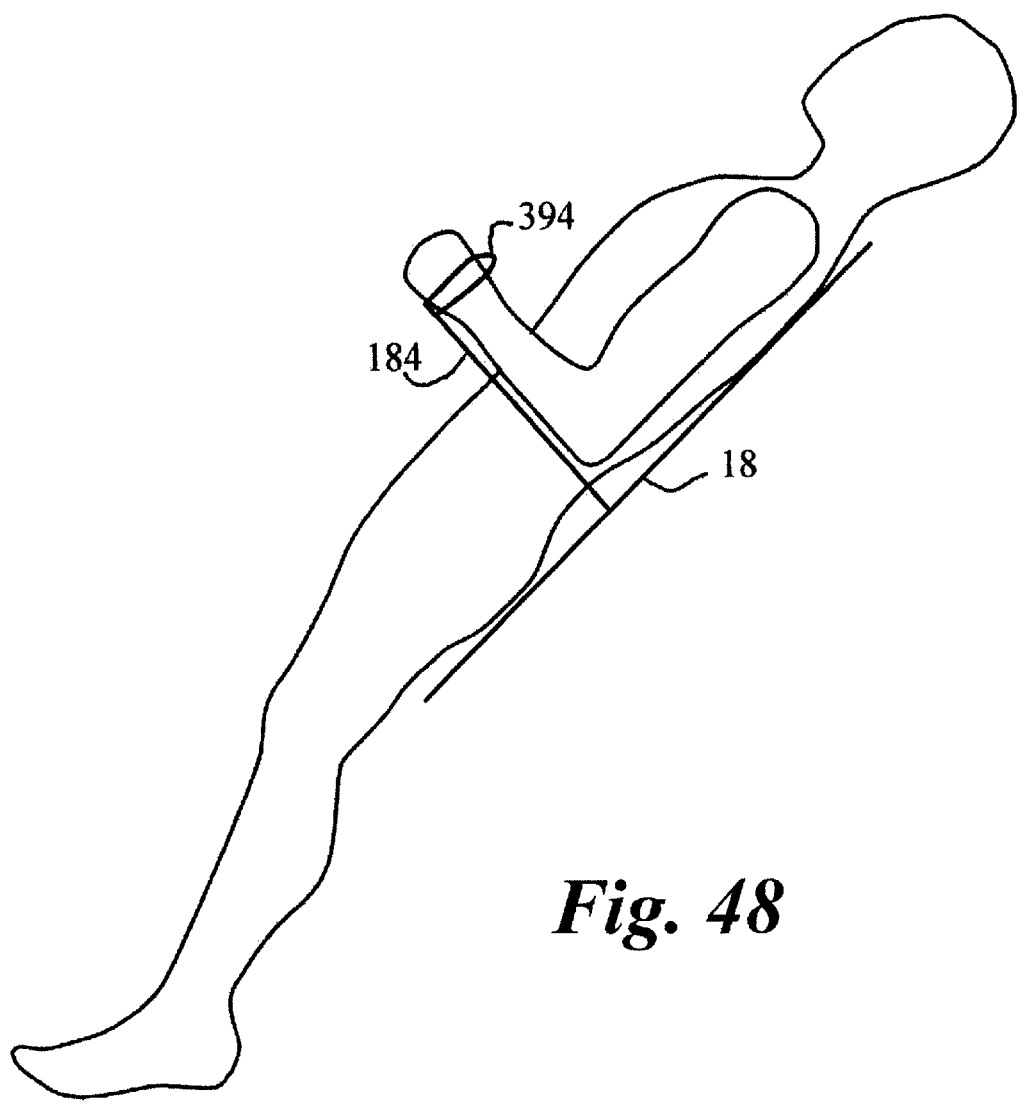
FIG. 48 side view alternate upper body support.

FIG. 48 alternate means of upper body support 18 where 184 arm supports have hand grips attached whereby user may obtain a varying means of skeletal forces.

Figure 49:
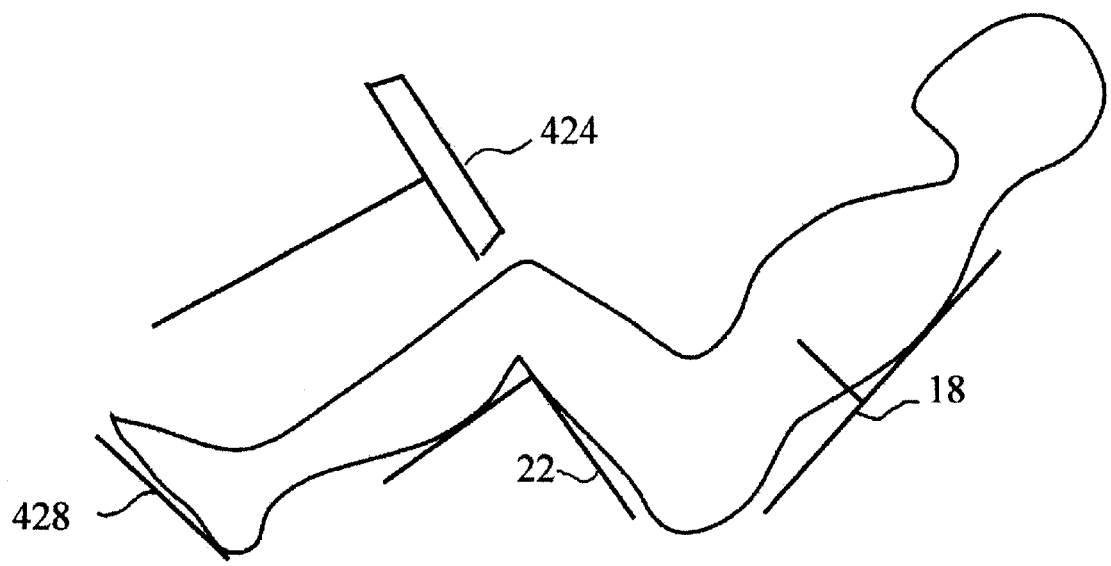
FIG. 49 side view auto application.

FIG. 49 defines the upper and lower back support in motor vehicle operated mode. Supports 22 and 18 are shown, steering wheel 424 and gas pedal 428 are also shown.

Figure 50:
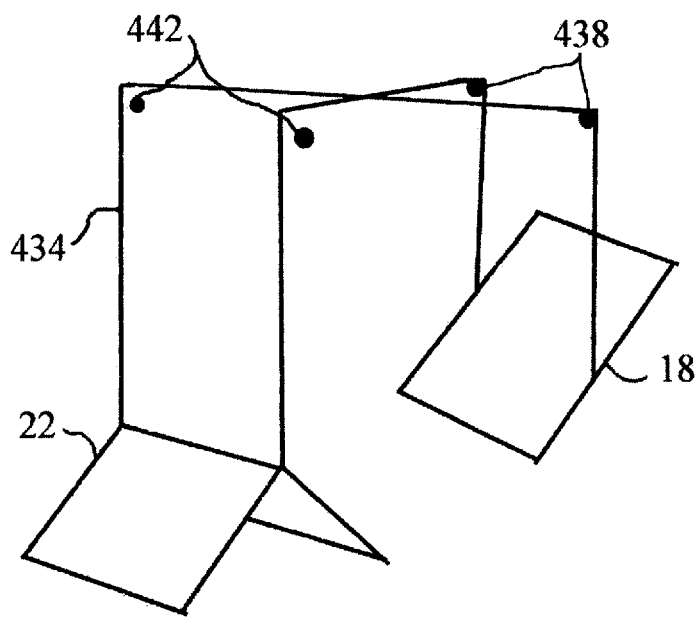
FIG. 50 respective alternate with rope reversibly connected.

FIG. 50 another alternate method where rope 434 of FIG. 43 is shown across 442 and 438 so that reverse horizontal variances are created between 18 upper body support and lower body support 22.

Figure 51:
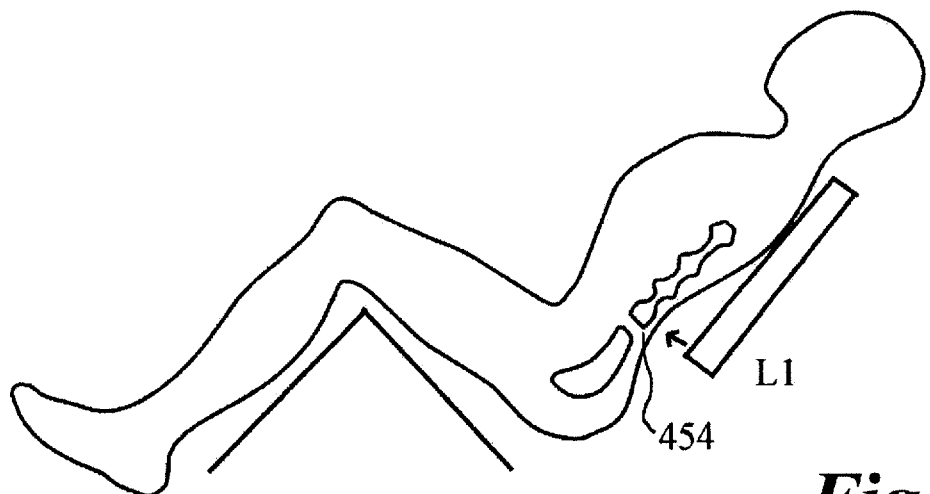
FIG. 51 side view with upper body support positioned to target L1.

FIG. 51 shows alternate positioning of upper body support so its force is discontinued at L1 vertebrae creating force directed specifically on L1 vertebrae.

Figure 52:
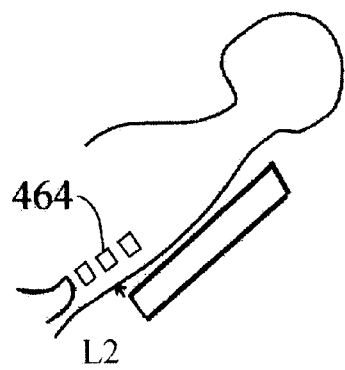
FIG. 52 side view with upper body support positioned to target L2.

FIG. 52 upper body support is positioned to create a force change (support vs. no support) directed at the L2 vertebra.

Figure 53:
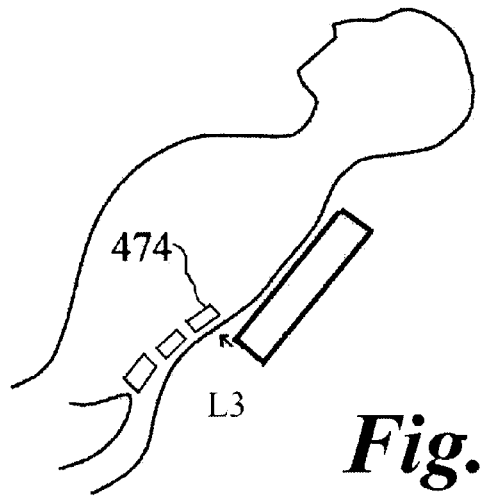
FIG. 53 side view with upper body support positioned to target L3.

FIG. 53 upper body support is positioned to create differing forces on the L3 lumbar.

Figure 54:
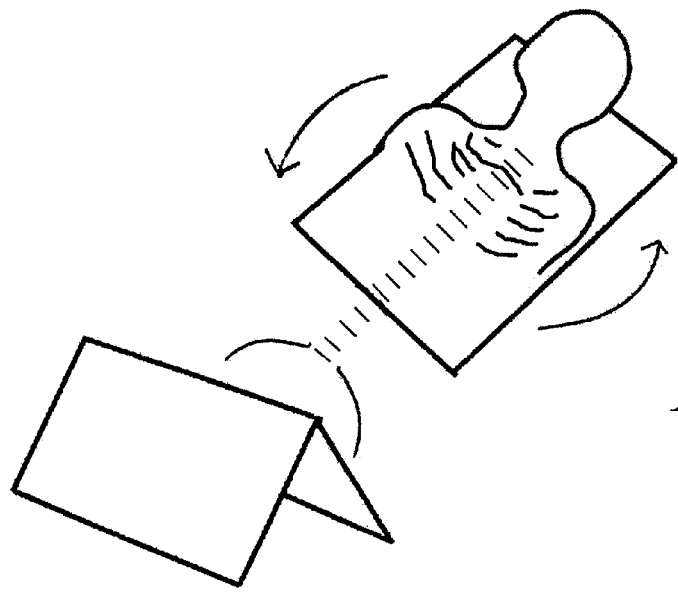
FIG. 54 perspective with rotating upper body support to target thoracic spine.

FIG. 54 rotational movement of upper body support allows user to exercise the thoracic portion of the spine.

Figure 55:
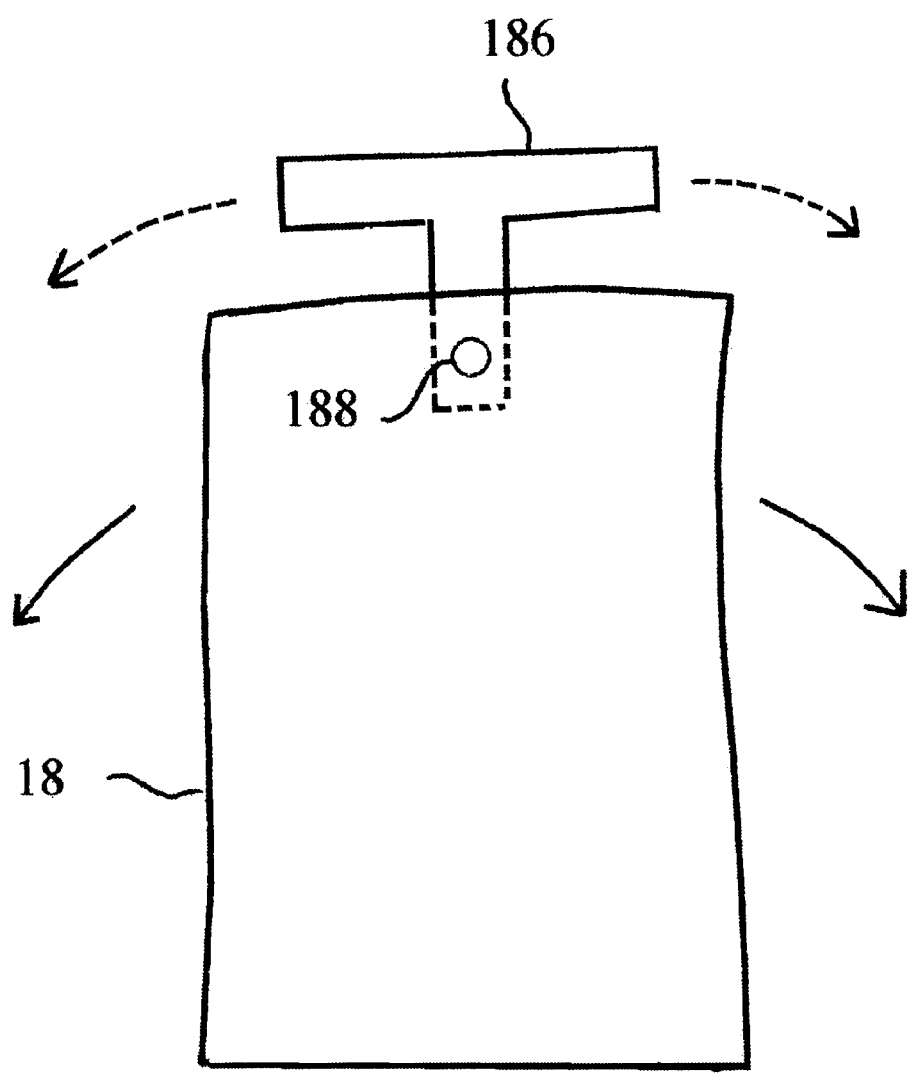
FIG. 55 front view upper body support demonstrating independent or concurrent movement.

FIG. 55 shows the upper body support 18 able to rotate side to side what is beneficial to the users spine is that neck support 186 may rotate in the same and opposite direction of upper body support 18, additionally neck support 186 may operate independently of a fixed upper body support 18.

Figure 56:
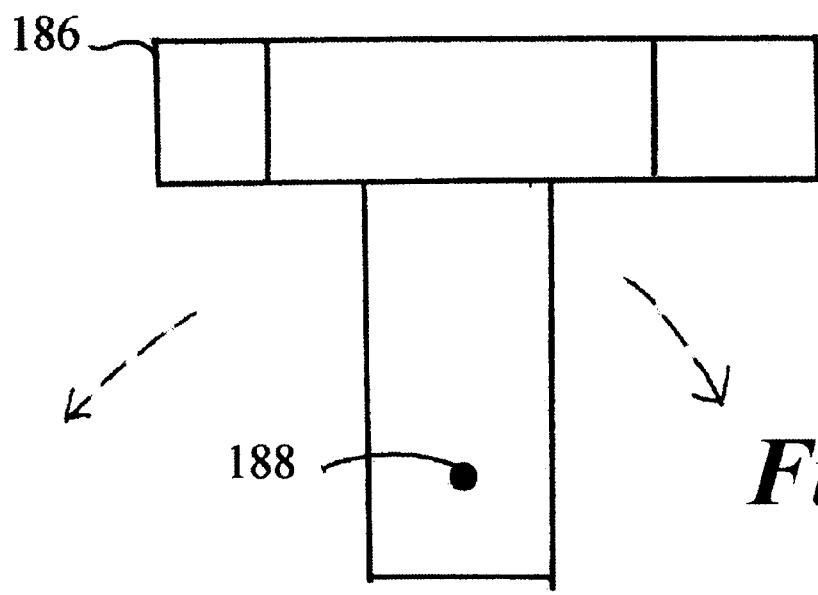
FIG. 56 front view neck support.
Figure 57:
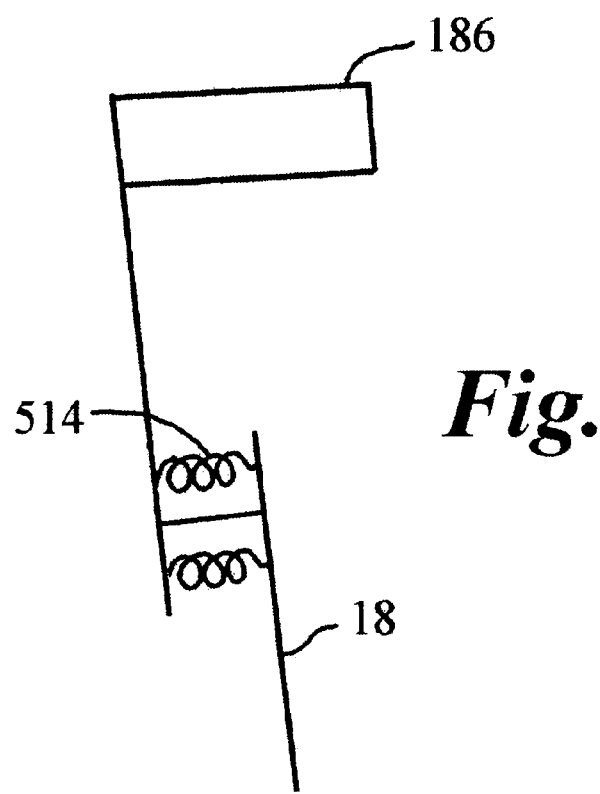
FIG. 57 side view neck support.

Referring to FIG. 56 neck support 186 is shown with pivot 188 that enables neck support 186 to rotate side to side Alternate version of neck support 186 is shown in FIG. 57. It is connected to upper body support 18 via 514 spring or similar means to allow forward backward movement of neck support 186 with resistance.

Figure 58:
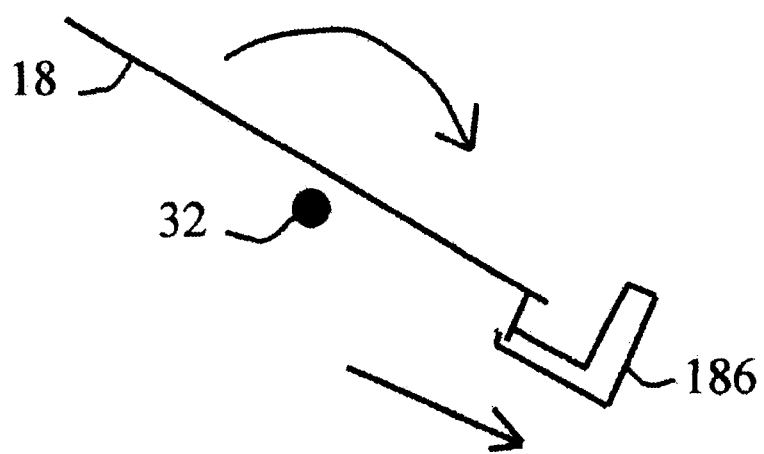
FIG. 58 side view neck support that extends with clockwise movement of upper body support.

FIG. 58 alternate view upper body support 18 is shown where upper body support clockwise rotation creates extension of neck support 186.

Figure 59:
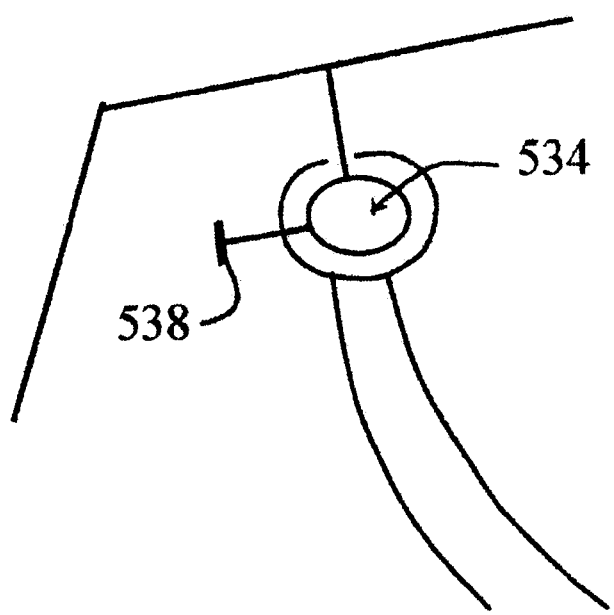
FIG. 59 side view alternate upper or lower body support connection.

Referring to FIG. 59 alternate connection of lower support 22 is achieved via ball joint 534 equipped with tensioning screw 538 that locks ball joint 534 or allows its user lower back support position to be subjected to resistance to movement.

Figure 60:
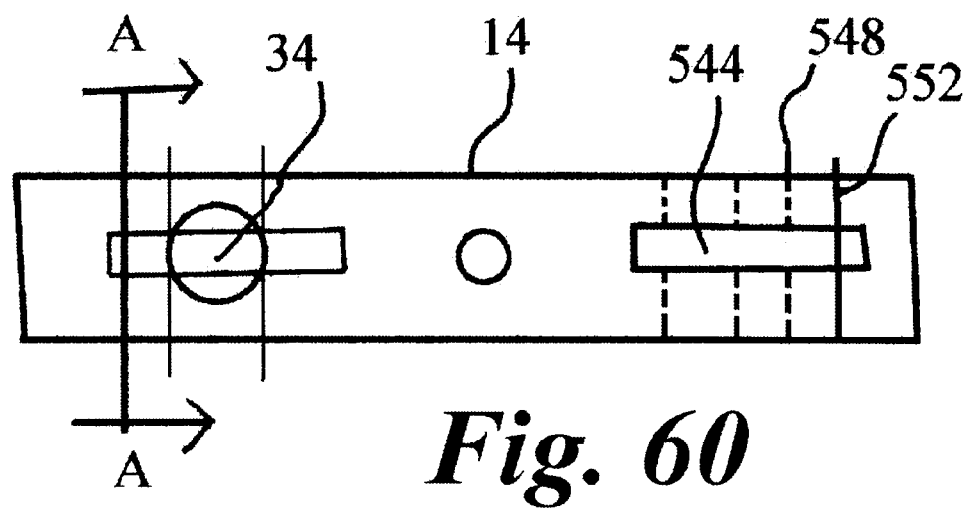
FIG. 60 side view alternate positioning means.

FIG. 60 shows alternate version of positing arms slide 544 enables rod 34 to move within its opening. Pin 552 may limit movement of rod 34 and be adjusted via pin sleeves 548.

Figure 61:
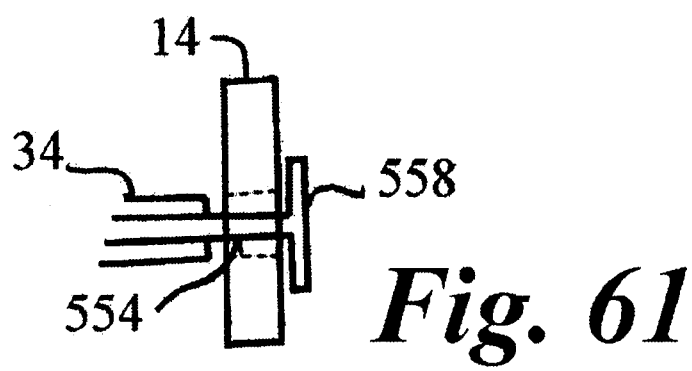
FIG. 61 section AA of FIG. 54.

FIG. 61 is section A—A of FIG. 60. Rod 34 narrowed at 554 and enlarged at 558 provides slide able attachments of rod 34 to positing arms 14.

Figure 62:
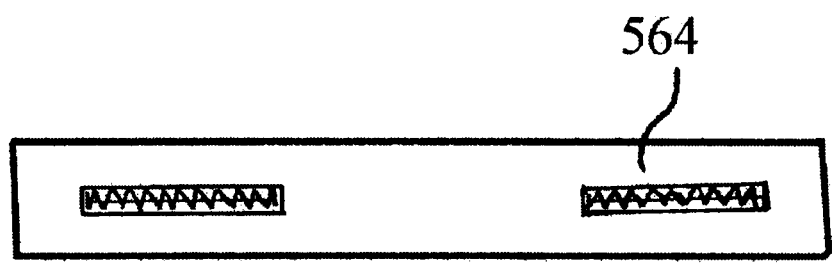
FIG. 62 side view alternate arm support.

FIG. 62 displays an alternate version of positioning means 14 with springs 564 incorporated to create a spring like resistance to movement of rod 34.

FIGS. 63, 64, 65 all displays the same positioning means 14 with flat bar 224. What is significant is the gravitational effect when the user is supported in these three different figures.

In FIG. 63 the pivots 228 are directly above leg support 22 and back support 18.

In FIG. 64 pivots 228 are extended and create an increased volatile tension on the body due to gravity acting on flat bar 224, attempting to cause it to hang vertical.

The opposite body effect, compression is created when flat bars 224 are moved inwards of FIG. 63.

Flat bar 224's rotatable connection to positioning means 14 in FIGS. 63, 64 and 65 allows dynamic movement of lower back support 22 and upper back support 18.

In FIG. 66 positioning means 14 has a rope or rubber element 604 connecting to and supporting upper body support 18 and lower back support 22 enabling these body supports any horizontal movement and also with resistance if 604 where rubber or elastic.

Figures 67, 68:
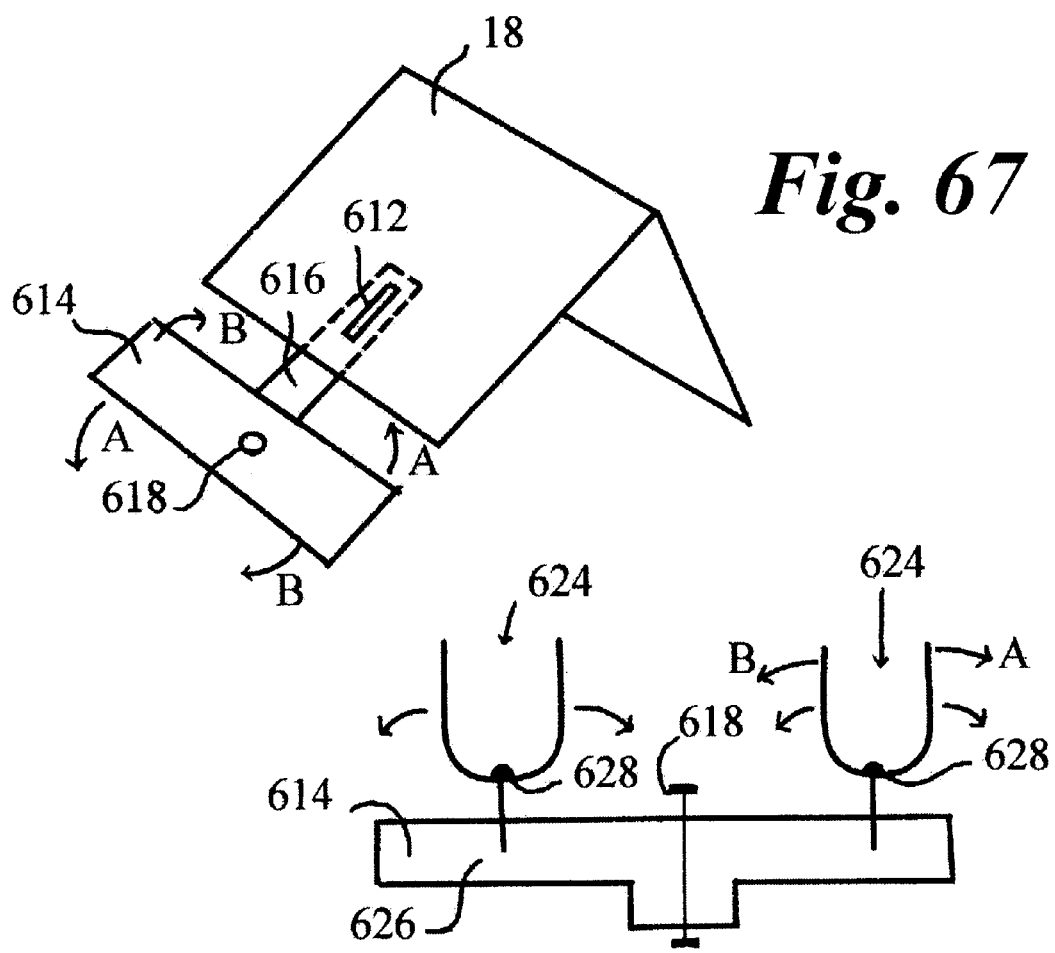
FIG. 67 side view alternate lower body support with alternate heal attachment.
FIG. 68 end view of alternate lower body lower body support heal attachment.

Referring to FIG. 67 foot support 614 is pivotally mounted via pivot 618 to arm 616 that is slide able mounted to lower body support 18 via slide 612. This enables the user to extend foot support 614 and lock slide 612 so the users heels will rest beyond foot support 614. Once in this position the user may obtain tension and muscle exercise from neck support 186 continuously down through the body to the ankles. Contracting one ankle cause the other ankle to be extended via pivot 618.

Referring to FIG. 68 an alternate version of leg support 614 or FIG. 67 consists of ankle supports 624 that may be tubular in shape and U shaped to receive users heels and fixedly attached to heel rest 614. Additionally pivots 628 may be utilized to allow foot rotation as shown in the A or B direction.

Figure 69:
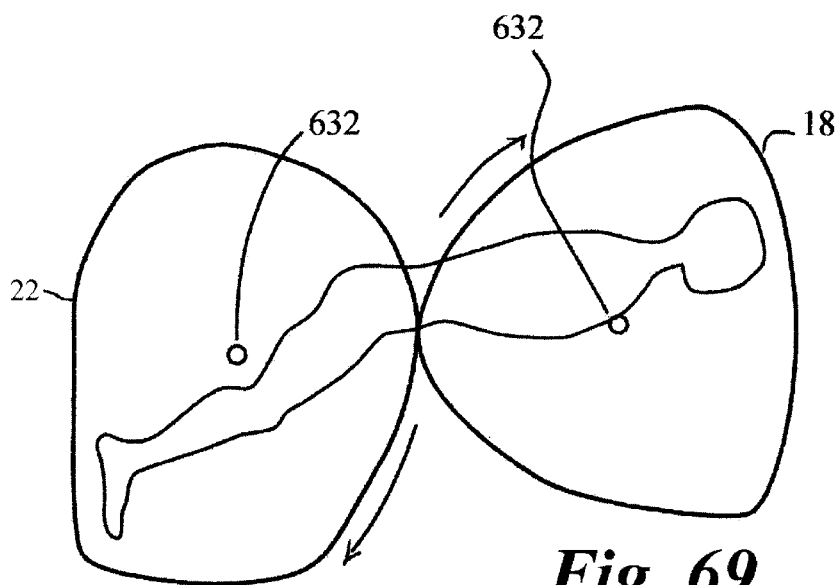
FIG. 69 top view alternate upper and lower body support.

Referring to FIG. 69 a plan view is shown of an alternate lower body support 22 and upper body support 18. Pivots 632 enable substantially planar support members to rotate in clockwise or counterclockwise direction.

Figure 70:
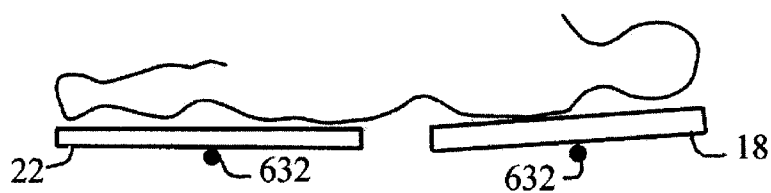
FIG. 70 side view alternate upper and lower body support.
Figure 71:
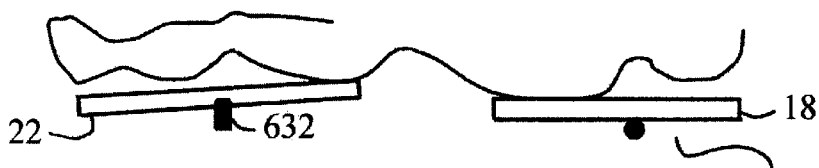
FIG. 71 side view with upper body support lower.
Figure 72:
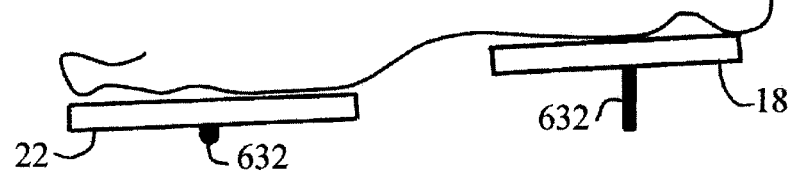
FIG. 72 side view lower body support lower.

Referring to FIGS. 70, 71 and 72 the planar upper body support 18 and lower body support 22 are shown at varying elevations to each other by alternating height of pivot 632.

Figure 73:
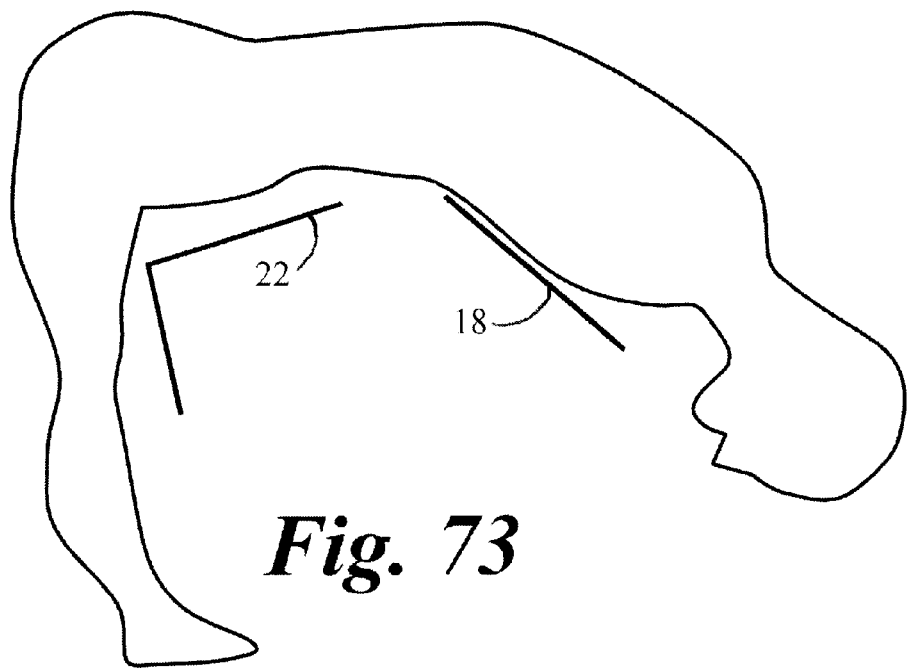
FIG. 73 side view person face down in apparatus.

Referring to FIG. 73 an alternate use of the instant invention shows the user able to mount the apparatus face down, to reverse the spine stimulation/forces obtained when using the apparatus.

Figure 74:
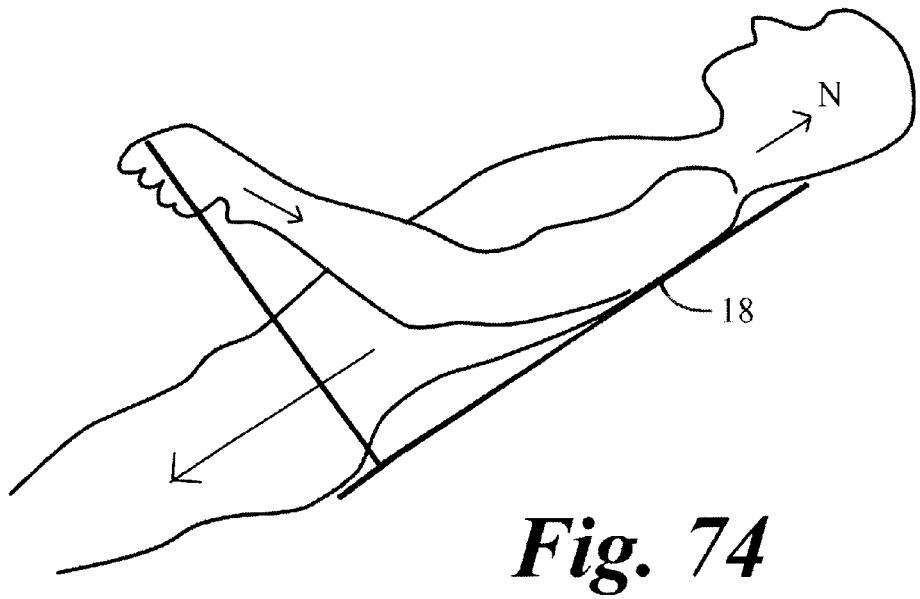
FIG. 74 side view upper body support/skeletal force diagram.

Referring to FIG. 74 a force diagram displays the counteracting forces to keep the user in a static position. Notable is the neck force N (at one end of the spine) and the lower arm force that is transferred into the upper body support 18.

Figure 75:
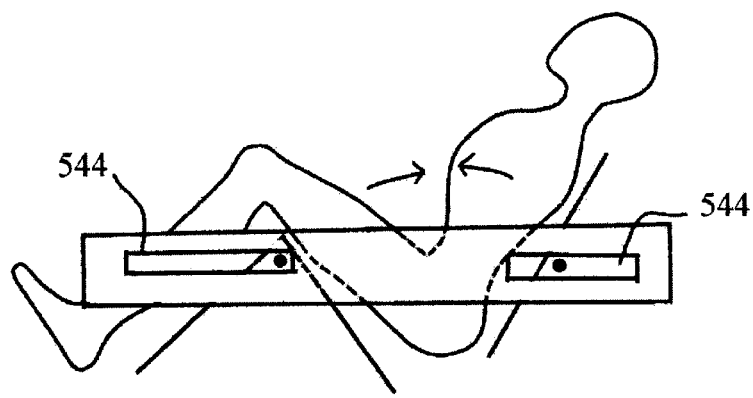
FIG. 75 side view upper body support and lower body support with sliceable/ajustable knee to chest movement in compressed position.

FIG. 75 demonstrates the users ability to perform sit ups via slides 544 of FIG. 60.

Figure 76:
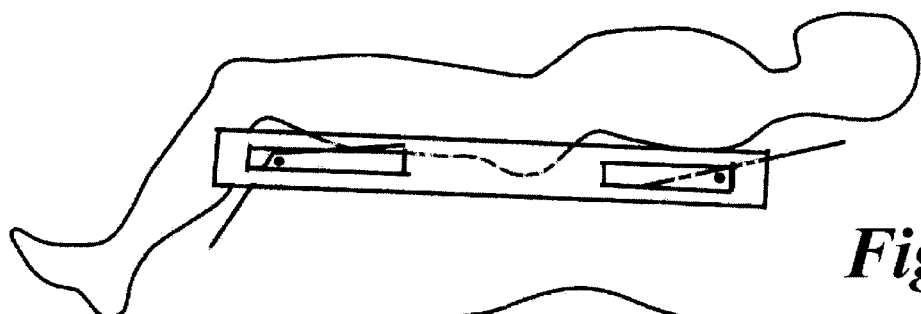
FIG. 76 side view upper body support and lower body support in compressed position.

FIG. 76 demonstrates the users ability to flatten their body into a horizontal plane, hips higher then FIG. 75.

Figure 77:
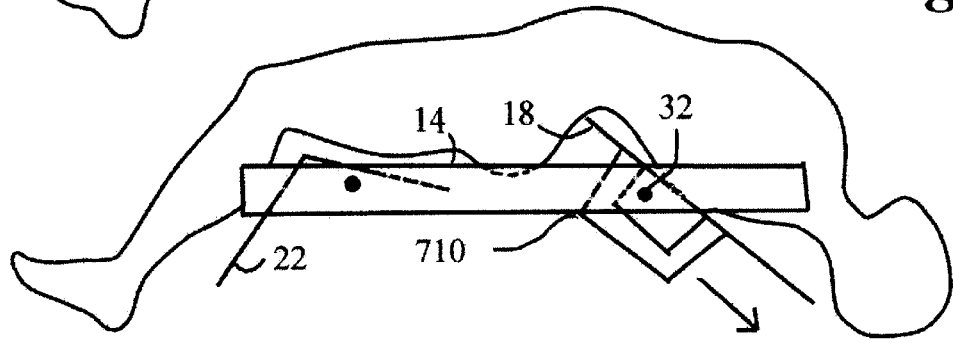
FIG. 77 side view showing upper body support extension/movement.

FIG. 77 displays the user with hips in a higher position than FIG. 76, and the ability to further extend upper body support 18 via slide opening 710. It is the users hip movement from FIGS. 75 to 77 to 77 and back to FIG. 75 that is very therapeutic to the spine.

Figure 78:
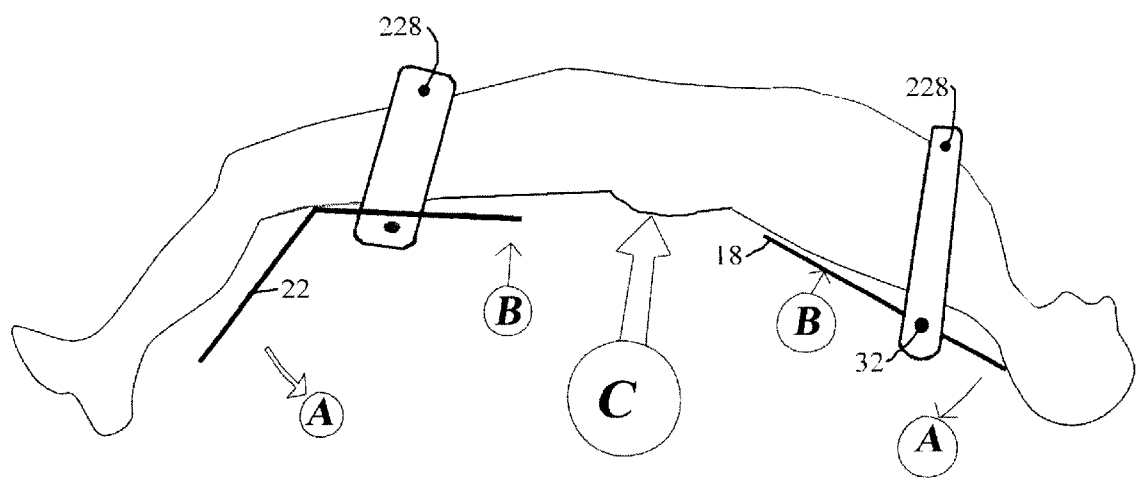
FIG. 78 side view force diagram and resulting hip elevation force.

Referring to FIG. 78, the user is shown in the apparatus moving in direction A with resulting hip in the C motion. Additionally what is significant in FIG. 78 is back support 18's pivotal motion around pivot 32, such that as the weight increases to the right of pivot 32 an opposite uplifting force occurs to the left of 32 via back support 18.

Figure 79:
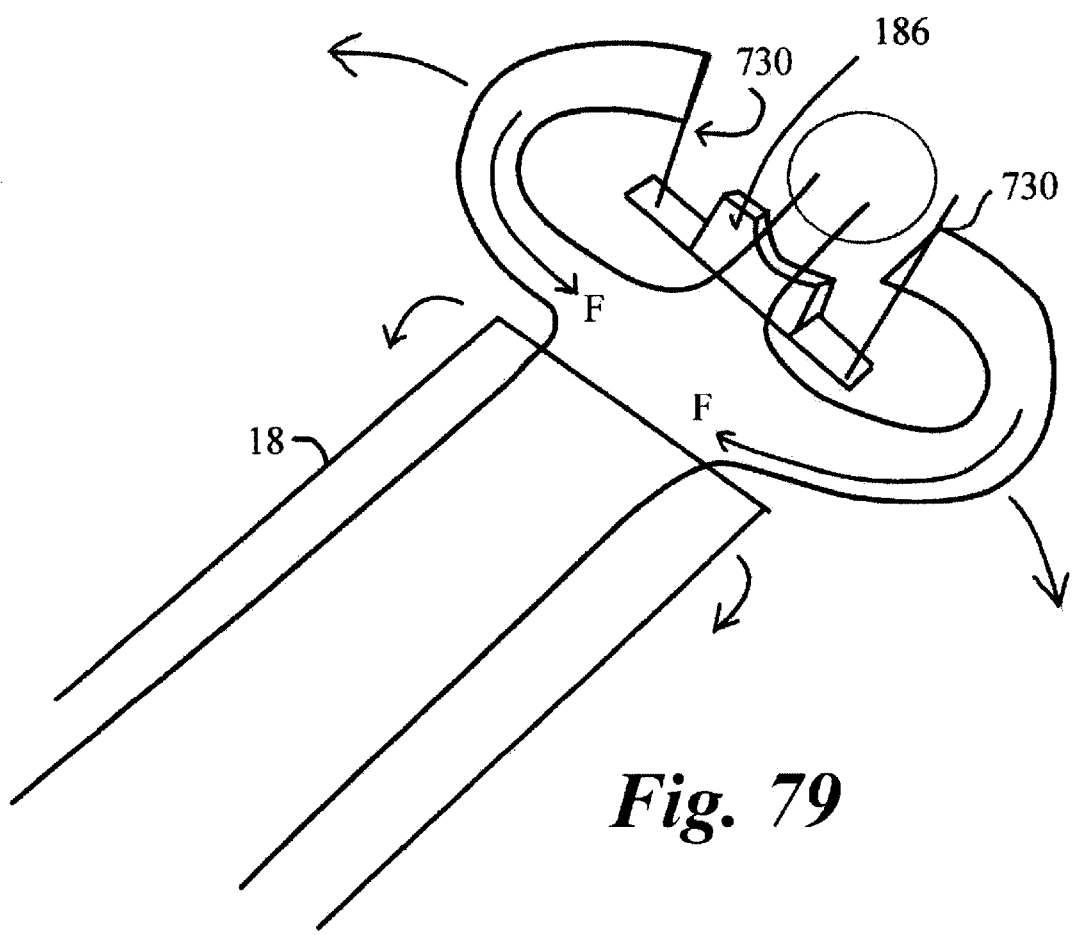
FIG. 79 perspective view alternate neck support with hand grips.

Referring to FIG. 79 an alternate neck support 186 is shown with hand grips 730 attached thereto. This enables skeletal forces to be transferring from hand grips 730 through users arms to users spine and thoracic vertebrae.

Figure 80:
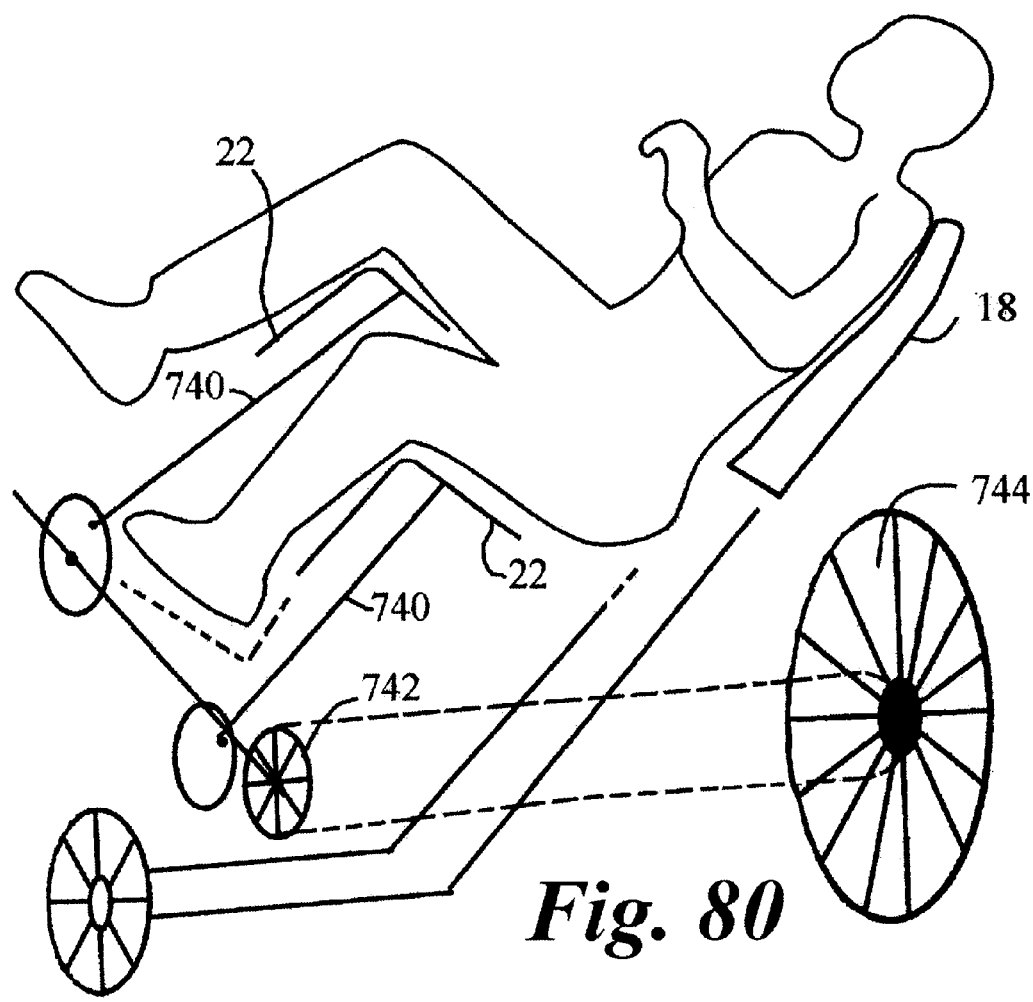
FIG. 80 side view bicycle application.

Referring to FIG. 80 another alternate means of the invention is shown where the lower body supports 22 are independently mounted to gear driver rods 740, which in turn rotate axle 742 to power wheel 744.

Figure 81:
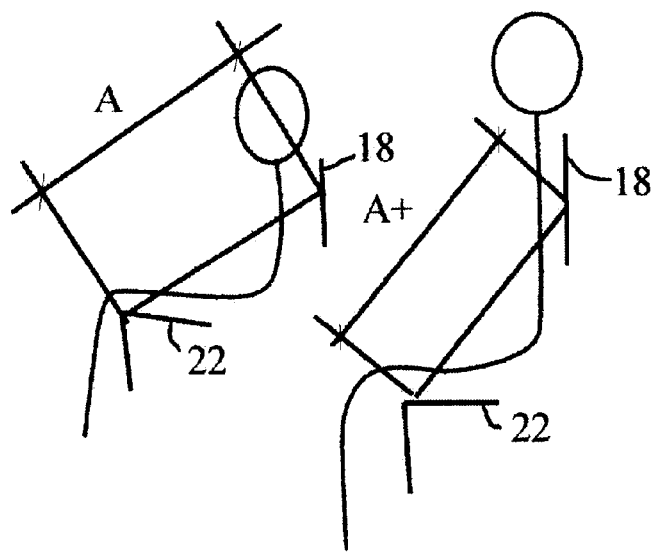
FIG. 81 side view dimensioning of upper and lower body supports separation distance when compared to different size people.

Referring to FIG. 81, two different height individuals are shown on the upper body support 18 and the lower body support 22. What is significant about the two individuals of daring heights is that no modification is required to upper body support 18 nor lower body support 22. The only difference required to accommodate the individuals height difference is only a greater A dimension for the taller individual.

Referring to FIG. 82 an alternate version of neck support 186 is shown connected to pivot 188 which allows neck support 186 up and down rotation.

Referring to FIG. 83 a plan view of neck support 186 is shown whereby pivot 188 allows the user to turn their head side to side. Note that FIG. 82 and FIG. 83 may be combined to produce each affect simultaneously.

Referring to FIG. 84 the user is shown in a reclined position. What is important is the dimension L over which spine tensioning compression and twisting may occur. It extends from neck support 186 down through heel support 614.

Figure 85:
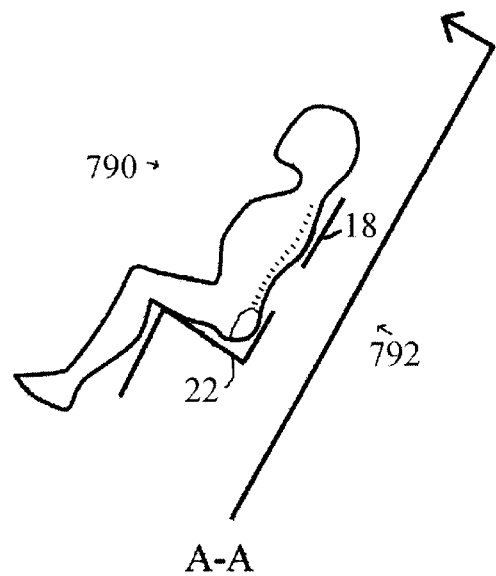
FIG. 85 side view of alternate lower body support.
Figure 86:
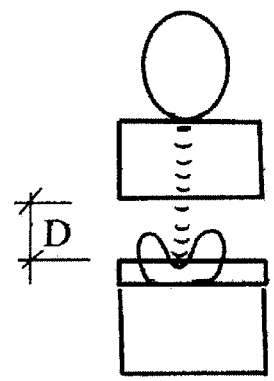
FIG. 86 is A A view of FIG. 85.

Referring to FIG. 85 an alternate means of the apparatus is shown. The lower body support 22 and upper body support 18 are positioned to provide an unsupported distance D of FIG. 86. Thus creating an upper body support and lower body support which are connected only by the spine so that independent movements of either body support will be transferred via the spine.

Figure 87:
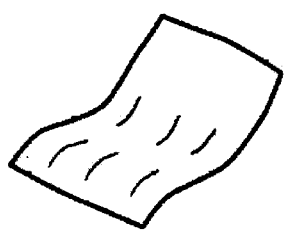
FIG. 87 is a contoured upper body support.

Referring to FIG. 87 a contoured version of back support is shown. This may be a felt or plastic molded member.

Figure 88:
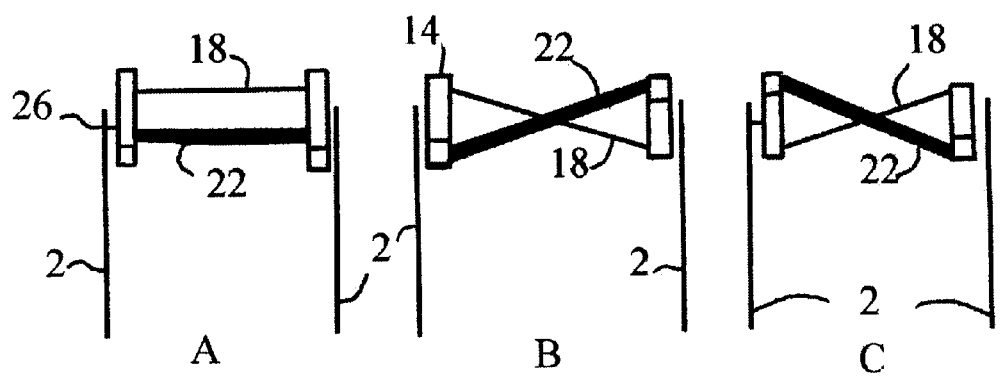
FIG. 88 end view of various alternate arm positions.

FIG. 88 displays front view of FIG. 1. Base 2, positioning means 14, pivot 26, lower body rod 34 are shown. What is significant of these three different views is different horizontal plain variances of the upper and lower body supports which enables the user to twist the spine longitudinally along its length promoting spine health through, compression, traction, muscle development and increased blood flow.

Figure 89:
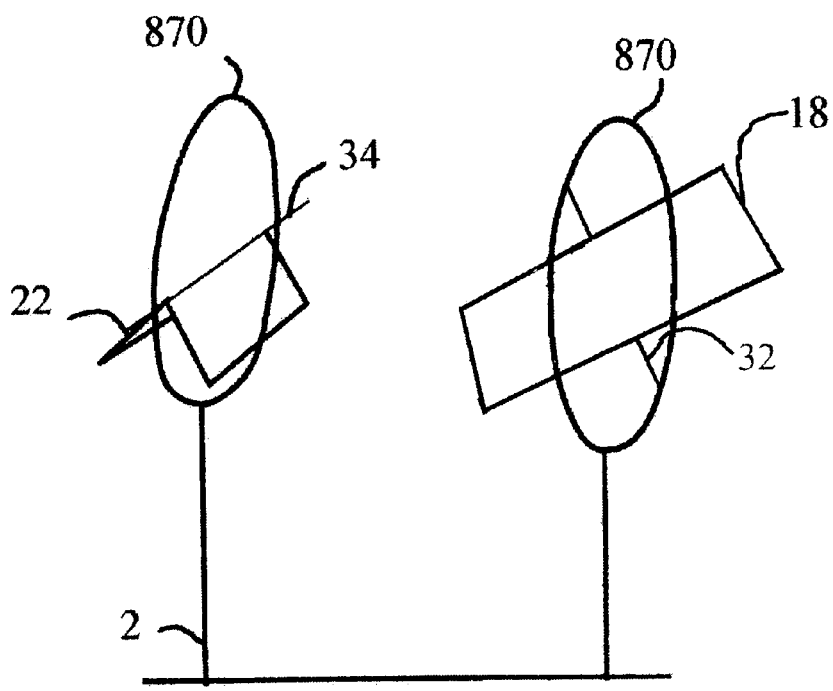
FIG. 89 perspective view spine exercising with round support holding means.

Referring to FIG. 89 an alternate version of the instant invention is shown with tubular round guides slidabley connected to lower body rod 34 and upper body rod 32 to enable 360 degree rotation of upper body support 18 and lower body support 22.

Figure 90:
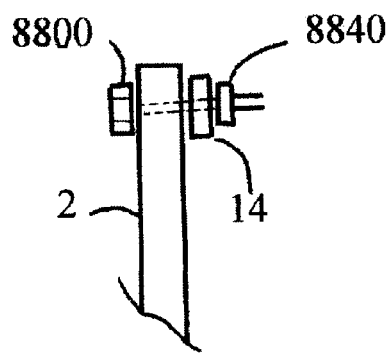
FIG. 90 detail of pivot locking means.

Referring to FIG. 90 alternate pivot 8800 with nut 8840 enables the tensioning of positioning means 14 to be set so that, with a balanced lower body rod 34 and upper body rod 32, the positioning arm 14 will hold user in any position from sitting to reclining and allow changes in rotational position with minimal effort/force on hand grip 10.

Figure 91:
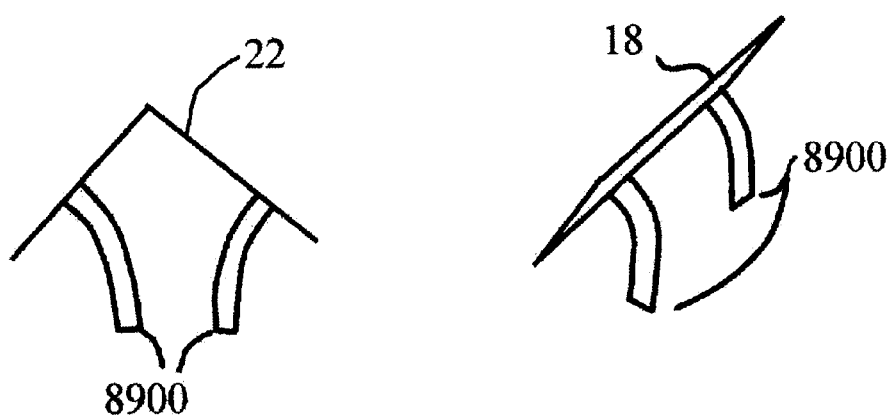
FIG. 91 side view of supports equipped with retaining straps.
Figure 92:
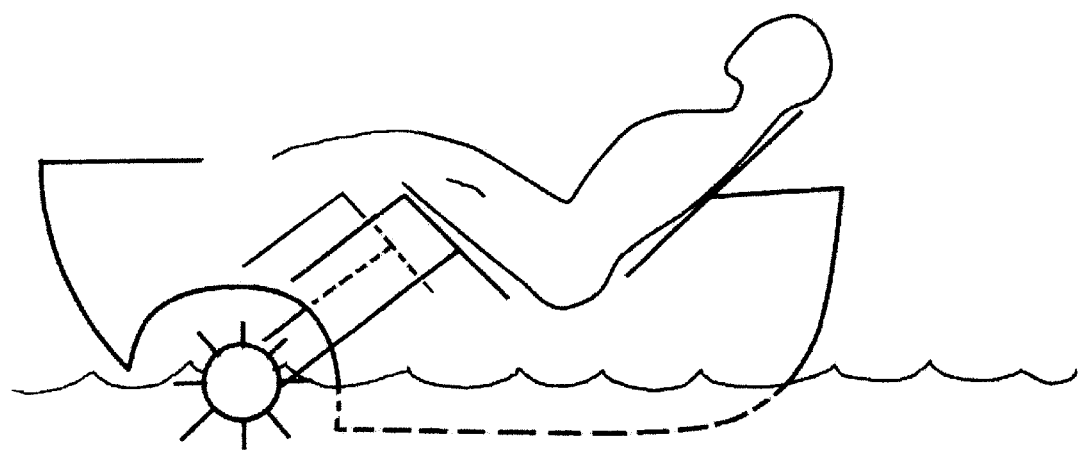
FIG. 92 side view of paddle boat spine exercising application.
Figure 93:
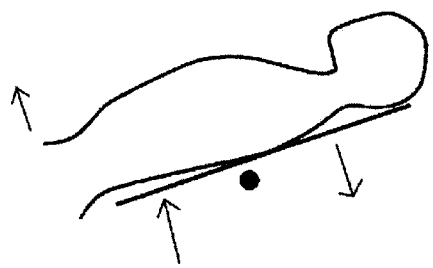
FIG. 93 side view of upper body support.

Straps 8900 shown in FIG. 91 would be of nylon or similar material to retain user in position while partially or fully inverted.

Figure 94:
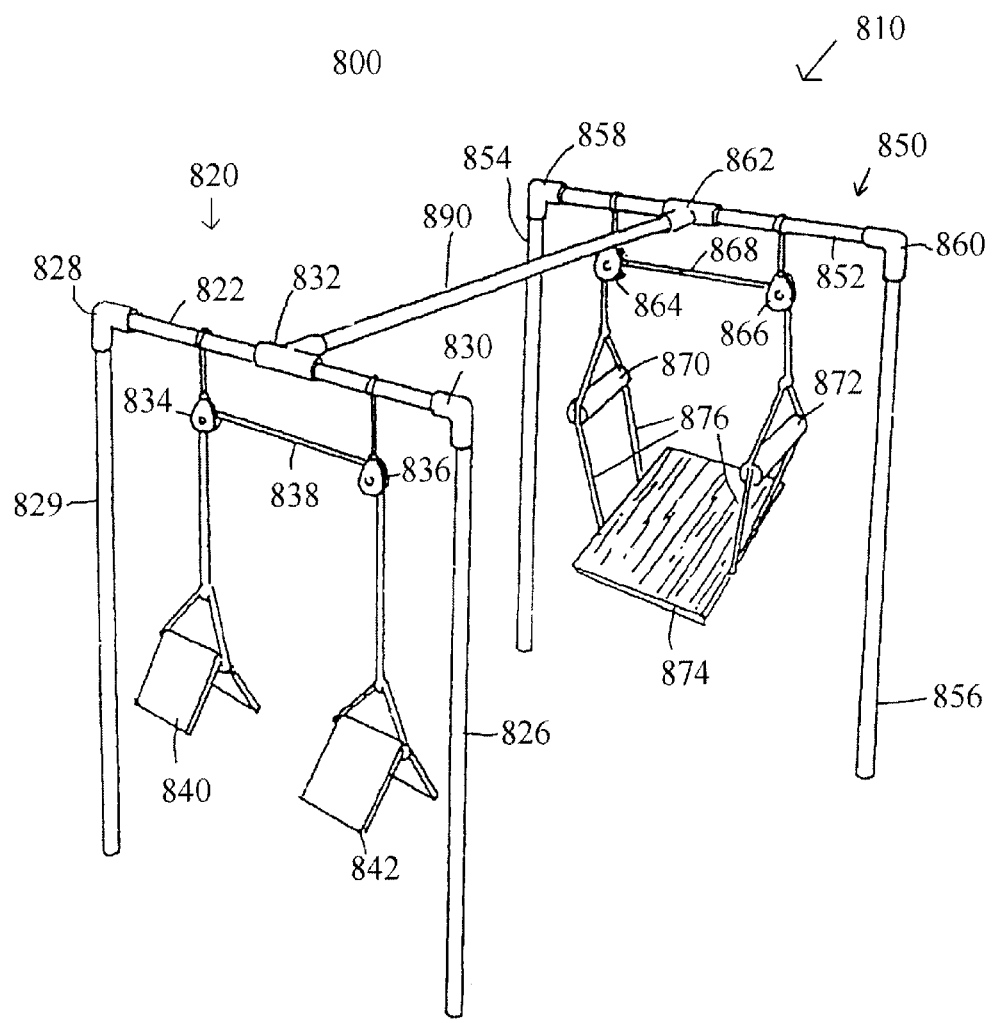
FIG. 94 is a perspective view of another alternative embodiment in which the back support and the leg support are suspended by rope running through pulleys attached to portions of a frame, and in which hand grips are provided above the back support.

Referring to FIG. 94 shown is another alternative embodiment 800 of the present invention. In this embodiment 800, the collapsible frame 810 comprises a leg support frame 820 and a back support frame 850 joined together by a positioning means for positioning the leg support frame 820 and the back support frame 850 appropriately so that a user's posterior will not be supported, preferably a longitudinal member 890. The leg support frame 820 comprises an elevated leg support member 822 joined to vertical leg support legs 824 and 826 by elbow joints 828 and 830. The longitudinal member 890 is joined to the elevated leg support member 822 by a T-joint 832 Two pulleys 834 and 836 are preferably mounted on the elevated leg support member 822, preferably on opposite sides of the T-joint 832, and preferably adjustably spaced apart from each other. A leg support rope 838 preferably is run between the pulleys and preferably V-shaped leg supports 840 and 842 are suspended from the ends of the leg support rope 838 by a triangular trapeze arrangement so that the underside of a user's knees can contact the leg supports 840 and 842. Thus, downward movement of the left leg support will cause equal upward movement of the right leg support and vice versa. The back support frame 850 preferably comprises an elevated back support member 852 joined to two vertical back support legs 854 and 856 by elbow joints 858 and 860. The longitudinal member 890 is preferably joined to the elevated back support member 852 by a T-joint 862. Two pulleys 864 and 866 are preferably mounted on the elevated back support member 852 on opposite sides of the T-joint 862 and adjustably spaced apart from each other. A hand grip rope 868 is preferably run through both pulleys 864 and 866 and hand grips 870 and 872 are preferably suspended from the ends of the hand grip rope 868 by a triangular trapeze arrangement. Thus, downward movement of the left hand grip will cause equal upward movement of the right hand grip and vice versa. Preferably a back support 874 is suspended from the hand grip 870 and 872 by back support ropes 876. Preferably, the elevated leg support member 822, the two vertical leg support legs 824 and 826, the elevated back support member 852, the two vertical back support legs 854 and 856 and the longitudinal member 890 are adjustable in length either through being telescoped or through the use of joints that would allow attachment of the various members and legs to each other at points other than their ends. Preferably also, these members and legs are rigid piping of a material such as metal or plastic and have a circular or square cross-section. Preferably, the leg support ropes 838, hand grip rope 868 and back support ropes 876 all comprise a strong, light, durable rope, such as nylon rope. The pulleys 834, 836, 864 and 866 can be a conventional construction as can the elbow joints 828, 830, 858 and 860 and the T-joints 832 and 862. The hand grips 870 and 872 preferably comprise a cylindrical cushioned material for comfort. With the construction, it can be seen that the device is easy and economical to manufacture, ship and store, and easily assembled and collapsed by the user. The device also allows the user to turn his body sideways and to create tension along different lines of the body.

Figure 95:
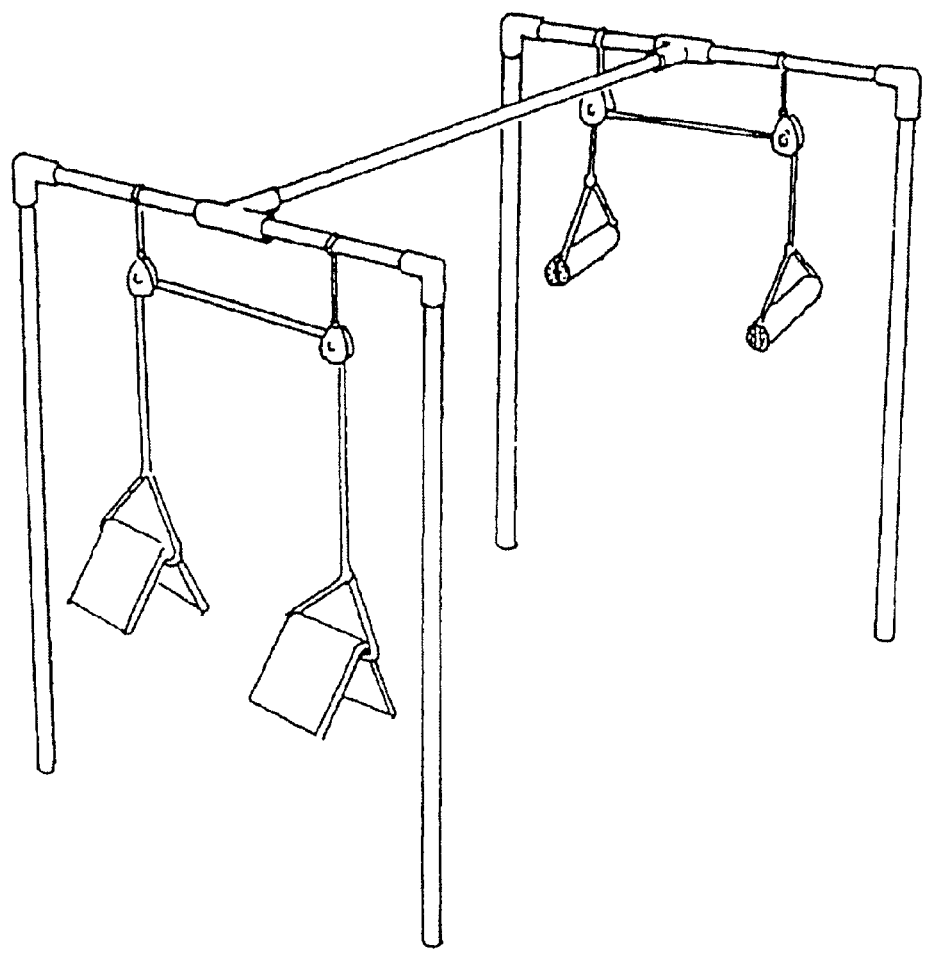
FIG. 95 is the same embodiment as FIG. 94, except with the back support omitted.

Referring to FIG. 95 shown is still another embodiment 900 identical to the embodiment of FIG. 94 but without the back support ropes or back support.

Figure 96:
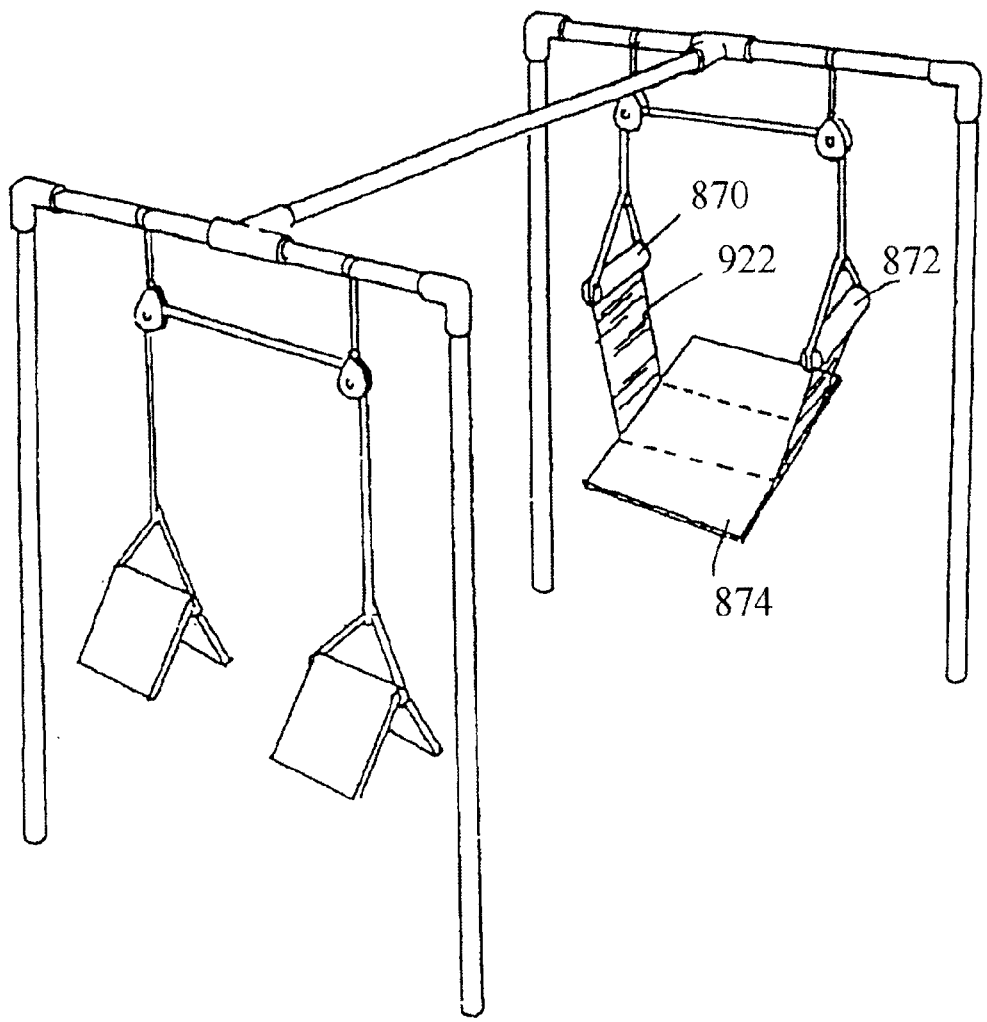
FIG. 96 is a perspective view of the embodiment of FIG. 94, except with a flexible non-stretchable strap (instead of ropes) connecting the back support to the hand grips.

Referring to FIG. 96 shown is still another embodiment 920 non-stretching strap 922 is mounted between the hand grips 870 and 872 and the back support 874, instead of the back support ropes 876.

Figure 97:
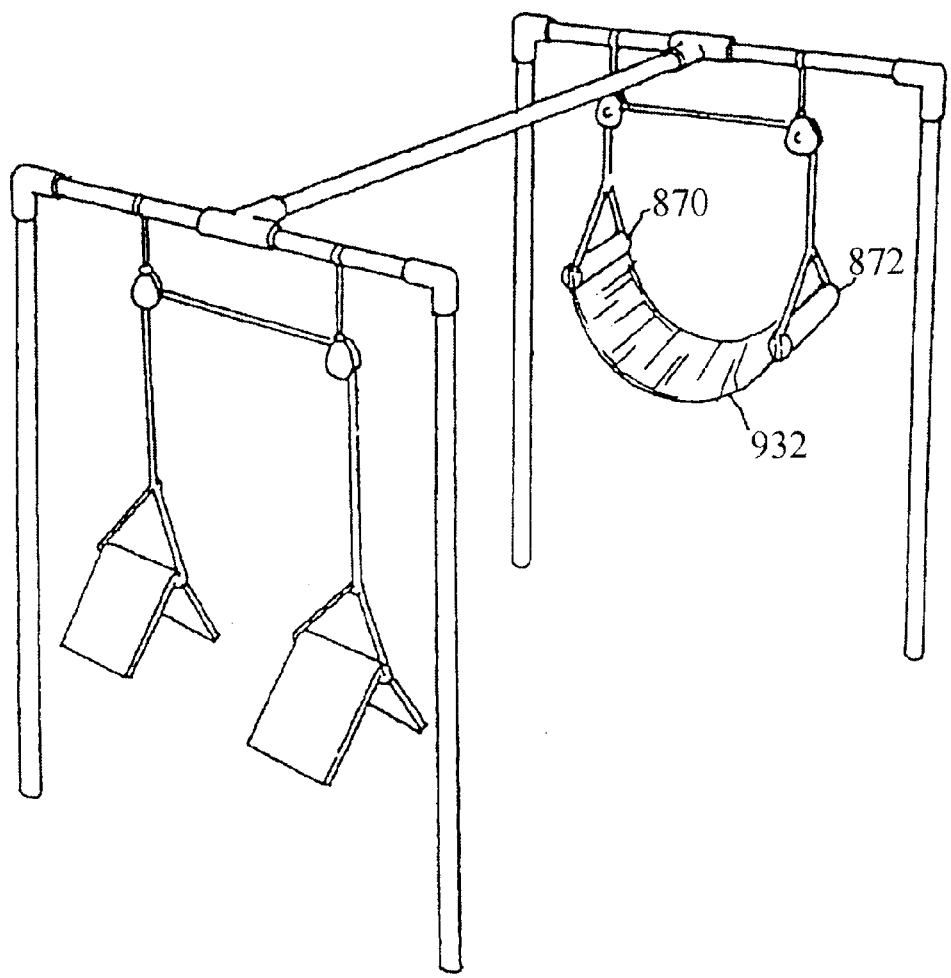
FIG. 97 is a perspective view of the embodiment of FIG. 95, with a flexible non-stretchable strap mounted between the hand grips.

Referring to FIG. 97 shown is an embodiment 930 identical to the embodiment of FIG. 95, except that a flexible non-stretching strap 932 has been suspended between the hand grips 870 and 872.

Figure 98:
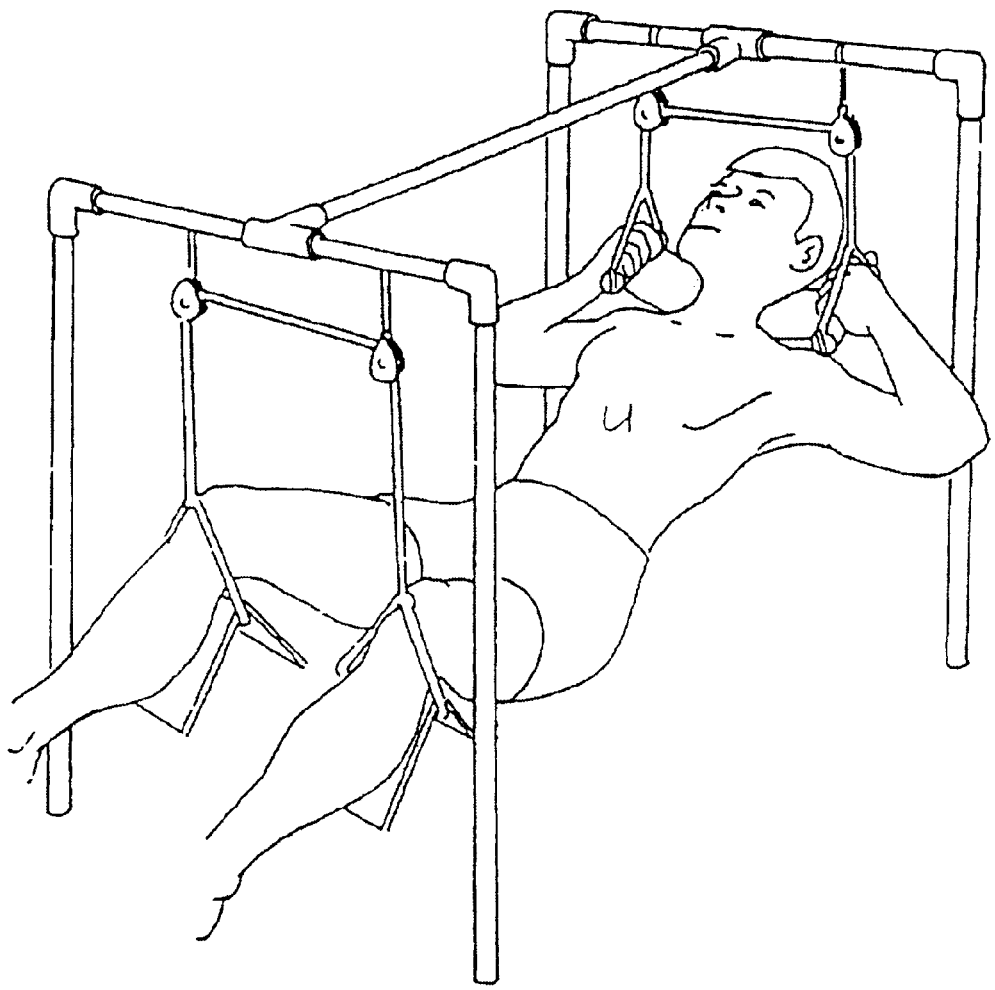
FIG. 98 is a perspective view of the embodiment of FIG. 97 showing a user using the flexible strap to support his neck and also using the hand grips.

Referring to FIG. 98 shown is the manner in which a user would use the embodiment 930 of FIG. 97 by resting his or her neck on the strap 932 while the user's legs are retained by the leg supports.

Figure 99:
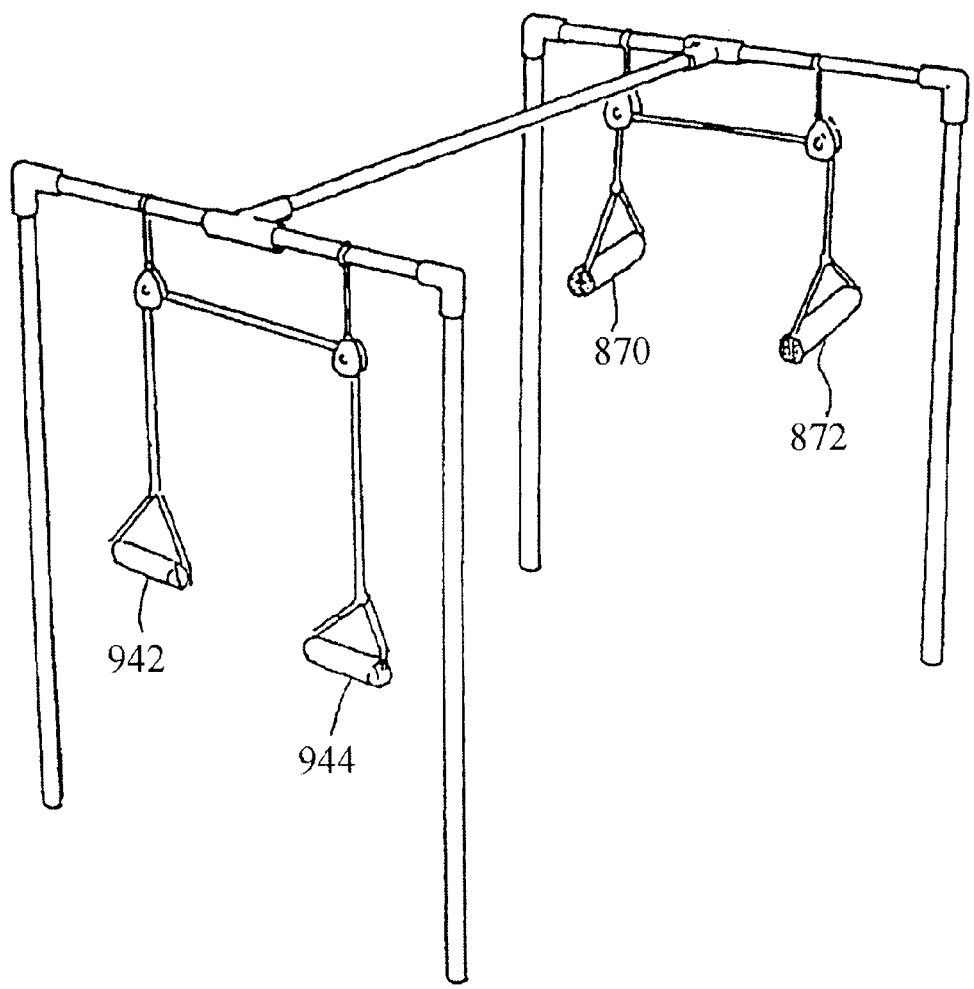
FIG. 99 is a perspective view of the embodiment of FIG. 95 except with an alternate leg support for the user's feet of the underside of the user's knees.

Referring to FIG. 99 shown is an alternative embodiment 940 in which the leg supports are replaced by a leg support bars 942 and 944, preferably of cylindrical cushioned material similar to the hand grips 870 and 872.

Figure 100:
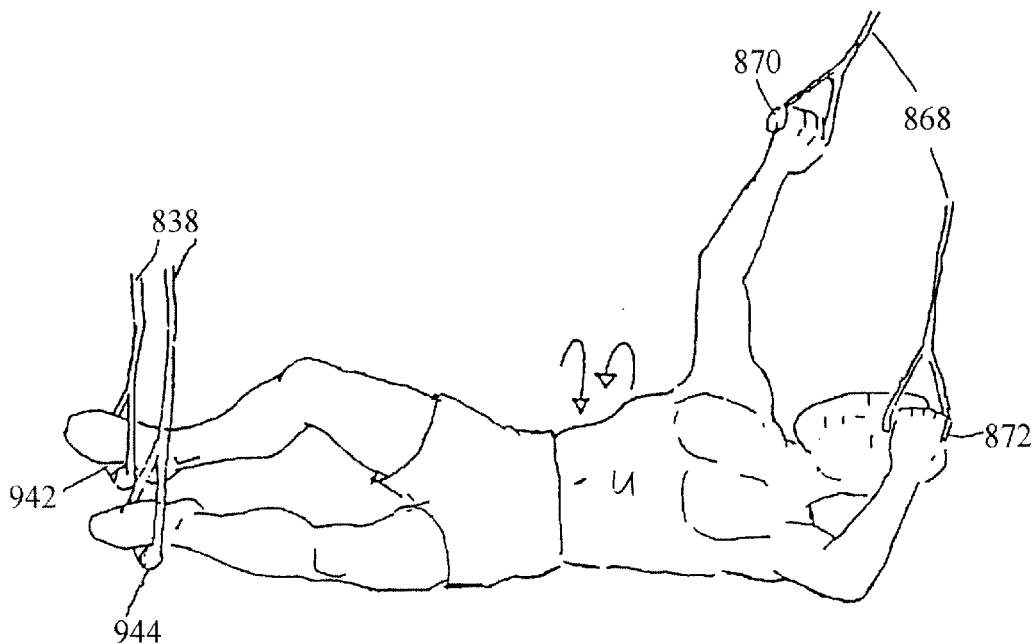
FIG. 100 is a perspective view showing a user employing the embodiment of FIG. 99 for rotational tension along the spine.

Referring to FIG. 100 shown is a side view of a user using the embodiment 940 and FIG. 99 for rotational spinal tension, with only the hand grips 870 and 872, leg support bars 942 and 944 and ropes 838 and 868 shown for clarity and the user's feet engaged with the leg support bars. Alternatively, the user can engage the leg support bars with his or her knees or other parts of his or her legs.

Figure 101:
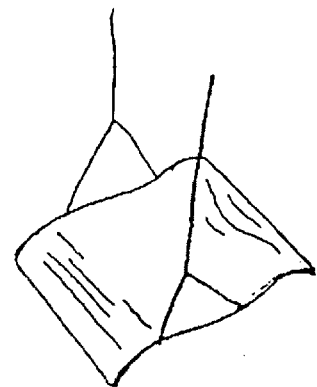
FIG. 101 shows an alternate rigid contoured back support for all of the previous embodiments.
Figure 102:
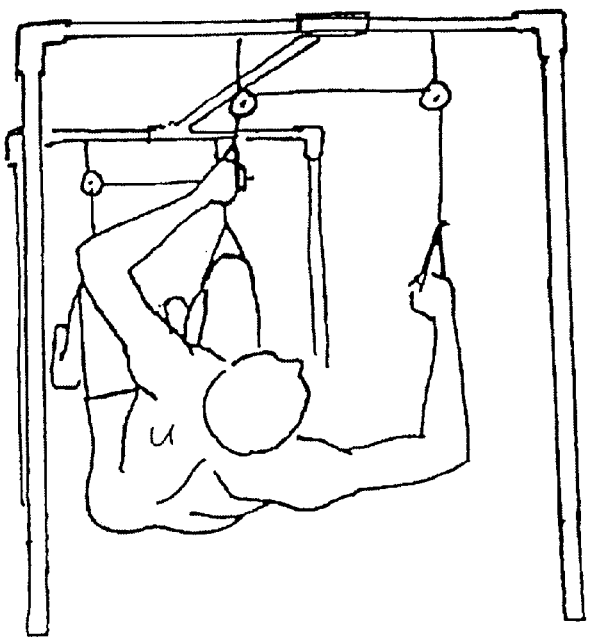
FIG. 102 is an end view of the user of FIG. 100 using the apparatus of FIG. 99.

Referring to FIG. 101 shown is an alternate rigid contoured back support for use with all the preceding embodiments. Referring to FIG. 102 shown is an end view of the user using the embodiment 940 of FIG. 99. Optionally, for greater strength and stability, additional longitudinal members can be added between the leg support frame 820 and the back support frame 850 of any of the preceding embodiments in order to provide additional bracing. Other additional bracing can be provided, such as anchored wires or additional reinforcing members, attached to various portions of the leg support frame 820, the back support frame 850, or the longitudinal member 890.

Figure 103:
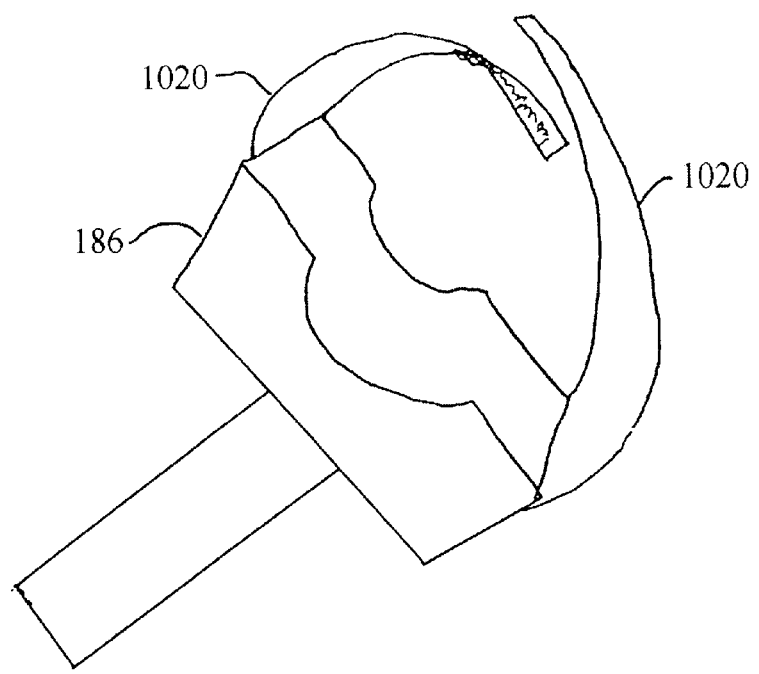
FIG. 103 is a perspective view of neck support with retaining strap.

Referring to FIG. 103 neck support 186 is equipped with nylon or similar straps that may be utilized for securing and retaining the users head in the neck support. This increases the amount of tension that may be created from the neck down.

Figure 104:
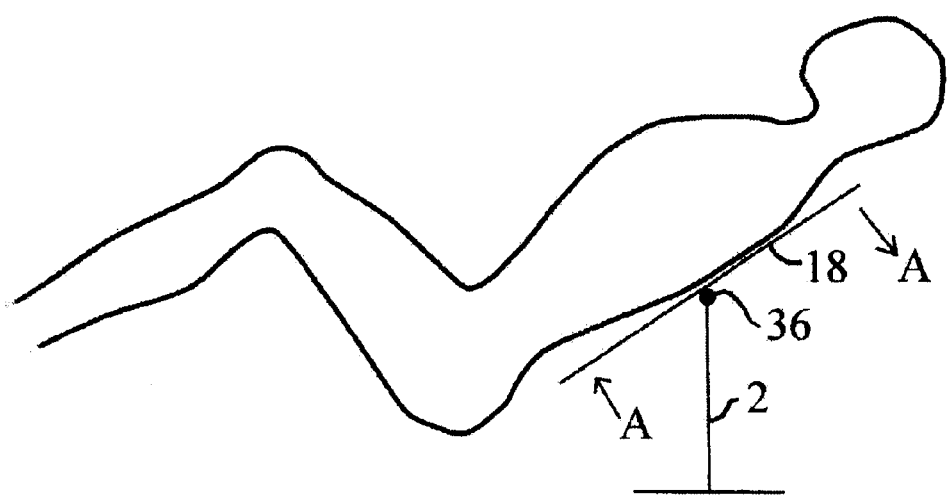
FIG. 104 side view of upper body support.

FIG. 104 shows a upper body support that is connected to pivot 36 to base member 2. This alternate version enables facilitation of spine movement due to the A movement of the user's weight over pivot 36.

Figure 105:
FIG. 105 side view of three support mode.

Referring to FIG. 105 an alternate version of the teaching of the instant invention is shown with three independent supports, lower 22, middle 201, and upper 18. These three forces may be applied under the body to create any one of a variety of force, moment and shear forces as indicated in FIG. 25 by adding the third force or support.

Figure 106:
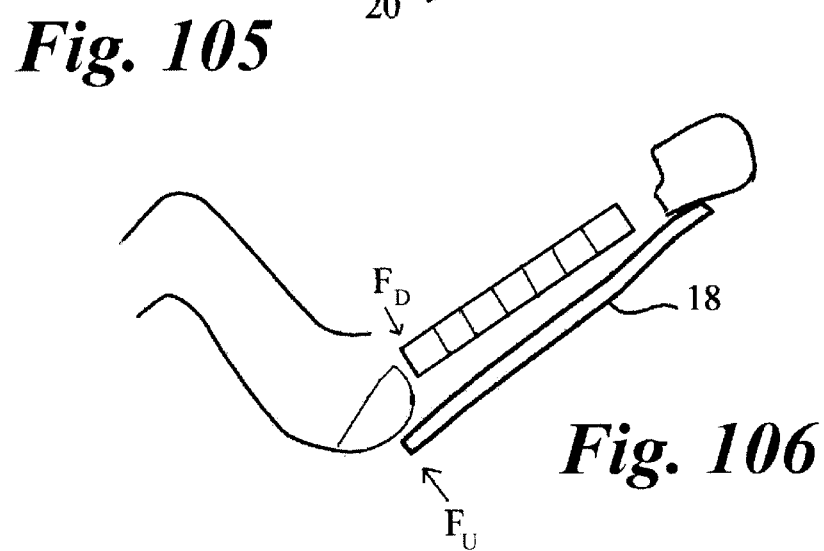
FIG. 106 side view of upper body support positioned to place force on the sacrum for those suffering from spondylolisthesis.

Referring to FIG. 106 the upper body support is positioned to create shear forces on the hips to facilitate spinal movement and correction of individuals who suffer from spondylolisthesis.

Figure 107:
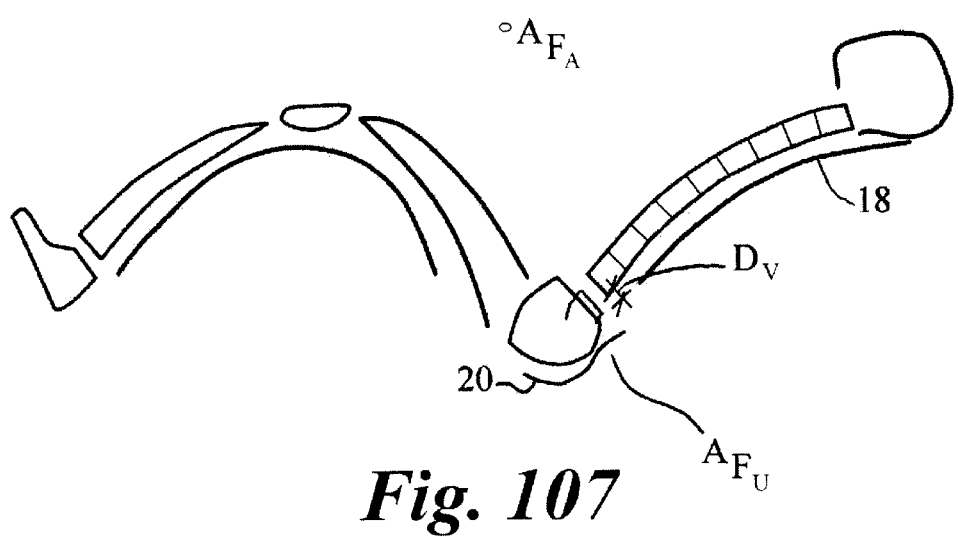
FIG. 107 side view of force above or under for rear end support.

FIG. 107 indicates how the forces of FIG. 106 may be applied, from the bottom Au, from below or above, Afa via ropes or hangers. Dv, shows the distance of the miss aligned spine, that AFu attempts to help correct or assist.

Figure 108:
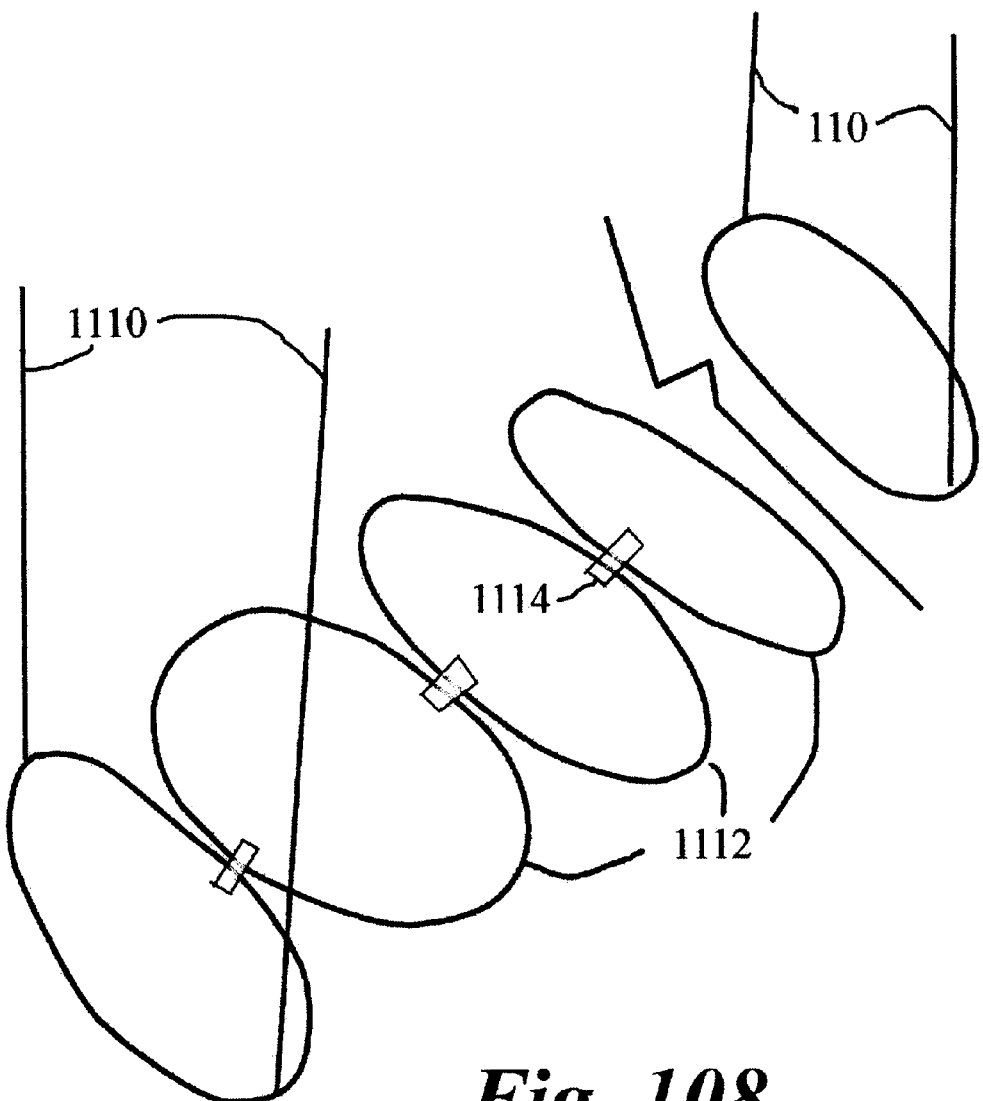
FIG. 108 perspective view of alternate upper body support.

Referring to FIG. 108 an alternate upper body support is shown. Planar members 1112 are rounded and oblong and connected via clips 1114. These supports 1112 are designed to permit as near complete movement similar to the spine itself, vertebrae by vertebrae. These spine like supports may be supported in any number of ways either from ropes 1110 or from below.

Figure 109:
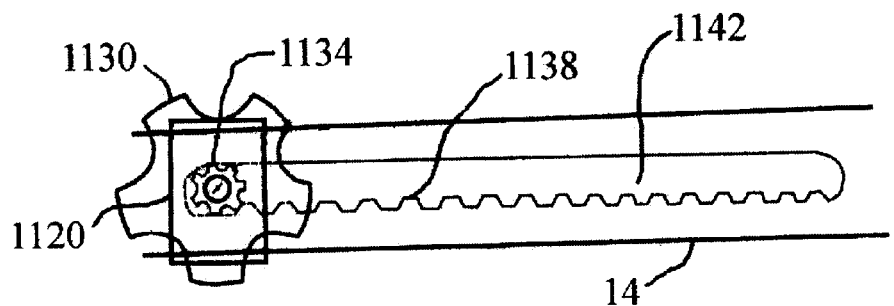
FIG. 109 is a side view of alternate roller to select and set rod to arm location.
Figure 112:
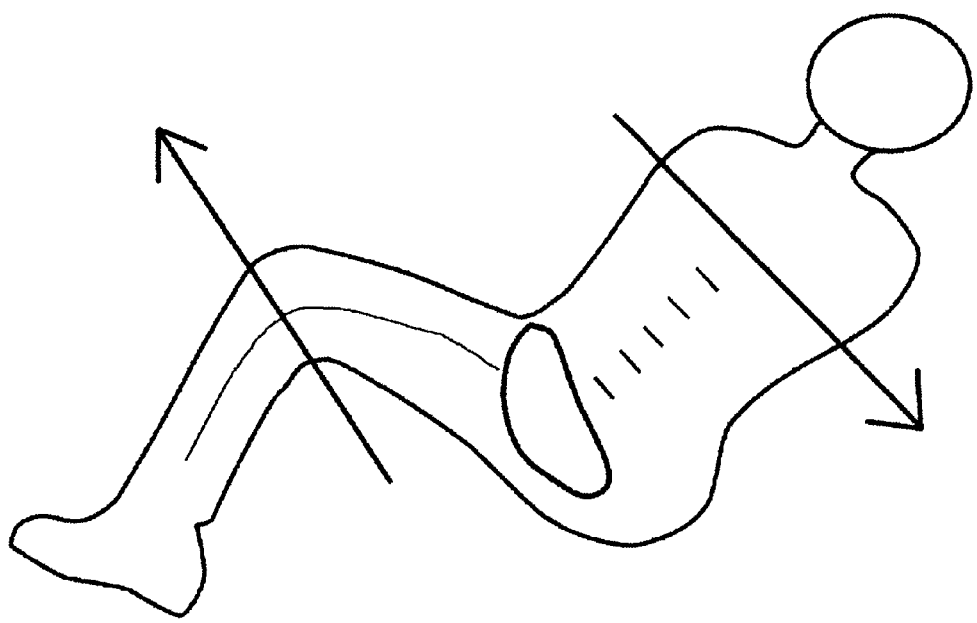
FIG. 112 shows the natural opposite movements of upper and lower body members when rotating.

FIG. 109 shows an alternate of FIG. 112 whereby casing 1120 is adjusted by grip 1130 that rolls in track 1138 along 14 in opening 1142.

Figure 110:
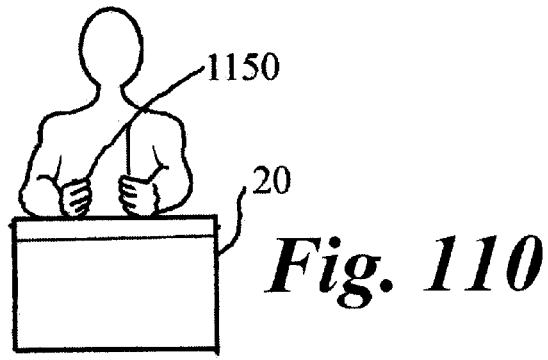
FIG. 110 front view of alternate upper body support equipped with hand grips.
Figure 111:
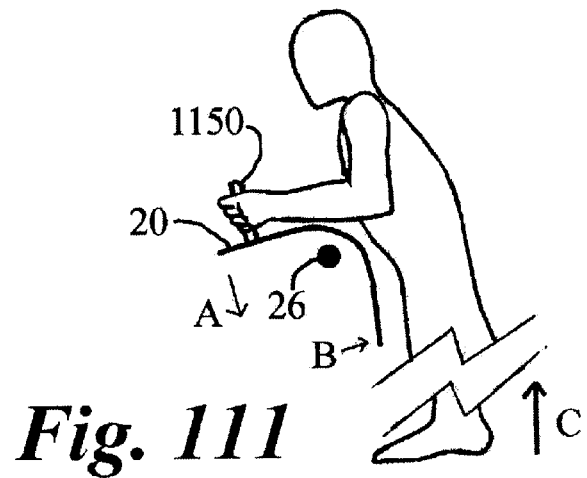
FIG. 111 side view FIG. 110.

FIG. 110 and 111 show how the user may practice upper body support only and facilitate the forces on ones body by adding the vertical hand grips 1150 to body support 20 that enable lever arm forces to be generated and transferred to the spine. Additionally important is the pivot forces that may be created about pivot 26. User weight to the left of 26 will cause a raising force to the right of 26. Preferably pivot 26 will be equipped with any number of means available today to create locking and holding of 20 as it rotates degree by degree in the counter clockwise direction. Preferably the pivot 26 would lock after every increasing degree movement in the counterclockwise direction and remain locked until a button or similar switch were activated on the hand grips 1150. This apparatus will allow a user to walk up to it and grab hand grips 1150 and rotate forwards and be retained in the counterclockwise rotation and continue to rock in that direction until their feet or heels became elevated, 26 would lock and the user could practice spine exercise with heels just off the ground so as to create tension along the spine. At which time user is ready hand grips 1150 would have a switch that could be activated which would release 20 to rotate clockwise which would return the user's feet to the ground.

Referring to FIG. 112 the natural movement of the body is shown when they rotate when sitting. The user 's upper rotates right and their lower body moves to the left. The instant invention immolates these natural motion as shown in application of FIG. 88.

Figure 113:
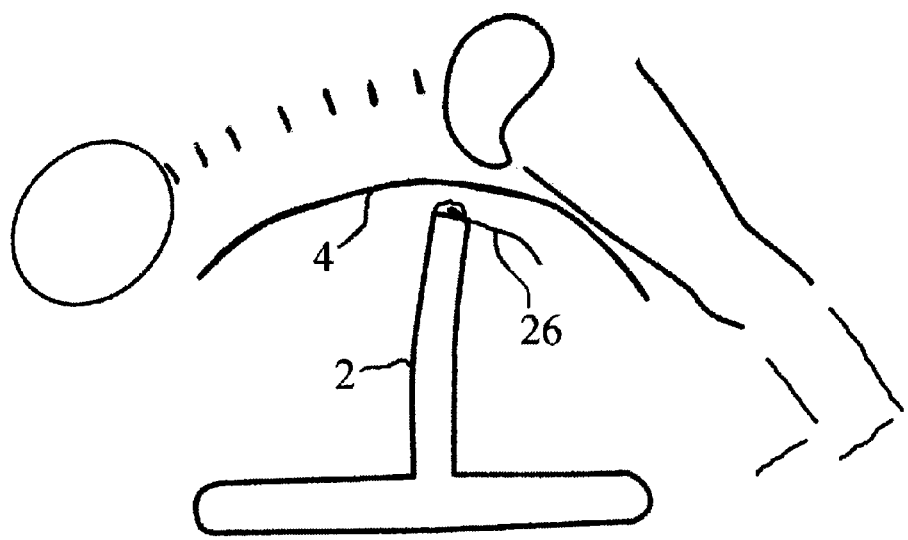
FIG. 113 side view of single body support.

FIG. 113 shows an expanded body support 4 similar to 20 of FIGS. 110 and 111. Pivot 26 preferably has the same rotate and lock increments, as well as releasing ability of FIGS. 110 and 111.

Figure 114:
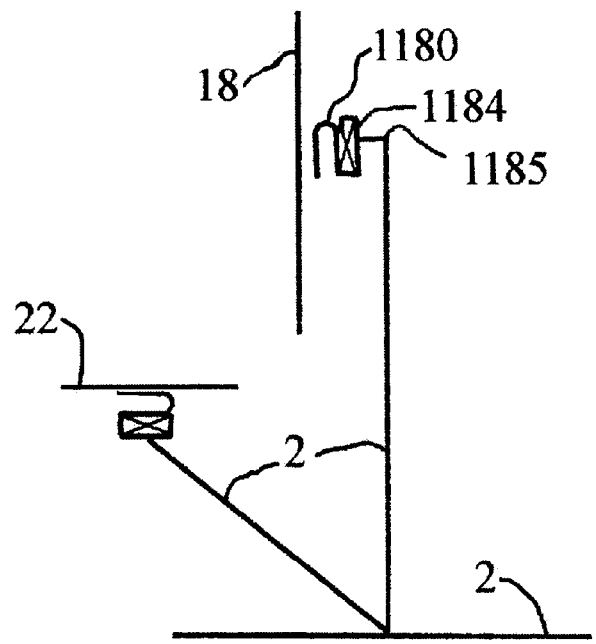
FIG. 114 side view of hinged supports.
Figure 115:
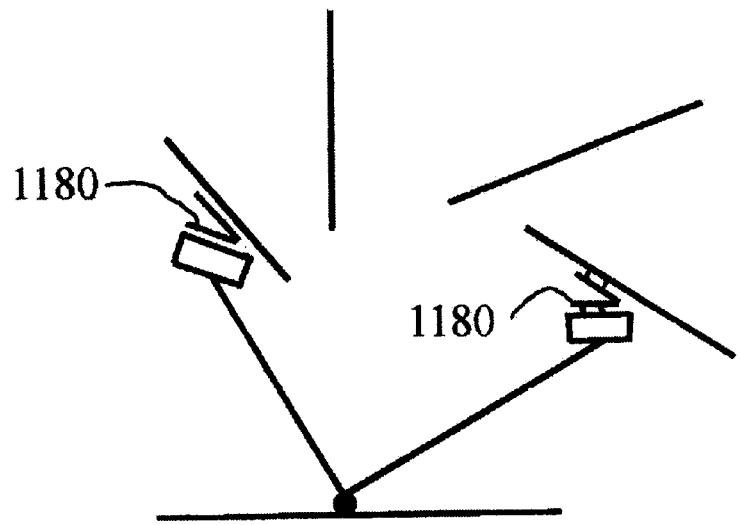
FIG. 115 side view of FIG. 114 in reclined position.

FIGS. 114 and 115 teach a hinge mounting of body supports. The hinge mounting will not allow the upper body support to rotate any further counterclockwise in FIG. 114 that would allow the user to fall through, yet it allows rotation of upper body support in the clockwise direction, FIG. 115, which benefits the user. Additionally and for the same reasons hinge 1180 is utilized at the lower body support. While it may have hinge pivot in the wrong place in FIG. 114, if it were switched with hinge pivot on other side it could be easily seen how it would provide the similar function of the upper body hinge in FIG. 114, stopping the user from falling through the supports and allowing for rotation in horizontal position.

Figure 117:
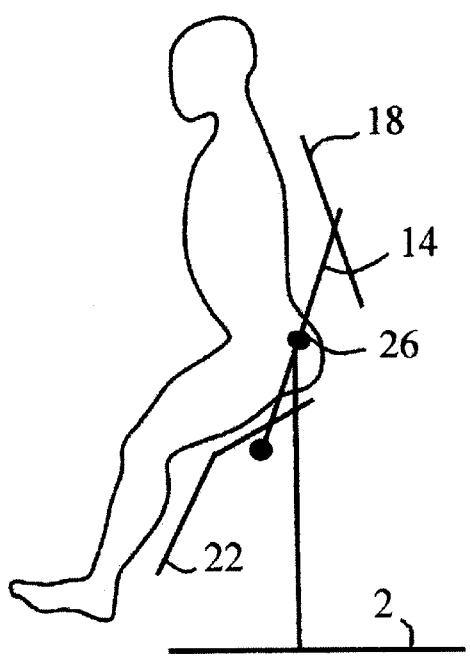
FIG. 117 is an elderly application that allows for near standing mounting in to instant invention.
Figure 116:
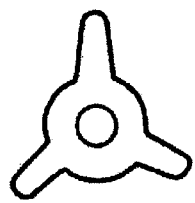
FIG. 116 side view of turning block applicable to FIG. 109 part 1134.

Referring to FIG. 117 the arm 14 is positioned near vertical that will allow an older individual easy access as both upper and lower body supports are in the near vertical plane, like leaning up against the wall. This makes it easier for them to mount the device by eliminating the drop to the sitting position, rather they are taken from a standing position to a sitting or horizontal position by supports 18 and 22 connected to arms 14 to pivot 26 to base member 2.

Figure 118:
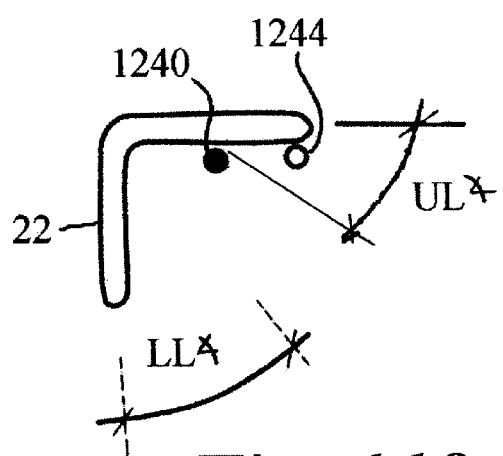
FIG. 118 side view of lower body support.

FIG. 118 teaches a seat similar to the lower body support of previous figures. What is important about this lower body support is its ability to function as a resting plane VIA pivot 1240 and pivot limit device 1244. Yet when user wants to get out of chair they simply rotate forward and pivot 1240 allows lower body support 22 to rotate counterclockwise yet limit device 1244 will stop clockwise rotation.

What is claimed is:

1. A spine tensioning dual body support comprising:

A space defined between a 1st and 2nd body support, said space provides an unsupported midsection of an occupant in said space, a means to rotate, relative to said space, said 1st and 2nd body supports, while said occupant remains in said space, a 1st and 2nd limit for said means, said 1st limit maintains said 1st and 2nd body supports in an upright chair configuration, said 1st body support lower than said 2nd body support, said 2nd limit maintains said 1st and 2nd body supports in a reclined position, said 1st and 2nd body supports in a near equal elevation relationship, said space, said 1st and 2nd body supports, aide the spine by and through tension, contraction and increased blood flow in addition to providing said occupant the ability for spinal muscle, nerve and soft tissue development and maintenance and, increase spinal mobility, flexibility and health of said occupant in said space between said 1st and 2nd body supports.

2. A spine tensioning dual body support comprising:

A space defined between a 1st and 2nd body support, said space provides an unsupported posterior of an occupant in said space, a means to rotate, relative to said space, said 1st and 2nd body supports, while said occupant remains in said space, a 1st and 2nd limit for said means, said 1st limit maintains said 1st and 2nd body supports in an upright chair configuration, said 1st body support lower than said 2nd body support, and said 2nd limit maintains said 1st and 2nd body supports in a reclined position, said 1st and 2nd body supports in a near equal elevation relationship, said space, said 1st and 2nd body supports, aide the spine by and through tension, contraction and increased blood flow in addition to providing said occupant the ability for spinal muscle, nerve and soft tissue development and maintenance and, increase spinal mobility, flexibility and health of said occupant in said space between said 1st and 2nd body supports.

3. A spine tensioning dual body support comprising:

A space defined between a 1st and 2nd body support, said space provides an unsupported midsection of an occupant in said space, a 1st, a 2nd, and a 3rd, axis, said 1st body support is attached to said 1st axis, said 2nd body support is attached to said 2nd axis, said 3rd axis rotates said 1st and said 2nd axis relative to said space, while said occupant remains in said space, a 1st and 2nd limit for said 3rd axis, said 1st limit maintains said 1st and 2nd body supports in an upright chair configuration, said 1st body support lower than said 2nd body support, said 2nd limit maintains said 1st and 2nd body supports in a reclined position, said 1st and 2nd body supports in a near equal elevation relationship, said space, said 1st and 2nd body supports, aide the spine by and through tension, contraction and increased blood flow in addition to providing said occupant the ability for spinal muscle, nerve and soft tissue development and maintenance and, increase spinal mobility, flexibility and health of said occupant in said space between said 1st and 2nd body supports.

4. A spine tensioning dual body support comprising:

A space defined between a 1st and 2nd body support, said space provides an unsupported midsection of an occupant in said space, a means to rotate, relative to said space, said 1st and 2nd body supports, while said occupant remains in said space, a 1st and 2nd limit for said means, said 1st limit maintains said 1st and 2nd body supports in an upright chair configuration, said 1st body support lower than said 2nd body support, said 2nd limit maintains said 1st and 2nd body supports in a reclined position, said 1st and 2nd body supports in a near equal elevation relationship, said means transfers said occupant's weight from said 1st body support, across said space, to said 2nd body support, while said occupant remains in said space, said space, said 1st and 2nd body supports, aide the spine by and through tension, contraction and increased blood flow in addition to providing said occupant the ability for spinal muscle, nerve and soft tissue development and maintenance and, increase spinal mobility, flexibility and health of said occupant in said space between said 1st and 2nd body supports.

5. A spine tensioning dual body support according to claim 1, 2, 3, or 4, wherein said means comprises:

a base frame.

6. A spine tensioning dual body support according to claim 5 wherein;

said 1st and 2nd body supports are rotatably mounted.

7. A spine tensioning dual body support according to claim 6 further comprising;

a body support rotational limit limiting the rotation of said 1st and 2nd body supports.

8. A spine tensioning dual body support according to claim 7 further comprising;

body support mounting means whereby said 1st and 2nd body supports are mounted for rotation in two orthogonal planes.

9. A spine tensioning dual body support according to claim 8 further comprising;

adjustment means to adjust said space between said 1st and 2nd body supports.

10. A spine tensioning dual body support according to claim 9 whereby;

said occupant, supported by said 1st and 2nd body supports at appproximate one third points, creates similar compression, tension, shear and moment forces on said occupant as that, that are created in a simple beam, supported by a 1st and 2nd support, at approximate one third points.

11. A spine tensioning dual body support according to claim 6 wherein:

said occupant's weight on said 1st rotatably mounted body support facilitates inverse movement of said 2nd body support.

12. A spine tensioning dual body support according to claim 5 further comprising;

hand grips attached to said base frame, said hand grips enable said occupant to effect rotation of said first and second body supports about said space.

13. A spine tensioning dual body support according to claim 5 wherein said base frame comprises:

two verticle support risers each attached to a base member, rising above said base member and attached to said 1st and 2nd body supports.

14. A spine tensioning dual body support according to claim 13, further comprising;

two elongated members, attached between said 1st and 2nd body supports.

15. A spine tensioning dual body support according to claim 14 wherein:

said two base members are parallel;

said two vertical support risers are attached at a midpoint of said base members;

including one horizontal spacer bar attached between said vertical support risers maintaining said vertical risers in parallel relationship and;

two lateral support members rotatably attached at their midpoint to a top of said vertical risers.

16. A spine tensioning dual body support comprising:

A space defined between a 1st and 2nd body support, said space provides an unsupported midsection of an occupant in said space, a means to rotate, relative to said space, said 1st and 2nd body supports, while said occupant remains in said space, a rotation limit means positions said 1st and 2nd body supports in any predetermined rotation relationship, relative to said space, said space, said 1st and 2nd body supports, aide the spine by and through tension, contraction and increased blood flow in addition to providing said occupant the ability for spinal muscle, nerve and soft tissue development and maintenance and, increase spinal mobility, flexibility and health of said occupant in said space between said 1st and 2nd body supports.

* * * * *